(12) United States Patent
Russell et al.

(10) Patent No.: US 11,017,191 B2
(45) Date of Patent: *May 25, 2021

(54) ACCESSORY HAVING A TARGET GENERATING STRUCTURE FOR A MOBILE DEVICE

(71) Applicant: The Code Corporation, Draper, UT (US)

(72) Inventors: Garrett Russell, Phoenixville, PA (US); Ryan Hoobler, Salt Lake City, UT (US); Philip Utykanski, Saratoga Springs, UT (US)

(73) Assignee: The Code Corporation, Murray, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,046

(22) Filed: Apr. 1, 2019

(65) Prior Publication Data

US 2019/0228197 A1 Jul. 25, 2019

Related U.S. Application Data

(63) Continuation of application No. 14/581,821, filed on Dec. 23, 2014, now Pat. No. 10,248,821, which is a (Continued)

(51) Int. Cl.
*G06K 7/10* (2006.01)
*A45C 13/00* (2006.01)
(Continued)

(52) U.S. Cl.
CPC ........ *G06K 7/10881* (2013.01); *A45C 13/002* (2013.01); *G06K 7/0004* (2013.01); (Continued)

(58) Field of Classification Search
CPC ..... G06K 2207/1011; G06K 19/06131; G06K 7/10821; G06K 7/10831; G06K 7/10881; (Continued)

(56) References Cited

U.S. PATENT DOCUMENTS 8,162,218 B2 4/2012 Meier
8,750,637 B2 6/2014 Stroem
(Continued)

FOREIGN PATENT DOCUMENTS

| CN | 203838715 U | 9/2014 |
|---|---|---|
| JP | 2004032507 A | 1/2004 |
| WO | 2015083979 | 6/2015 |

*Primary Examiner* — Suezu Ellis
(74) *Attorney, Agent, or Firm* — Timothy P. O'Hagan; Ray Quinney & Nebeker

(57) ABSTRACT

An accessory for a mobile device may include a target generating structure. The target generating structure may emit a targeting pattern of illumination into a field of view of a camera of the mobile device. The targeting pattern may facilitate proper positioning of the mobile device for capturing an image of a barcode. The accessory may secure to a corner of the mobile device. The accessory may send a request to the mobile device to establish a focus setting of the camera. The target generating structure may emit the targeting pattern after the accessory sends the request.

20 Claims, 44 Drawing Sheets

Related U.S. Application Data continuation-in-part of application No. 13/708,835, filed on Dec. 7, 2012, now abandoned, and a continuation-in-part of application No. 13/644,356, filed on Oct. 4, 2012, now abandoned.

(51) Int. Cl.
  *G06K 7/00* (2006.01)
  *G06K 7/08* (2006.01)
  *A45C 11/00* (2006.01)
  *H02J 7/00* (2006.01)
  *H01M 50/20* (2021.01)
  *H01M 50/209* (2021.01)

(52) U.S. Cl.
  CPC ......... *G06K 7/089* (2013.01); *G06K 7/10732* (2013.01); *H02J 7/0045* (2013.01); *A45C 2011/002* (2013.01); *H01M 50/20* (2021.01); *H01M 50/209* (2021.01); *H01M 2220/30* (2013.01)

(58) Field of Classification Search
  CPC ....... G06K 7/1098; G06K 2007/10485; G06K 2007/10524; G06K 7/1443; G06K 7/1073; A45C 11/00; A45C 2011/002; H04M 1/0254; H04M 1/0264
  See application file for complete search history.

(56) References Cited

U.S. PATENT DOCUMENTS

| | | | |
|---|---|---|---|
| 9,257,396 B2 | 2/2016 | Uzoh | |
| 9,696,612 B2 | 7/2017 | Anderson | |
| 10,223,563 B2* | 3/2019 | Powell | G06K 7/10831 |
| 10,248,821 B2* | 4/2019 | Russell | G06K 7/10881 |
| 2003/0025822 A1 | 2/2003 | Shimada | |
| 2003/0030923 A1 | 2/2003 | Hsu | |
| 2003/0062413 A1* | 4/2003 | Gardiner | G06K 7/10732 235/454 |
| 2004/0056956 A1 | 3/2004 | Gardiner et al. | |
| 2005/0011957 A1* | 1/2005 | Attia | G06K 7/10722 235/462.46 |
| 2006/0043191 A1* | 3/2006 | Patel | G06K 7/10722 235/462.21 |
| 2006/0131419 A1 | 6/2006 | Nunnik | |
| 2006/0284987 A1 | 12/2006 | Wolf, II | |
| 2007/0158220 A1 | 7/2007 | Cleereman et al. | |
| 2007/0205287 A1 | 9/2007 | Tien | |
| 2008/0142599 A1 | 6/2008 | Benillouche | |
| 2009/0140048 A1* | 6/2009 | Yu | G02B 27/0966 235/462.35 |
| 2009/0218403 A1* | 9/2009 | Joseph | G06K 7/10732 235/462.21 |
| 2009/0321523 A1* | 12/2009 | Calvarese | G06K 7/10732 235/462.42 |
| 2012/0061462 A1 | 3/2012 | Shadwell | |
| 2013/0109316 A1* | 5/2013 | Lee | H04M 1/725 455/41.2 |
| 2013/0155253 A1 | 6/2013 | Wood | |
| 2013/0161397 A1* | 6/2013 | Bremer | G06K 7/10722 235/462.21 |
| 2013/0292477 A1* | 11/2013 | Hennick | G06K 7/10732 235/469 |
| 2014/0017955 A1 | 1/2014 | Lo | |
| 2014/0171150 A1 | 6/2014 | Hurst et al. | |
| 2014/0232930 A1* | 8/2014 | Anderson | G03B 17/565 348/369 |
| 2014/0313377 A1 | 10/2014 | Hampton | |
| 2014/0327815 A1 | 11/2014 | Auger | |
| 2015/0053769 A1* | 2/2015 | Thuries | G06K 7/10732 235/470 |
| 2015/0126244 A1 | 5/2015 | Moran | |
| 2015/0126245 A1 | 5/2015 | Barkan et al. | |
| 2015/0317503 A1 | 11/2015 | Powell | |
| 2016/0012269 A1 | 1/2016 | Kowalczyk et al. | |
| 2016/0104016 A1 | 4/2016 | Deal | |
| 2016/0104017 A1 | 4/2016 | Deal | |
| 2016/0171357 A1 | 6/2016 | Kwon | |
| 2016/0180128 A1 | 6/2016 | Utykanski | |
| 2016/0180129 A1 | 6/2016 | Utykanski | |
| 2016/0188932 A1 | 6/2016 | Powell | |
| 2016/0188933 A1 | 6/2016 | Powell | |
| 2016/0188934 A1 | 6/2016 | Powell | |
| 2016/0232389 A1* | 8/2016 | Gifford | G06K 7/10386 |
| 2016/0321483 A1 | 11/2016 | Utykanski | |
| 2016/0321485 A1 | 11/2016 | Utykanski | |
| 2016/0373629 A1 | 12/2016 | Jung | |
| 2017/0004340 A1 | 1/2017 | Powell | |

* cited by examiner

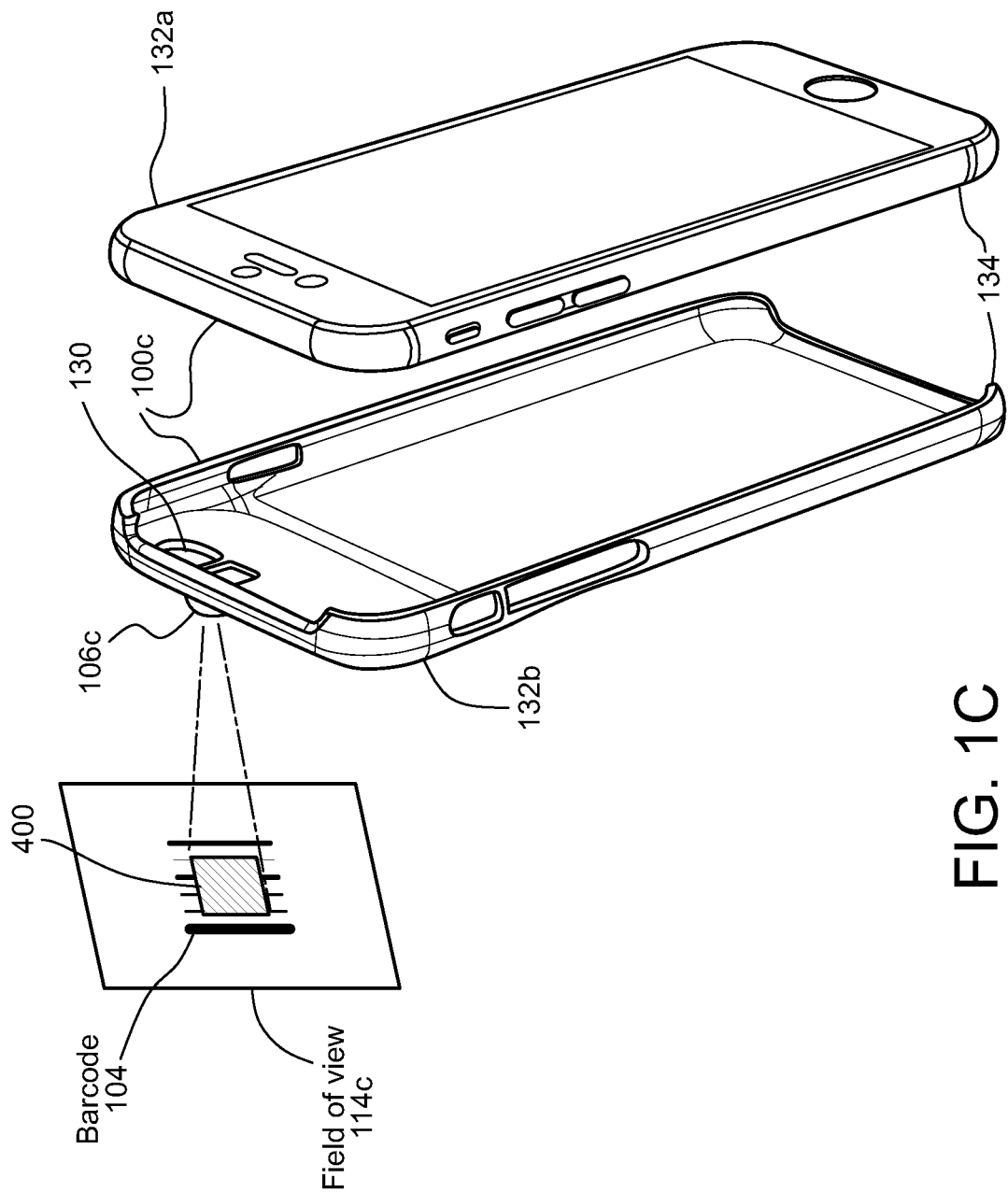

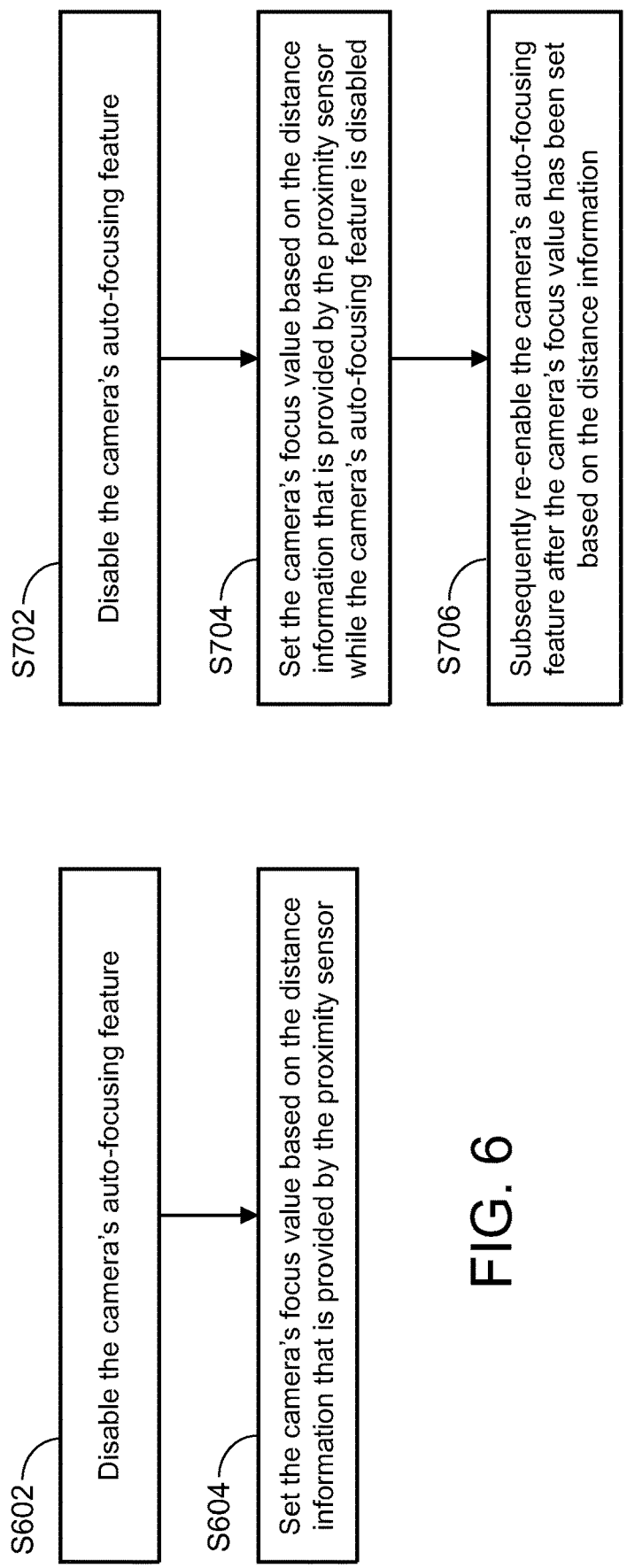

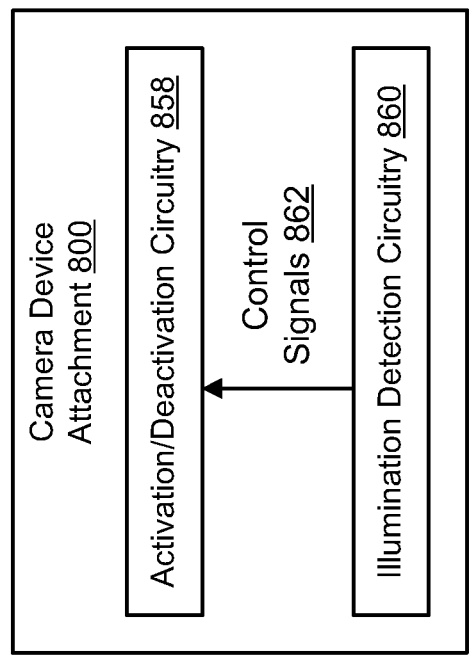
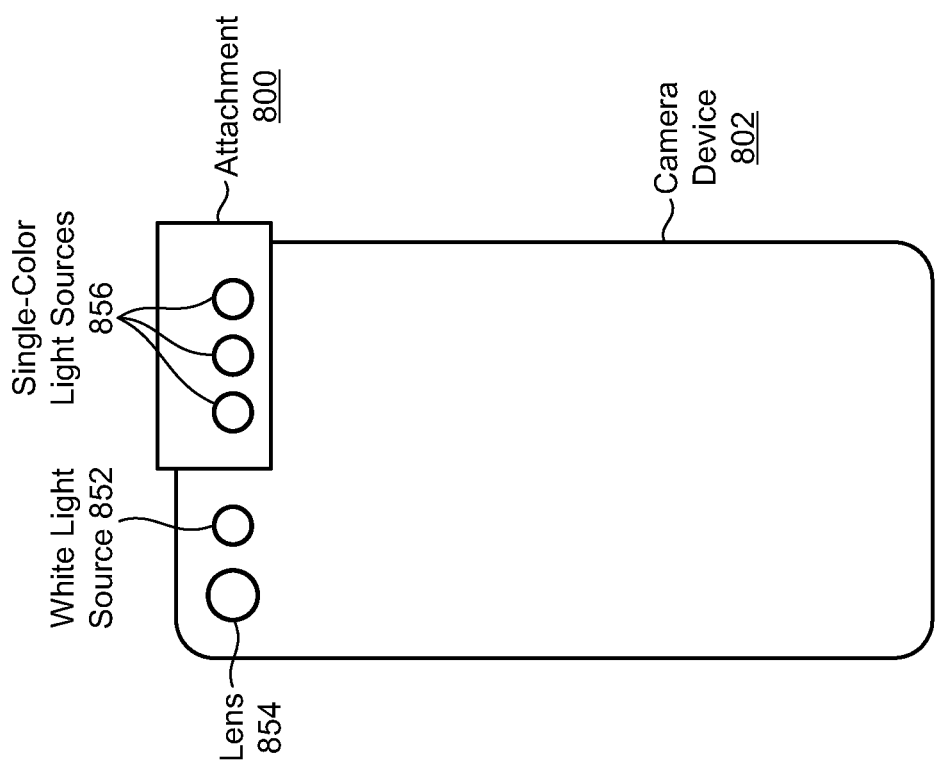
FIG. 8B
FIG. 8A

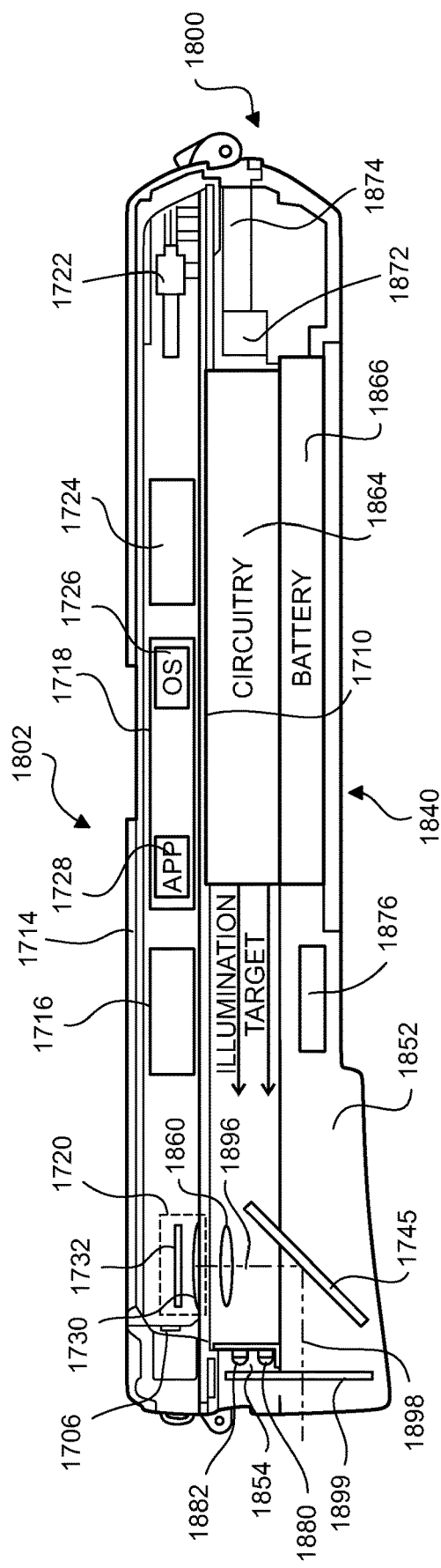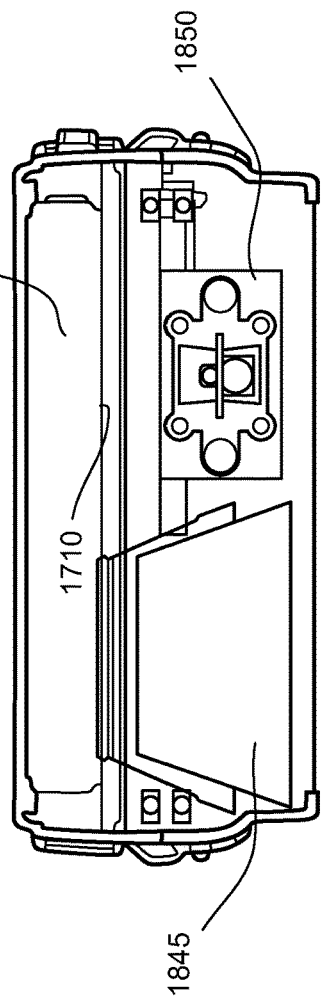
FIG. 18A
FIG. 18B

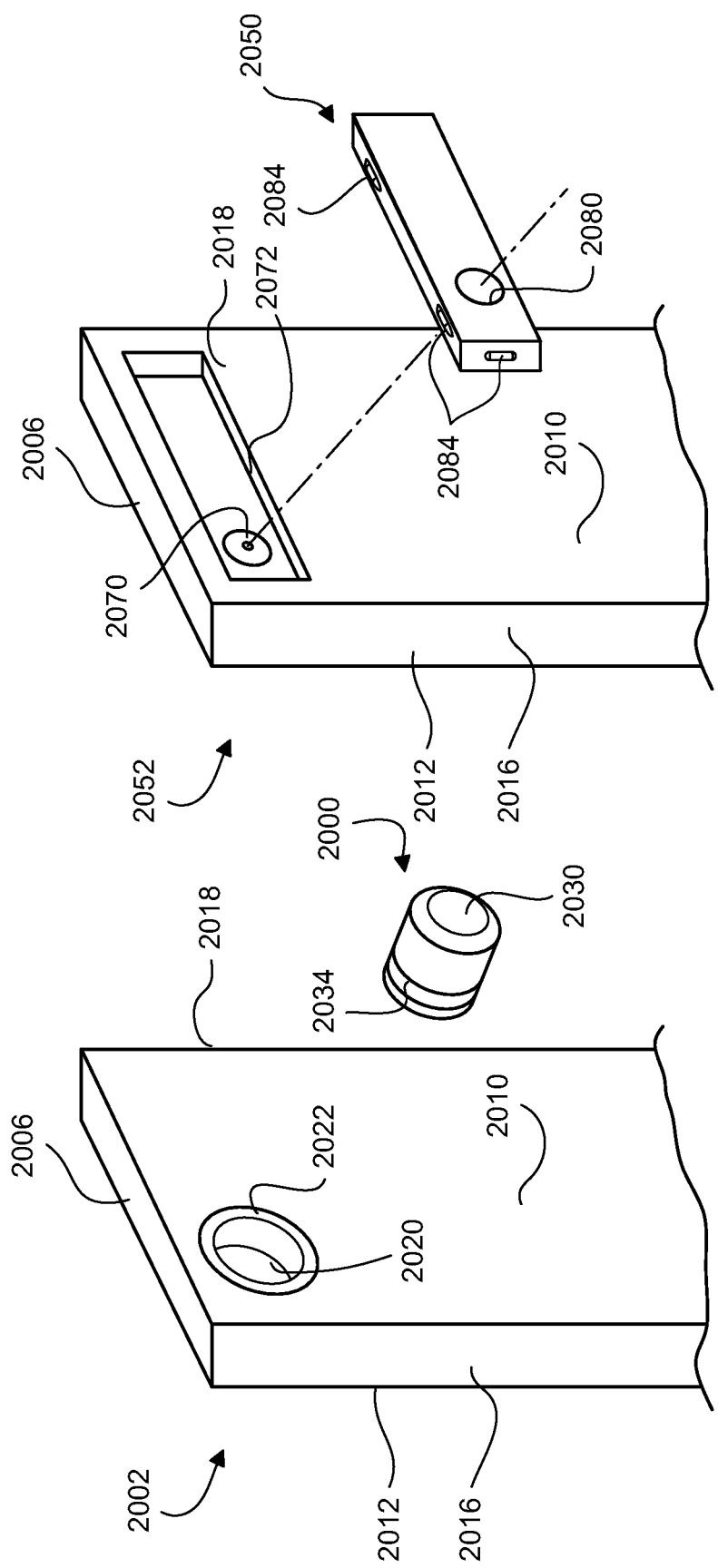

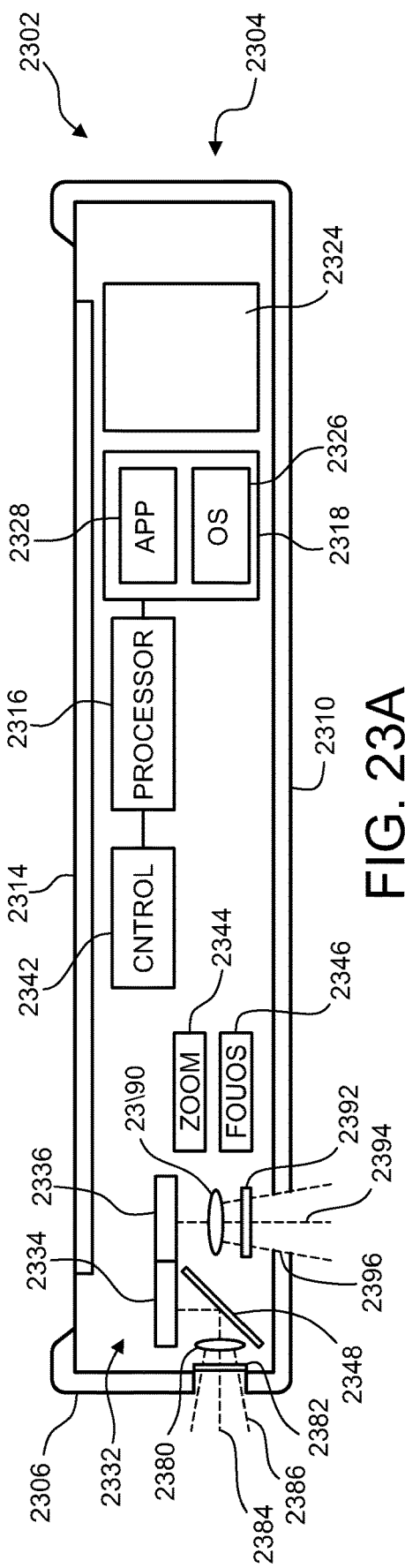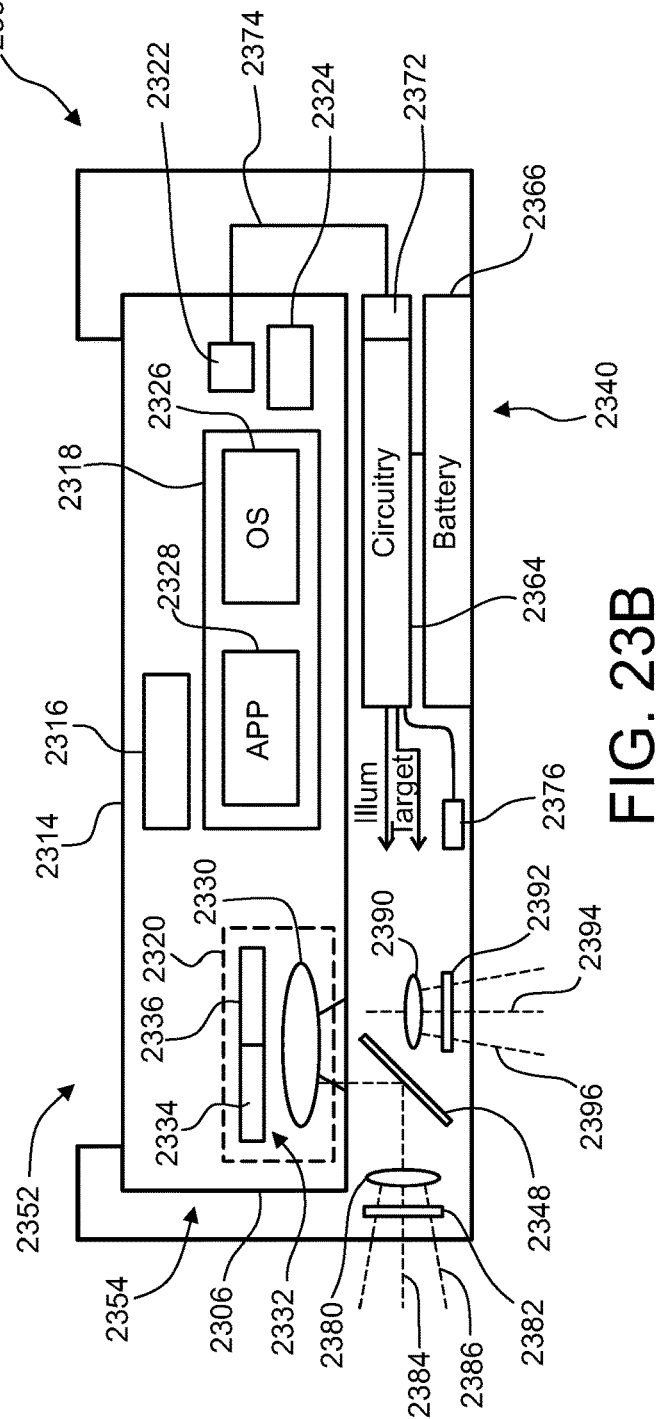

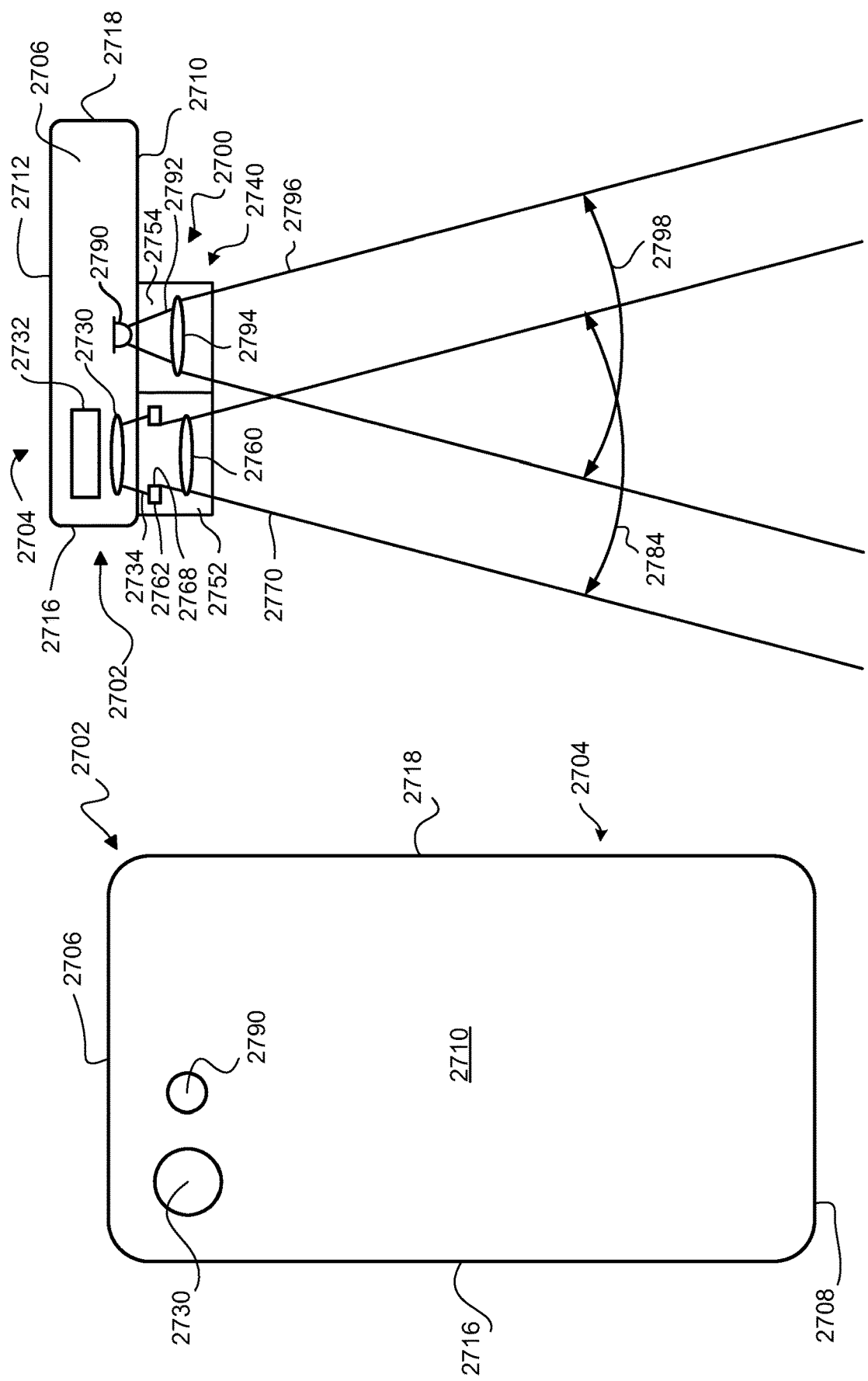

ACCESSORY HAVING A TARGET GENERATING STRUCTURE FOR A MOBILE DEVICE

RELATED APPLICATIONS

This application is a continuation of U.S. patent application Ser. No. 14/581,821 (the '821 application), filed Dec. 23, 2014, and entitled TARGET GENERATING STRUCTURE FOR AN ACCESSORY FOR A MOBILE DEVICE. The '821 application is a continuation-in-part of U.S. patent application Ser. No. 13/644,356, filed Oct. 4, 2012, and entitled HAND-HELD ELECTRONIC DEVICE ACCESSORY THAT FACILITATES RAPID BATTERY REPLACEMENT. The '821 application is also a continuation-in-part of U.S. patent application Ser. No. 13/708,835, filed Dec. 7, 2012, and entitled IMPROVING THE BARCODE-READING CAPABILITIES OF A PORTABLE, HAND-HELD COMPUTING DEVICE THAT COMPRISES A CAMERA. The '821 application is also related to U.S. application Ser. No. 14/319,193, filed Jun. 30, 2014, and entitled BARCODE READING SYSTEM INCLUDING A BARCODE SLED READER AND RELAY APPLICATION. Each of the foregoing is incorporated by reference as though set forth herein in its entirety.

BACKGROUND

Smartphones (and other types of portable, hand-held computing devices, such as tablet computers) are in widespread use today, most often in connection with entertainment, communications and office productivity. Most smartphones include a camera. Therefore, with appropriate software, such smartphones can be used to read barcodes. However, smartphones typically have poor barcode reading capability.

SUMMARY

This patent specification relates generally to improving the barcode-reading capabilities of a smartphone, a tablet computer, or any other portable, hand-held computing device that comprises a camera (hereinafter, "mobile device"). More specifically, this patent specification describes components that maybe used in conjunction with mobile devices to facilitate barcode reading. One or more such components may be incorporated into an attachment for a mobile device. The attachment may include a target generating mechanism, a proximity sensor, targeting illumination that facilitates proper positioning of a barcode in the camera field-of-view, exposure illumination that is optimized for barcode reading, optics that provide an alternative optical path to the mobile device, and/or a supplementary lens system that is optimized for barcode reading.

BRIEF DESCRIPTION OF THE DRAWINGS

FIGS. 1A-1C illustrate an example of a mobile device attachment that includes a target generating mechanism.

FIG. 6 illustrates one way that a mobile device may utilize distance information provided by the proximity sensor shown in FIGS. 5A and 5B.

FIG. 7 illustrates another way that a mobile device may utilize distance information provided by the proximity sensor shown in FIGS. 5A and 5B.

FIGS. 8A and 8B illustrate an example of a mobile device attachment that includes illumination that is optimized for barcode reading.

FIGS. 18A through 18B illustrate another configuration of an attachment for a mobile device.

FIGS. 20A through 20B illustrate two more additional configurations of attachments for mobile devices.

FIGS. 23A through 23B illustrate a mobile device and an attachment including a first set of optics optimized for barcode reading, and a second set of optics optimized for capture of non-barcode images.

FIGS. 27A through 27C illustrate a mobile device with an attachment with optics for image capture, and optics for image illumination.

DETAILED DESCRIPTION

As used in this patent specification and the accompanying claims, the term "mobile device" will be used to describe a portable, hand-held computing device that comprises a camera. As indicated above, one example of a mobile device is a smartphone. Another example of a mobile device is a tablet computer. Yet another example is a hybrid tablet/smartphone device, often nicknamed a "phablet."

As used herein, the term "camera" refers to an apparatus for capturing digital images. A camera that is included in a digital computing device (such as a smartphone, tablet computer, etc.) typically comprises a lens and an image sensor.

As used herein, the terms "attachment" and "accessory" are used synonymously, and may refer to an apparatus attached to a mobile device. An attachment for a mobile device may include just a single component that improves the barcode reading capabilities of the mobile device. Alternatively, an attachment may include multiple components that improve the barcode reading capabilities of the mobile device. In addition, an attachment for a mobile device may provide additional functionality that is unrelated to improving the barcode reading capabilities of the mobile device.

An attachment for a mobile device may cover a relatively small portion of the mobile device. Alternatively, an attachment for a mobile device may be a protective case that covers a substantial portion of the mobile device. Attachments may be designed for attachment to mobile devices in a wide variety of ways, including but not limited to corner-positioned attachment, encapsulating attachment, and mounting attachment. These attachment modes will be explained briefly as follows.

Figure 1A:
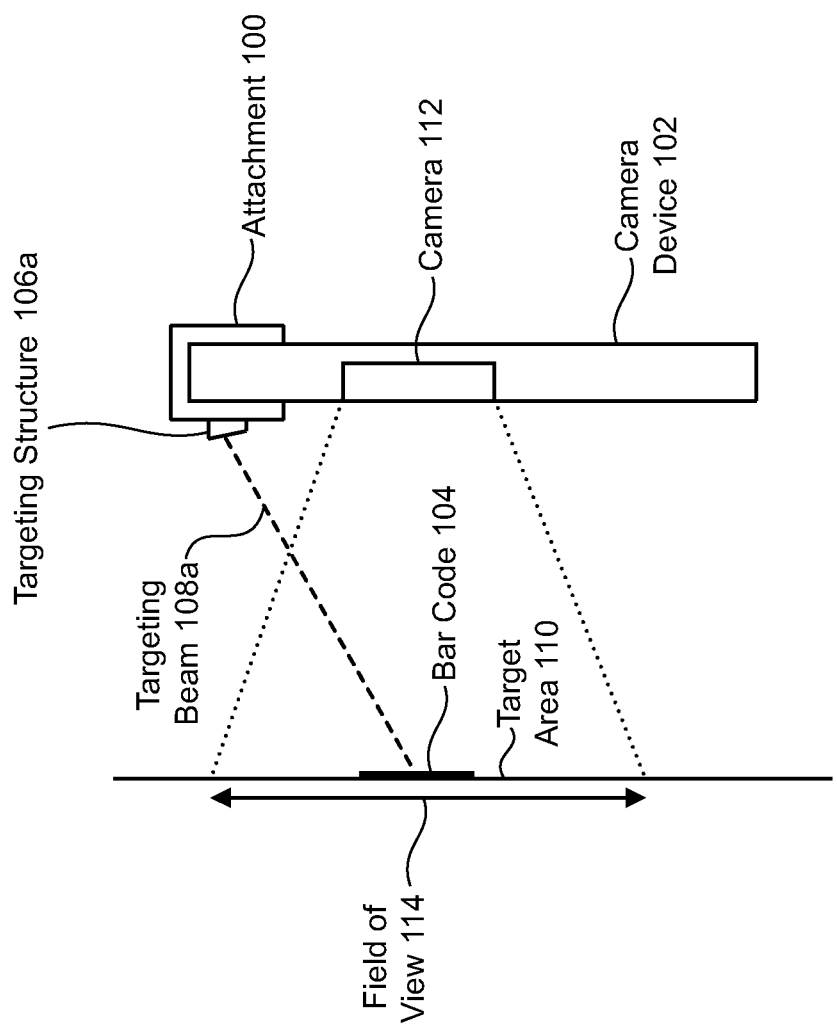
Figure 1B:
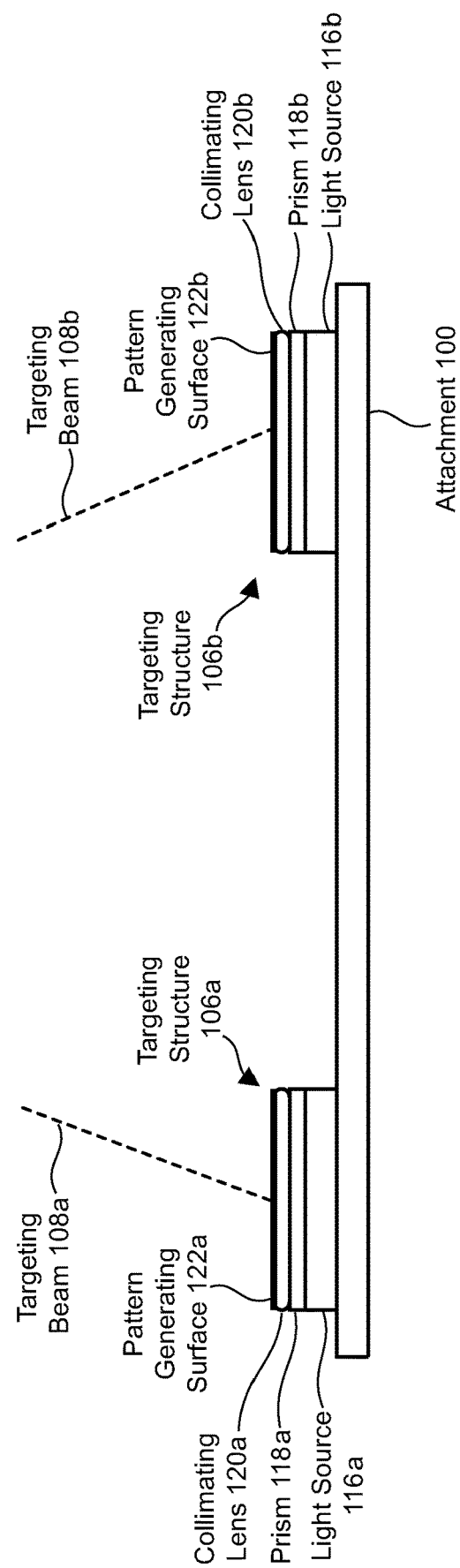
Figure 5A:
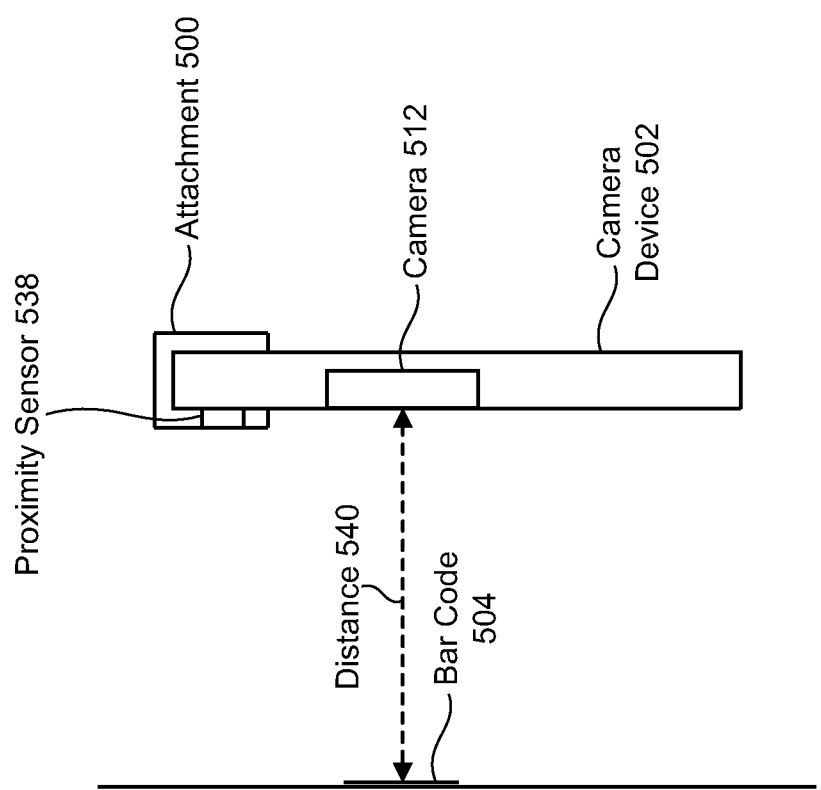
FIGS. 5A and 5B illustrate an example of a mobile device attachment that includes a proximity sensor.
Figure 5B:
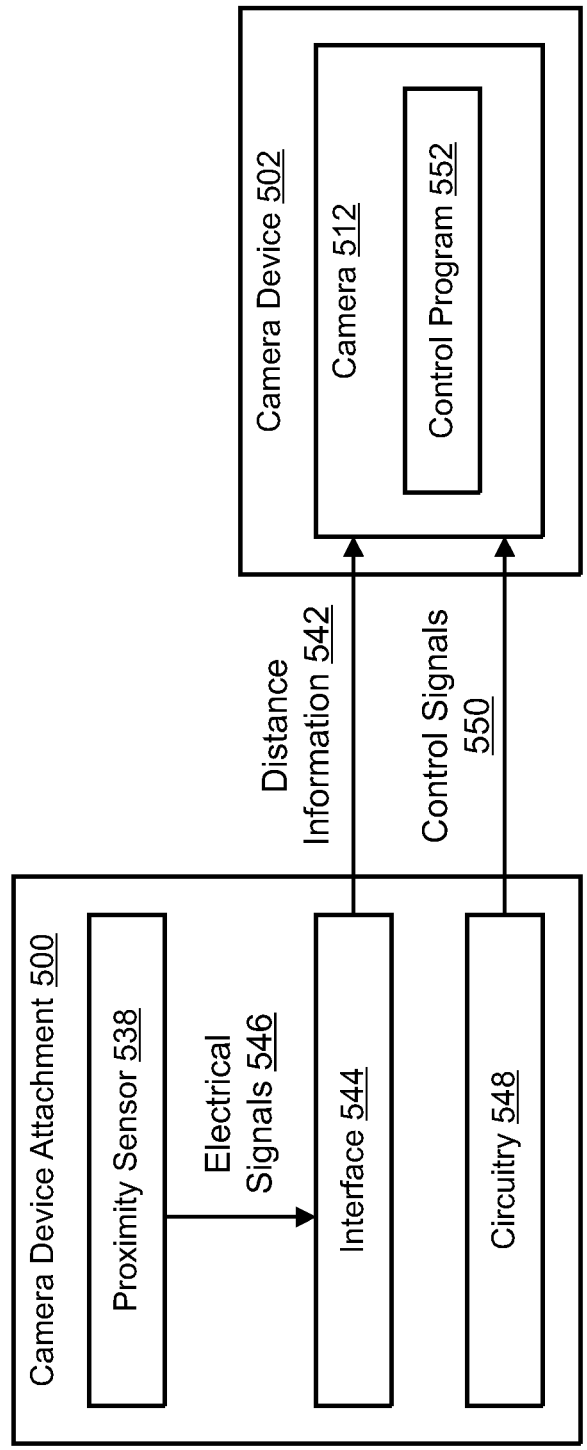

Corner-positioned attachments are attachments that are attached to cover one or more (but not all) corners of a mobile device. Corner-positioned attachments include, as examples, an attachment 100 as illustrated in FIGS. 1A and 1B, an attachment 500 as illustrated in FIGS. 5A and 5B, an attachment 800 as illustrated in FIGS. 8A and 8B, an attachment 1900 as shown in FIG. 19A, and an attachment 1950 as illustrated in FIG. 19B.

Figures 19A, 19B:
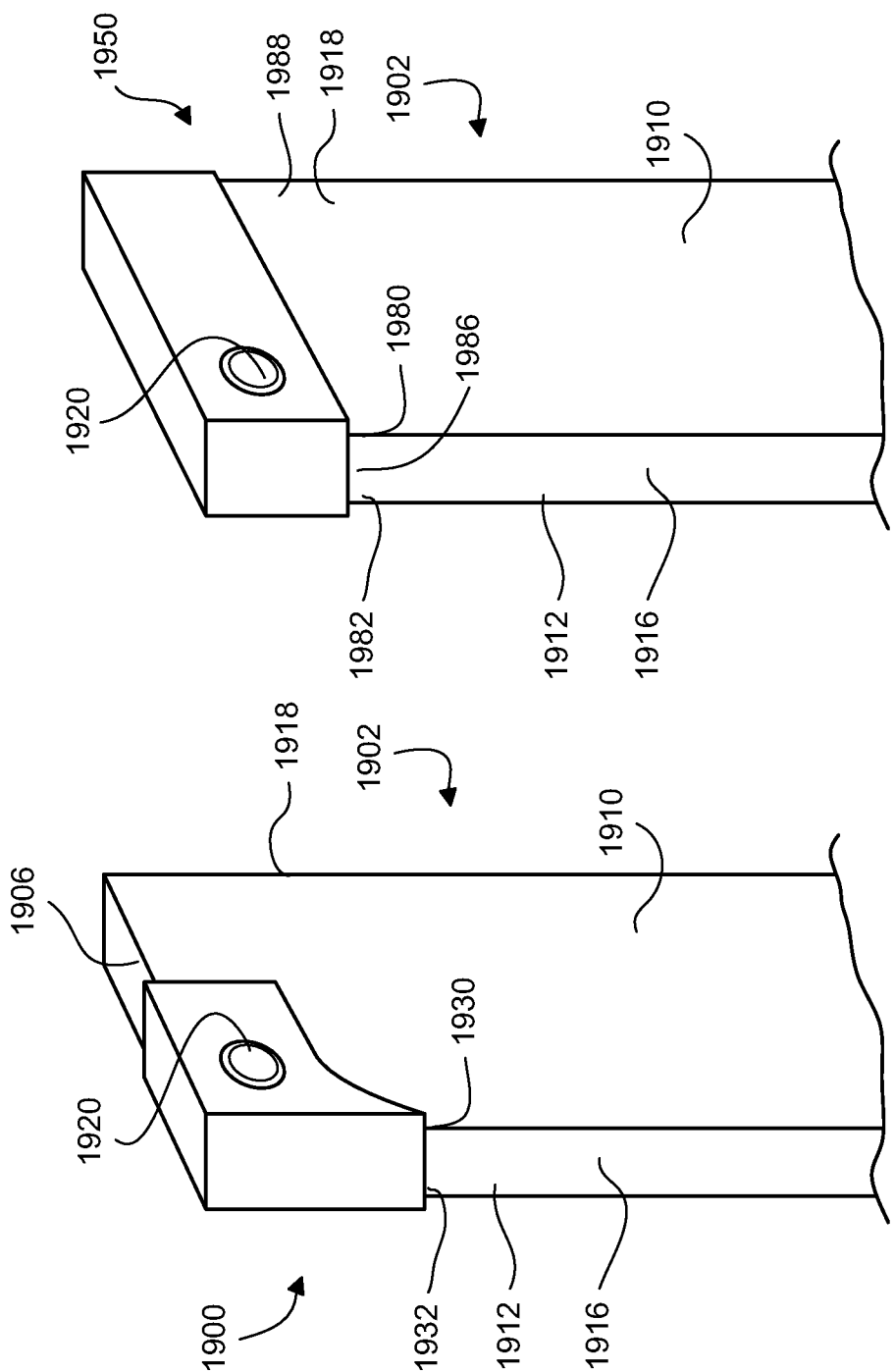
FIGS. 19A through 19B illustrate two more additional configurations of attachments for mobile devices.

Referring briefly to FIGS. 19A and 19B, two exemplary embodiments further illustrate corner-positioned attachment to a mobile device. FIG. 19A illustrates an attachment 1900 secured to a single corner of the mobile device, and FIG. 19B illustrates an attachment 1950 secured to two corners of the mobile device by sliding it over the two corners to be covered.

In general, encapsulating attachments may be attachments that cover an entire side of a mobile device. Some encapsulating attachments may even cover a greater portion of the mobile device, such as the entire mobile device, or the entire mobile device with the exception of interface elements such as the display screen, buttons, electrical interfaces, infrared interfaces, and the like.

Figure 9:
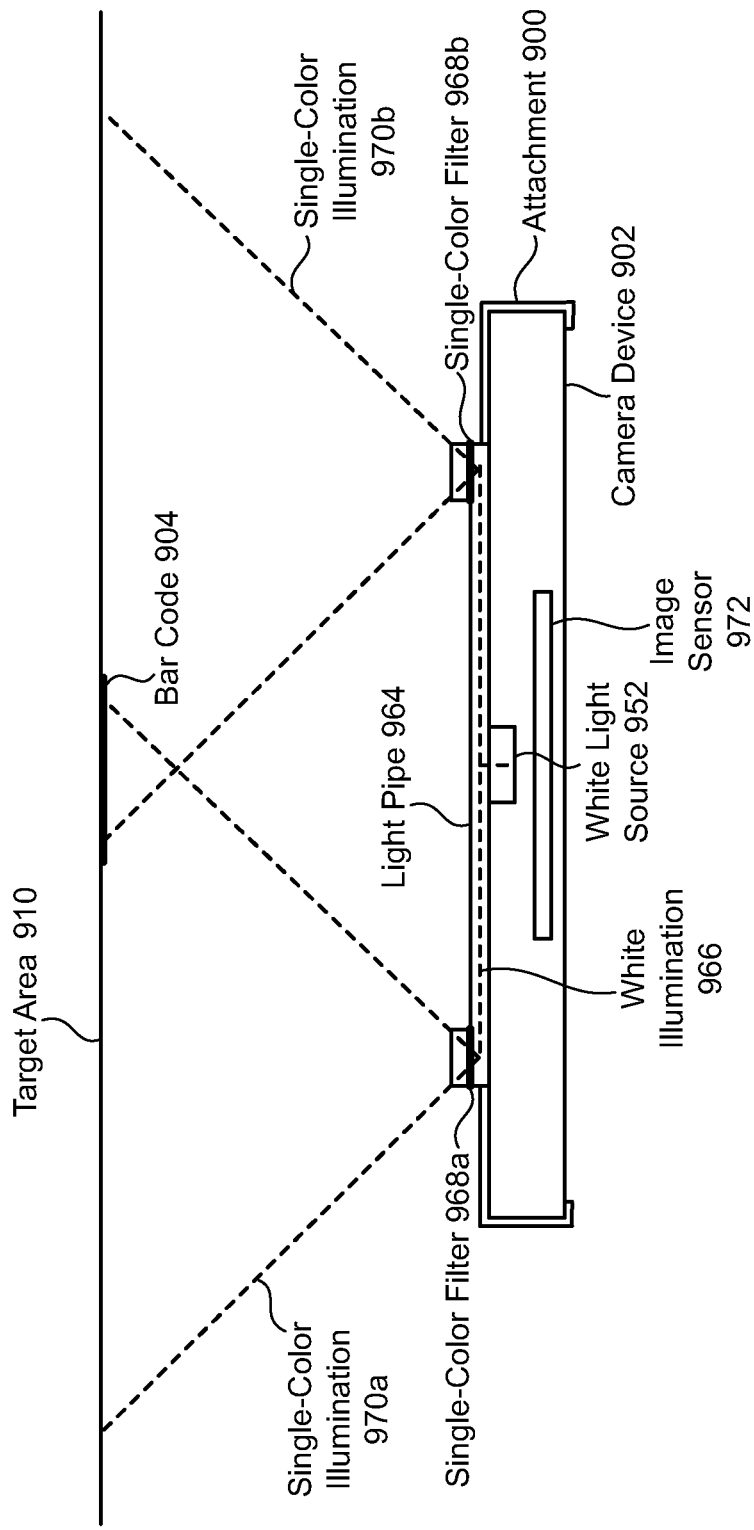
FIG. 9 illustrates another example of a mobile device attachment that includes illumination that is optimized for barcode reading.
Figure 13A:
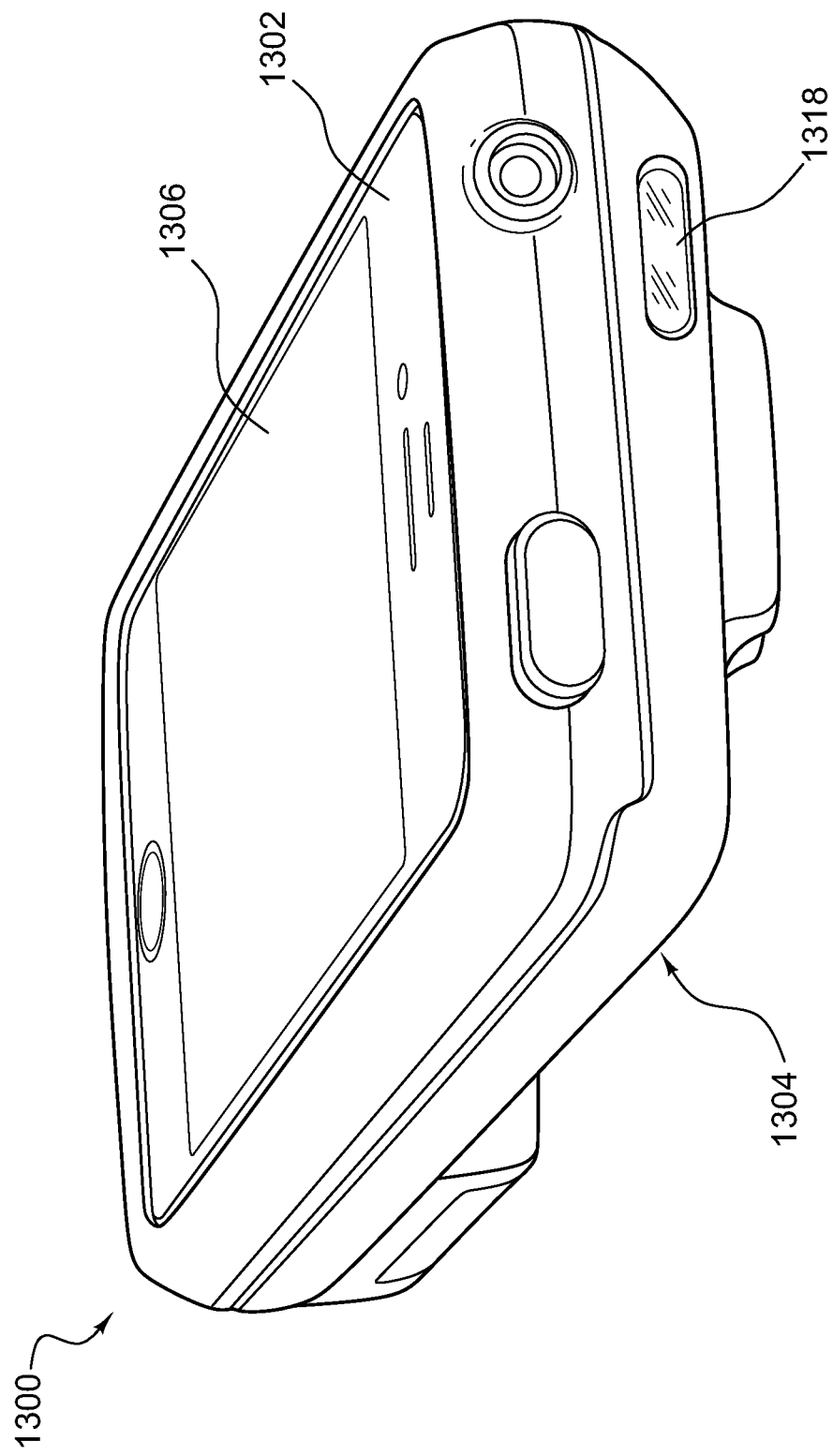
FIGS. 13A through 13C illustrate one configuration of an attachment for a mobile device.
Figure 13B:
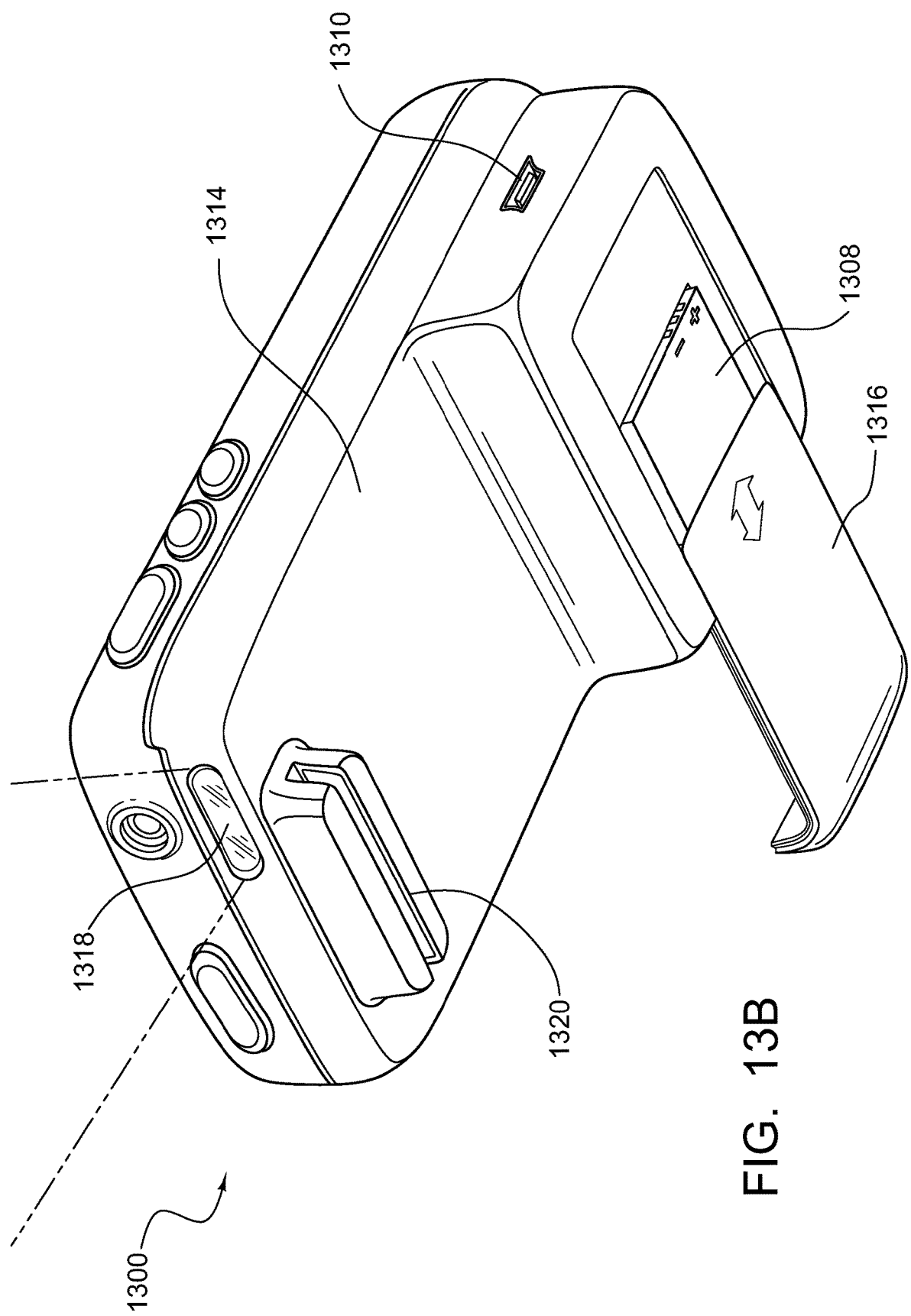
Figure 14A:
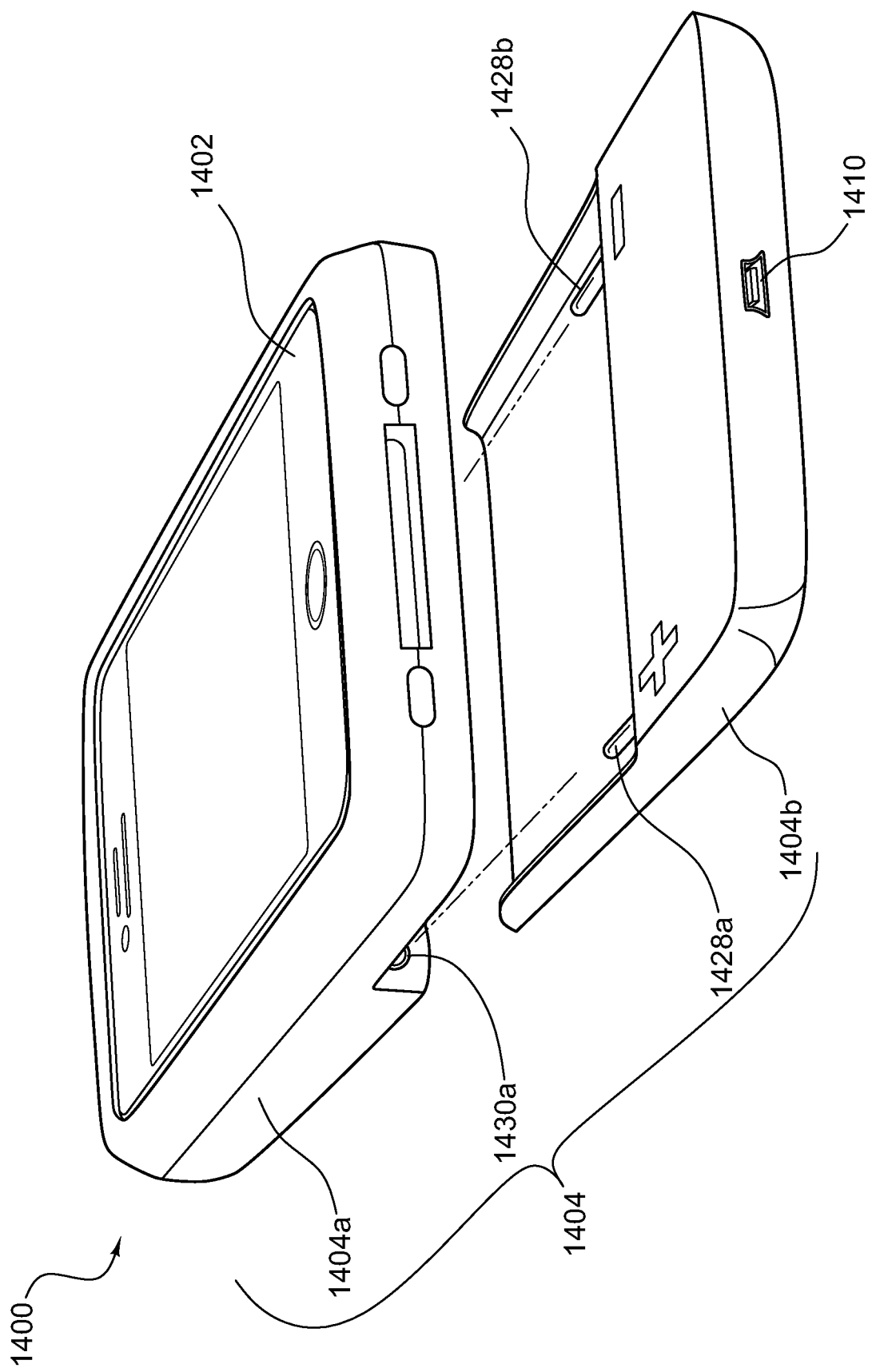
FIGS. 14A through 14C illustrate another configuration of an attachment for a mobile device.
Figure 14B:
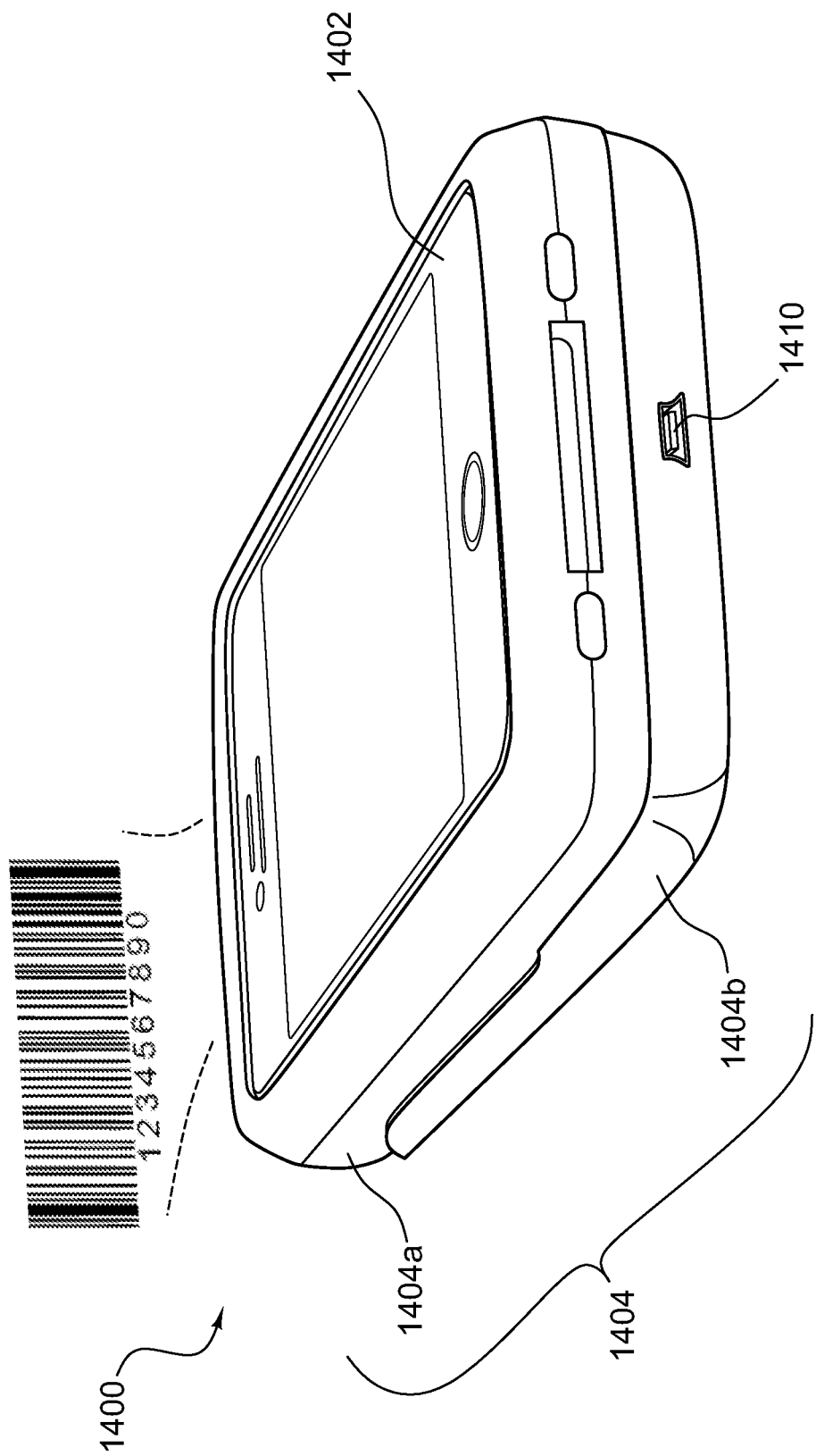
Figure 15A:
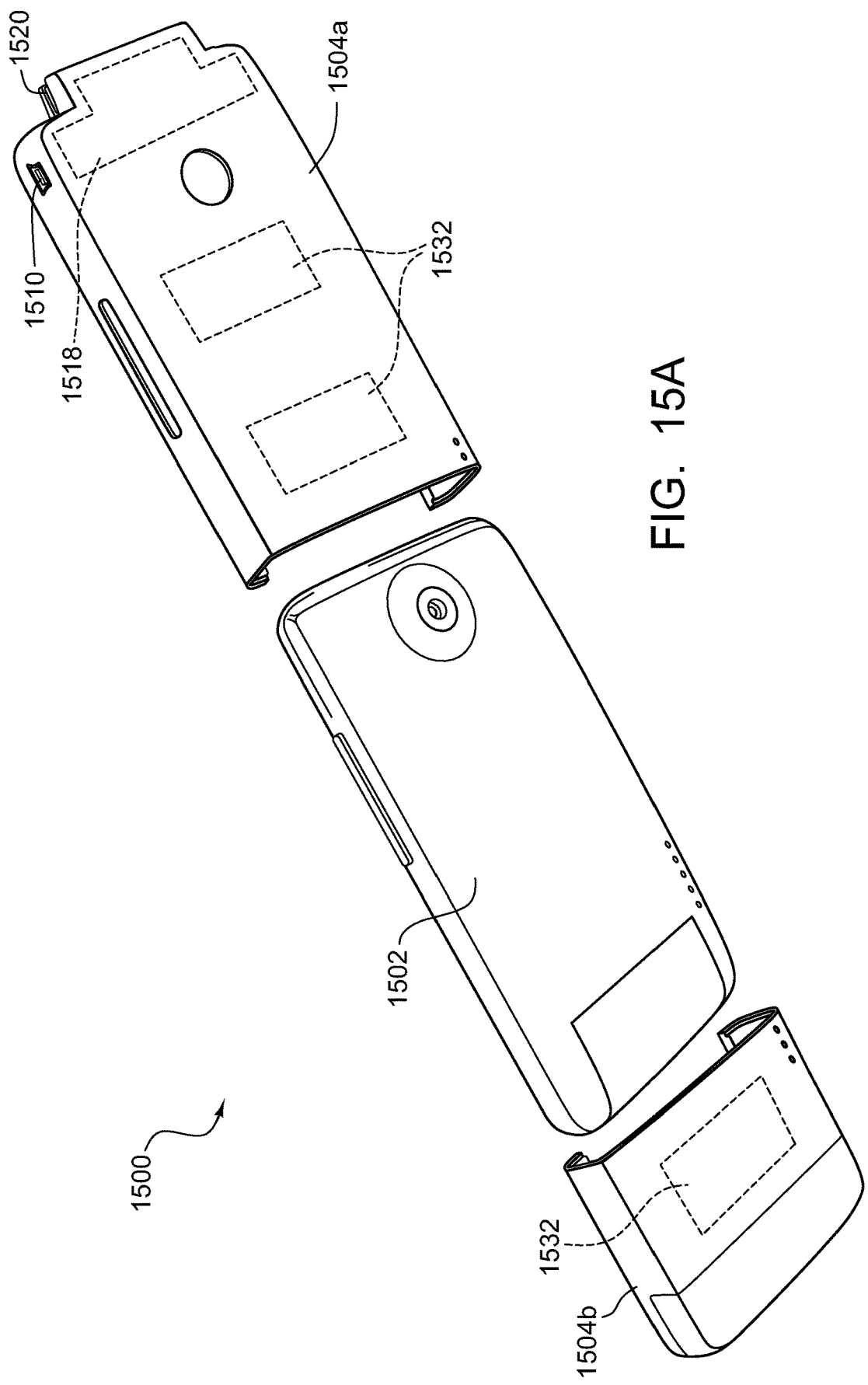
FIGS. 15A through 15C illustrate another configuration of an attachment for a mobile device.
Figure 15B:
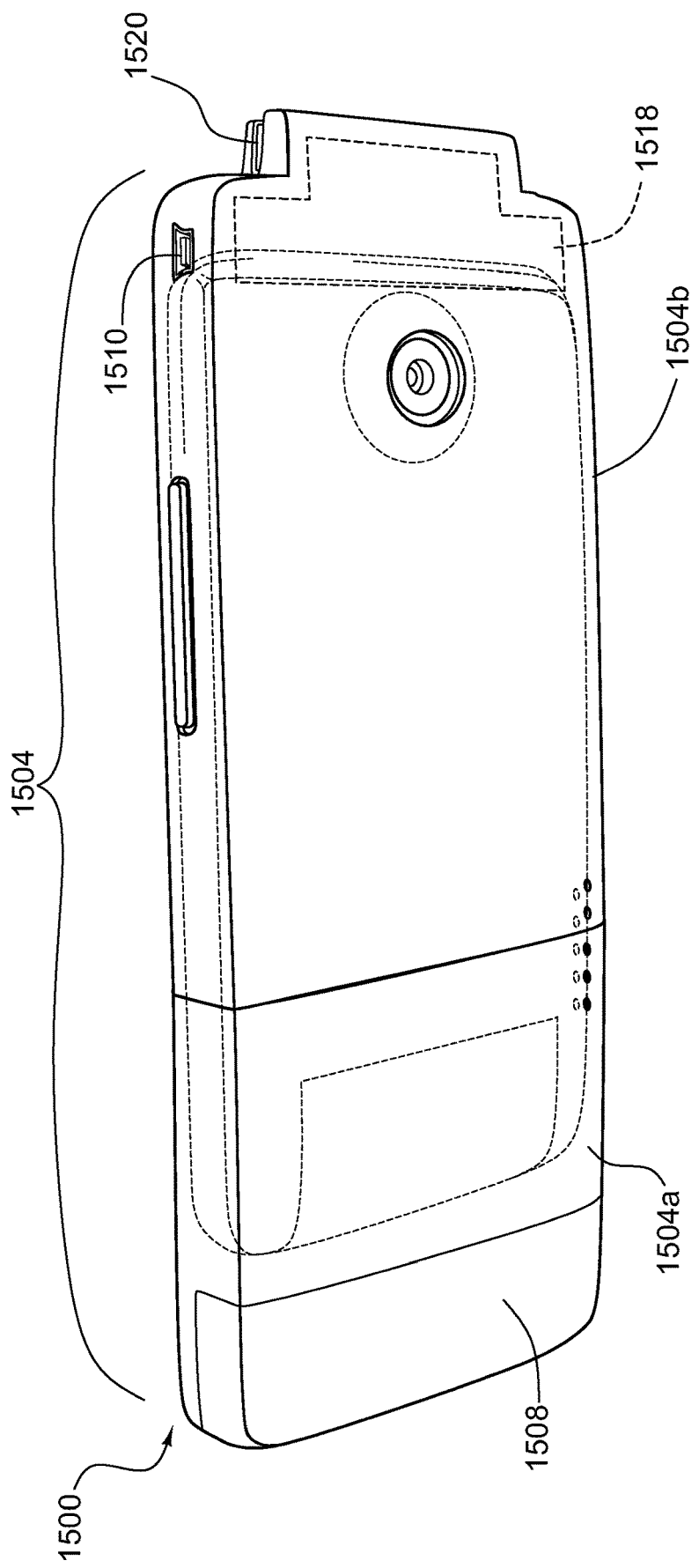

Examples of encapsulating attachments include an attachment 100c as illustrated in FIG. 1C, an attachment 900 as illustrated in FIG. 9, an attachment 1300 as illustrated in FIGS. 13A and 13B, an attachment 1400 as illustrated in FIGS. 14A and 14B, an attachment 1500 as illustrated in FIGS. 15A and 15B, and an attachment 1700, 1750, 1800, 2350, 2800 as illustrated in FIGS. 17A, 17B, 18A, 23B, and 28. Each of these illustrates an attachment that encapsulates and/or serves as a protective case for the associated mobile device.

Mounted attachments generally are attachments that are secured to only one face and/or one edge of a mobile device. Mounted attachments may not cover any corner of the mobile device, and thus also may not encapsulate the mobile device.

Figure 10:
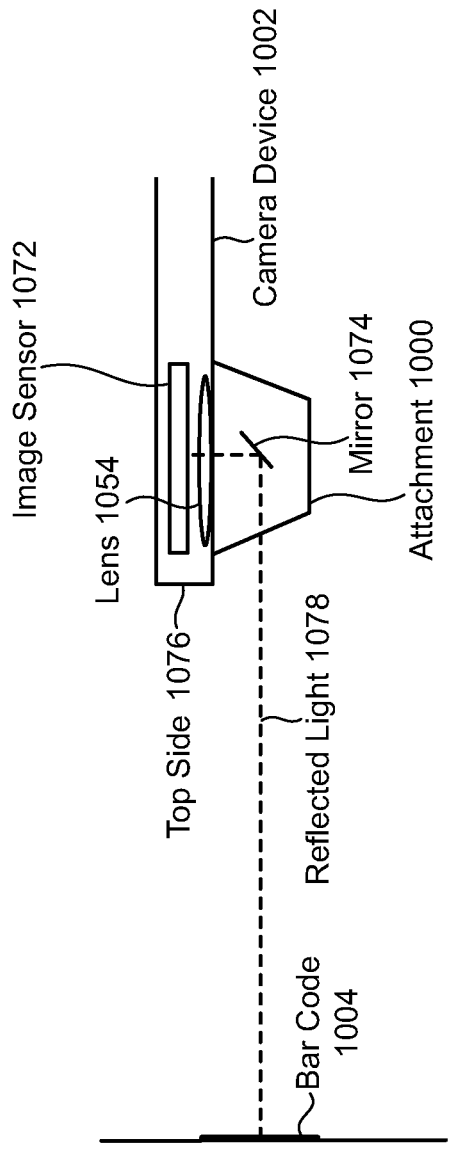
FIG. 10 illustrates an example of a mobile device attachment that includes a mirror that changes the optical path to the mobile device.
Figure 11:
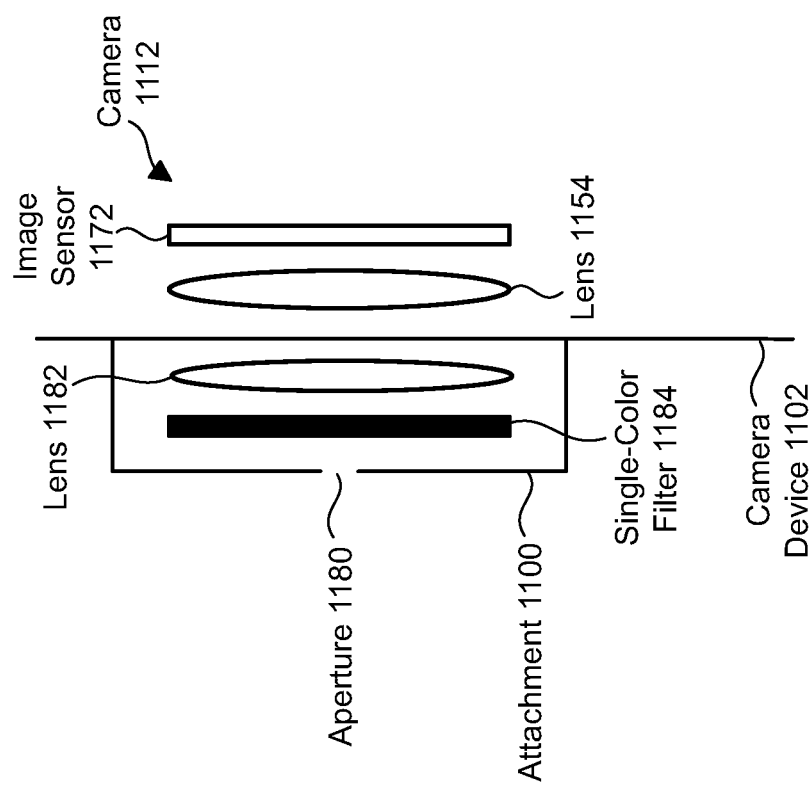
FIG. 11 illustrates an example of a mobile device attachment that includes a supplementary lens system that is optimized for barcode reading.

Examples of mounting attachments include an attachment 1000 as illustrated in FIG. 10, an attachment 1100 as illustrated in FIG. 11, an attachment 2000 as illustrated in FIG. 20A, and an attachment 2050 as illustrated in FIG. 20B.

Referring briefly to FIG. 20A and FIG. 20B, exemplary mounted attachments are shown. In FIG. 20A, the attachment 2000 may be secured to a single side of the mobile device by, for example, threading, a bayonet fitting, or the like. In FIG. 20B, the attachment 2050 may be secured to a single side of the mobile device by, for example, engagement of a spring clip of the attachment 2050 with a corresponding cavity of the mobile device.

An attachment may be attached to the corresponding mobile device via any attachment method known in the art, including but not limited to mechanical fasteners, frictional interfaces, adhesives, and the like. An attachment may have one or more attachment features that accomplish the selected mode of attachment.

For attachments that cover some portion of the mobile device from both sides (typically corner-positioned attachments and encapsulating attachments), attachment may be accomplished through the use of a frictional interface such as a modest interference fit between the interior dimension of the attachment and the exterior dimension of the portion of the mobile device that receives the attachment. For encapsulating attachments, a wide variety of attachment features are used in known examples of cases, covers, and other protectors for mobile devices. For attachments that are attached to only one side of the mobile device, other attachment modes and/or attachment features may be used, such as threaded fasteners, adhesives, snap-in interfaces, and the like. All of these attachment modes and attachment features are within the scope of the present disclosure.

In one aspect, this patent specification describes an attachment for a mobile device. The attachment may include: i) a supplemental power source for providing one of charging power and operating power to the mobile device; ii) one or more illumination and/or optical components that improve the barcode reading capabilities of the mobile device; and/or iii) electronics comprising hardware circuits, a processor, and/or software code stored in memory and executed by the processor that improve the barcode reading capabilities of the mobile device. The attachment, or any of the optics, circuits, or other components described in this application, may be embodied in any of a corner attachment, an encapsulating attachment, a mounted attachment, or any other attachment configuration.

In other aspects, this patent specification describes a mobile device and/or an application stored in a non-transient memory of the mobile device that may include: i) one or more illumination and/or optical components that improve the barcode reading capabilities of the mobile device; and/or ii) electronics comprising hardware circuits, a processor, and/or software code stored in memory and executed by the processor that improve the barcode reading capabilities of the mobile device. In this aspect, such a barcode reading enhanced mobile device may further include an attachment to further enhance barcode reading, such attachment being any of the attachments described herein embodying any of the optics, circuits, or other components described herein.

Target Generating Mechanism

FIGS. 1A-1C illustrate an example of a mobile device attachment 100, 100c that includes a target generating mechanism. Referring to FIGS. 1A and 1B, the target generating mechanism may be utilized to facilitate rapid and optimal positioning of a mobile device 102 with respect to a barcode 104 that the mobile device 102 is attempting to read. This is especially useful when the mobile device 102 does not have a display, or the display is dimmed or turned off to conserve the battery power, or the display is difficult to be viewed when the mobile device 102 is operated as a barcode reader.

The target generating mechanism may include multiple targeting structures 106a, 106b. These targeting structures 106a, 106b may project nonparallel targeting beams 108a, 108b, each of which form a point or a pattern on the target area 110. The targeting structures 106a, 106b may be configured so that (1) at the optimal distance from the camera 112, the targeting beams 108a, 108b converge so that the projected patterns and/or points meet at the center of the camera's field of view 114, and (2) at any distance from the camera 112 other than the optimal distance, the projected patterns and/or points do not meet. Thus, when the mobile device 102 is being used to read a barcode 104, the user may move the mobile device 102 until the projected patterns and/or points meet, indicating that the mobile device 102 is at the optimal distance from the barcode 104 and that the barcode 104 is positioned within the center of the camera's field of view 114.

The target generating mechanism 106a includes a light source 116a, a prism 118a, a collimating lens 120a, and a pattern generating surface 122a. The target generating mechanism 106b includes a light source 116b, a prism 118b, a collimating lens 120b, and a pattern generating surface 122b. The light sources 116a, 116b may be laser diodes, light-emitting diodes (LEDs), etc.

Each of the pattern generating surfaces 122a, 122b may be an interference pattern generating element or a diffractive element, such as a holographic element that may include one or more diffractive gratings. Alternatively, each of the pattern generating surfaces 122a, 122b may be a Fresnel type element that has been fabricated with the desired pattern in mind.

Figure 2B:
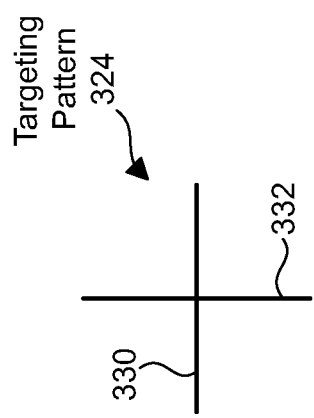
FIGS. 2A-2D illustrate various targeting patterns that may be projected by embodiments of a target generating mechanism described herein.
Figure 2D:
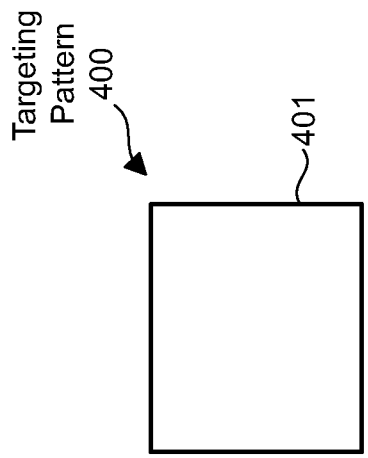
Figure 2A:
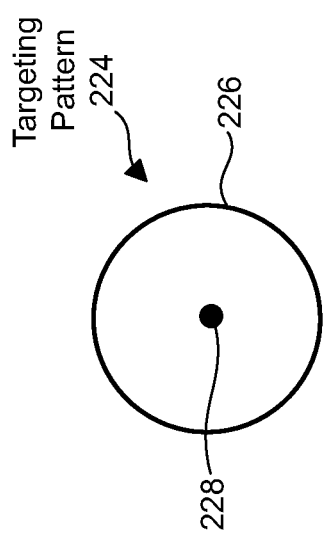

FIGS. 2A-2D illustrate various targeting patterns that may be projected by the targeting structures 106a, 106b. As shown in FIG. 2A, one possible targeting pattern 224 that may be projected by the targeting structures 106a, 106b is a circle 226 with a dot 228 in the center. One target generating mechanism 106a may generate the circle 226, while the other target generating mechanism 106b may generate the dot 228. The targeting structures 106a, 106b may be configured so that when the mobile device 102 is an optimal distance from the barcode 104, the dot 228 is substantially in the center of the circle 226 to form the depicted targeting pattern 224.

As shown in FIG. 2B, another possible targeting pattern 324 that may be projected by the targeting structures 106a, 106b is a cross comprising a horizontal bar 330 and a vertical bar 332. One target generating mechanism 106a may generate the horizontal bar 330, while the other target generating mechanism 106b may generate the vertical bar 332. The targeting structures 106a, 106b may be configured so that when the mobile device 102 is an optimal distance from the barcode 104, the horizontal bar 330 and the vertical bar 332 intersect each other to form the depicted targeting pattern 324.

Figure 2C:
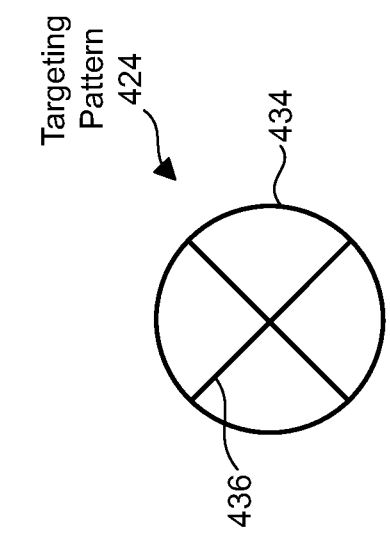

As shown in FIG. 2C, another possible targeting pattern 424 that may be projected by the targeting structures 106a, 106b is a circle 434 comprising an X 436. One target generating mechanism 106a may generate the circle 434, while the other target generating mechanism 106b may generate the X 436. The targeting structures 106a, 106b may be configured so that when the mobile device 102 is an optimal distance from the barcode 104, the circle 434 and the X 436 may intersect each other to form the depicted targeting pattern 424.

As shown in FIG. 2D, another possible targeting pattern 400 may include one or more quadrilaterals such as rectangular or square bars 401. The bar(s) may be, for example, LEDs appearing blue or white and in the shape of rectangular bar(s). The length of the bar(s) may approximately coincide with the width of the field of view of the mobile device or may be within a central portion of the field of view of the camera of the mobile device as depicted in FIG. 1A.

Another possible targeting pattern may include multiple (e.g., two) circles. The circles may overlap at the optimal distance from the barcode 104.

Referring to FIG. 1C, an attachment is shown with a target generating mechanism 106c embodied in an encapsulating attachment 100C. The target generating mechanism 106c may be utilized to facilitate rapid and optimal positioning of a mobile device (not shown) with respect to a barcode 104 that the mobile device is attempting to read.

The attachment 100c may include an upper portion 132a and a lower portion 132b which secure together at a part line 134 to encapsulate the mobile device. A display of the mobile device (not shown) may be accessed through a face aperture 136 which may be open or may include a capacitive membrane which is positioned over a touch panel/display of the mobile device. The touch panel may be a capacitive touch panel, resistive touch panel, or other touch panel technology.

The lower portion 132b includes a camera aperture 130 through which a camera of the mobile device has a field of view 114c to the back side of the mobile device.

The lower portion 132b further includes target generating mechanism 106c within an aperture of the lower portion which aligns with an illuminating torch of the mobile device.

The target generating mechanism 106c may include a targeting structure to project a targeting pattern 400 (as also shown in FIG. 2D) within the field of view 114c of the camera. Thus, when the mobile device is being used to read a barcode 104, the user may move the mobile device, as encapsulated within the attachment 100c, until the projected pattern 400 of intense illumination is positioned on and/or within a central portion of the barcode 104, indicating that the barcode 104 is positioned within the center of the camera's field of view 114c.

The target generating mechanism 106c collimates illumination from the torch of the mobile device utilizing a collimating lens and/or a pattern generating surface.

Alternatively, the target generating mechanism 106c may be an interference pattern generating an element or a diffractive element, such as a holographic element that may include one or more diffractive gratings. Alternatively, the target generating mechanism 106c may be a Fresnel type element that has been fabricated with the desired targeting pattern 400 in mind.

Figure 3A:
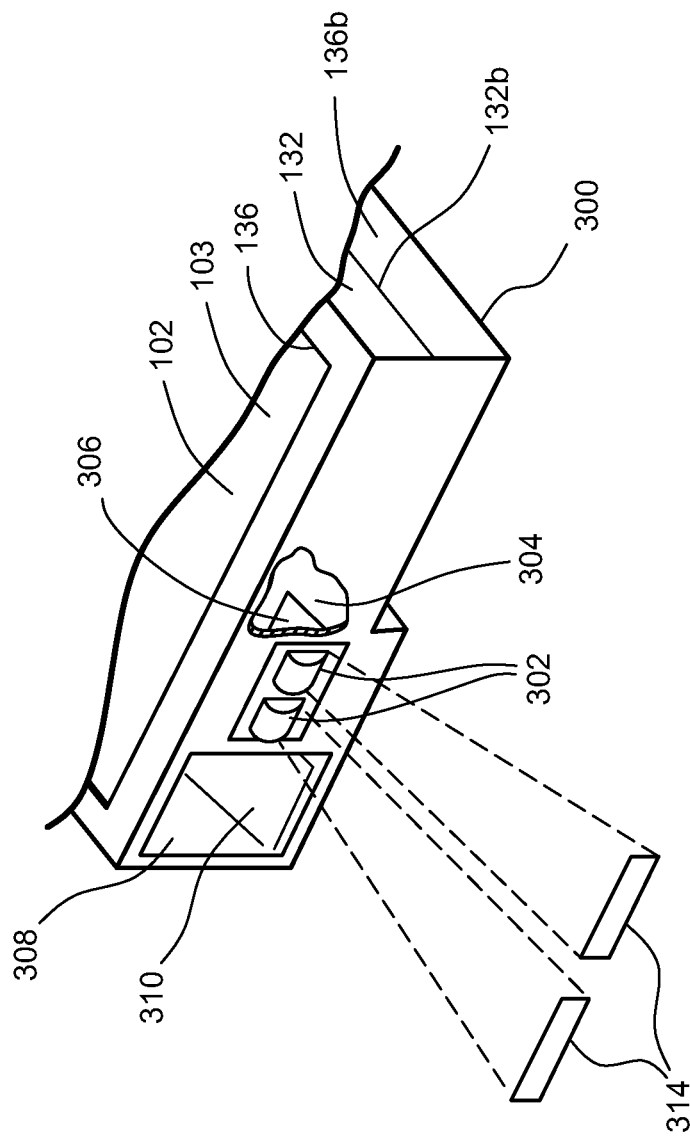
FIGS. 3A and 3B illustrate other examples of a mobile device attachment that includes a targeting generating mechanism.

Referring to FIG. 3A, an attachment 300 is shown with a target generating mechanism 302 which generates a targeting pattern 314 to the top side of the mobile device 102 whereas the attachments depicted in FIGS. 1A, 1B, and 1C include a target generating mechanism which generates the targeting pattern to the back side (i.e., opposite of the display) of the mobile device.

The attachment 300 is embodied as an encapsulating attachment much like attachment 100C depicted in FIG. 1C, but is depicted in only a partial view in FIG. 3A.

The attachment 300 may include a structure as depicted in, and described with respect to, FIG. 10, and include a first mirror 310 within a first chamber 308 within the field of view of the camera (not shown) on the back side of the mobile device 102. The first mirror 310 is positioned at approximately a 45 degree angle to the center line of the field of view of the camera to fold the field of view of the camera by approximately 90 degrees such that the field of view of the camera extends towards a target area to the top of the mobile device 102 instead of to the back side of the mobile device 2702. Stated another way, the field of view of the camera would have a center line that is generally orthogonal to the planar back side of the mobile device 102 (and orthogonal to the planar display on the front side of the mobile device 102) and that extends towards a target area to the back side of the mobile device 102. The mirror 310 is within such field of view and folds the field of view such that its center line is parallel to the back side of the mobile device 102 (and the display on the front side of the mobile device 102) and extends towards a target region to the top side of the mobile device 102. Although not depicted in FIG. 3A, a lens 1182 as depicted in FIG. 11 may be included in the attachment 300.

The target generating mechanism 302 may include a second mirror 306, generally parallel to the first mirror 310 with the illumination of the torch on the back side of the mobile device 102 and may fold the illumination from the torch by approximately 90 degrees towards the top side of the mobile device 102 generally parallel with the folded field of view of the camera.

The target generating mechanism 302 further includes one or more culminating lens structures 302, each of which may project a targeting pattern 314 (similar to the targeting pattern 400 depicted in FIG. 2D) within the folded field of view of the camera. Thus, when the mobile device 102 is being used to read a barcode, the user may move the mobile device 102, as encapsulated within attachment 300, until the projected targeting pattern 314 of intense illumination is positioned on and/or within a central portion of the barcode, indicating that the barcode is positioned within the center of the camera's folded field of view.

As described with respect to FIGS. 1A, 1B, and 1C, the targeting generating mechanism 302, in the alternative, may be an interference pattern generating element; a diffractive element, such as a holographic element that may include one or more diffractive gratings; or a Fresnel lens type of element that has been fabricated with the desired pattern in mind.

As described with respect to FIG. 1C, the attachment 300, like attachment 100c, may include an upper portion 132a and a lower portion 132b which secure together at a part line 134 to encapsulate the mobile device 102. A display 103 of the mobile device 102 may be accessed through a face aperture 136 which may be open or may include a capacitive membrane which is positioned over a capacitive touch panel/display of the mobile device.

It should also be appreciated that the encapsulating attachment 100c of FIG. 1C and 300 of FIG. 3A may, instead of having a part line 134, encapsulate the mobile device 102 using a structure as described with respect to FIGS. 13A, 14A, 14B, 14C, 15A, and/or 15B. Stated another way, the target generating mechanisms described with respect to FIGS. 1A, 1B, 1C, 3A and 3B may be embedded in any of the attachments described with respect to FIGS. 13A, 14A, 14B, 14C, 15A, and/or 15B.

Figure 3B:
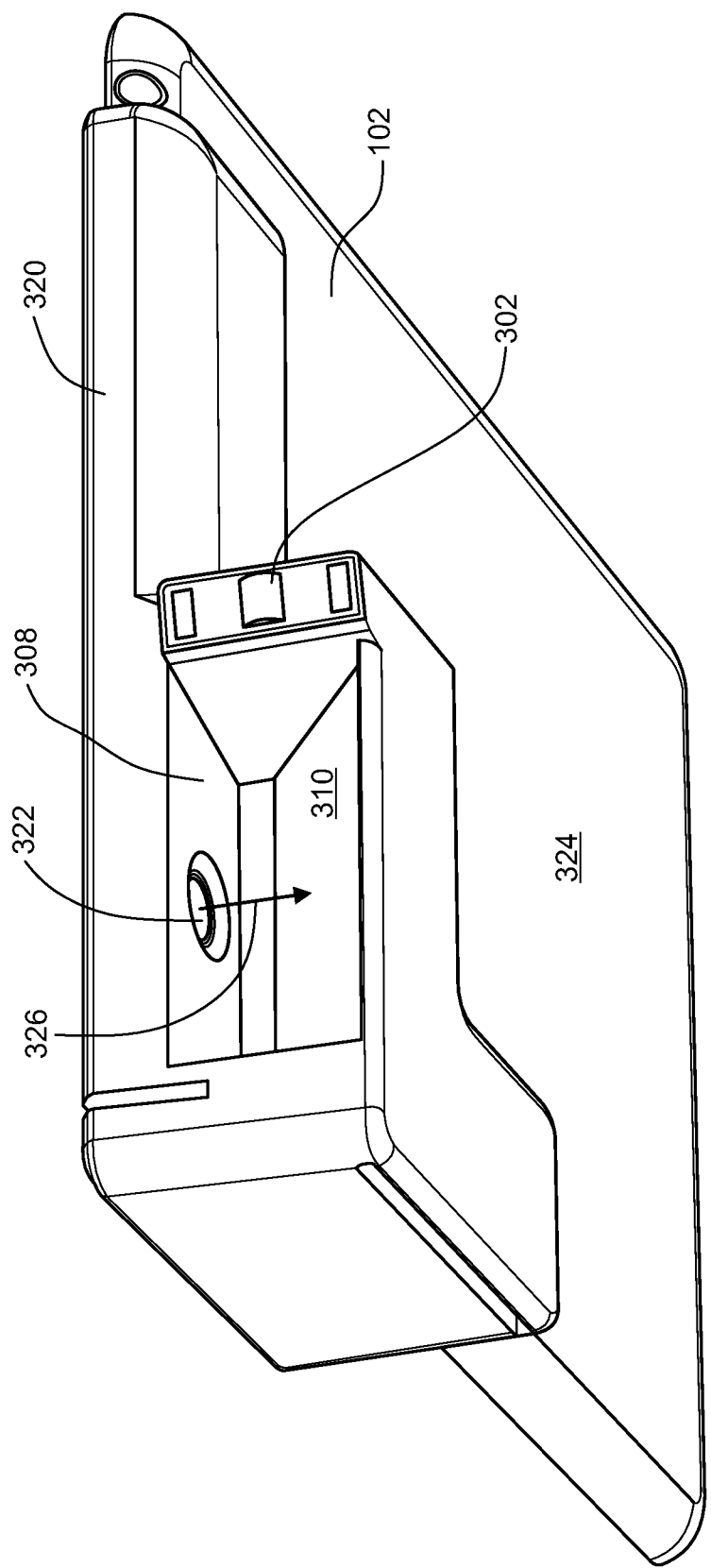

FIG. 3B depicts an attachment 320 which is very similar in structure to attachment 300 of FIG. 3A but is embodied as a corner attachment instead of an encapsulating attachment.

The attachment 320 is shown with a target generating mechanism 302 which generates a targeting pattern (not shown) to the top side of the mobile device 102. The target generating mechanism 302 may include: i) an illumination LED generating the illumination for collimating into a targeting pattern; ii) a mirror redirecting, or folding by approximately 90 degrees, the illumination from an illumination source or torch of the mobile device generating the illumination for collimating into a targeting pattern; or iii) both.

The attachment 320 may, like attachment 300 of FIG. 3A, include the structure depicted in, and described with respect to, FIG. 10, including a first mirror 310 (and a lens, depicted as 1182 in FIG. 11) within a first chamber 308 within the field of view of the camera 322 on the back side of the mobile device 102. Alternatively, the first chamber 308 may include only first mirror 310 without a lens altering the illumination reflected from the target area. The first mirror 310 is positioned at approximately a 45 degree angle to the center line 326 of the field of view of the camera 322 to fold the field of view of the camera by approximately 90 degrees such that the field of view of the camera extends towards a target area to the top of the mobile device 102 instead of to the back side of the mobile device. Stated another way, the field of view of the camera 322 would have a center line 326 that is generally orthogonal to the planar back side of the mobile device 102 (and orthogonal to the planar display on the front side of the mobile device 102) and that extends towards a target area to the back side of the mobile device 102. The mirror 310 is within such field of view and folds the field of view such that its center line is parallel to the back side of the mobile device 102 (and the display on the front side of the mobile device 102) and extends towards a target region to the top side of the mobile device 102.

In one embodiment the target generating mechanism 302 may include a second mirror (not shown in FIG. 3B) generally parallel to the first mirror 310 with the illumination of the torch on the back side of the mobile device 102 and which may fold the illumination from the torch by approximately 90 degrees towards the top side of the mobile device 102 generally parallel with the folded field of view of the camera.

In another embodiment the target generating mechanism 302 may include an illumination source such as one or more LEDs to "Self power" the target generating mechanism 302.

Similar to attachment 100c of FIG. 1C and attachment 300 of FIG. 3A, the target generating mechanism 302 further includes one or more collimating lens structures, each of which, by collimating either the mobile device 102 torch illumination or self powered LED illumination, may project a targeting pattern 314 (similar to the targeting pattern 400 depicted in FIG. 2D) within the folded field of view of the camera.

Thus, when the mobile device 102 is being used to read a barcode, the user may move the mobile device 102, as encapsulated within attachment 300, until the projected targeting pattern 314 of intense illumination is positioned on and/or within a central portion of the barcode, indicating that the barcode is positioned within the center of the camera's folded field of view.

As described with respect to FIGS. 1A, 1B, and 1C, the target generating mechanism 302, in the alternative, may be an interference pattern generating element, a diffractive element, such as a holographic element that may include one or more diffractive gratings, or a Fresnel lens type of element that has been fabricated with the desired pattern in mind.

It should be appreciated that attachment 300, being a corner attachment, includes a top inner surface which, when the attachment 300 is installed on the mobile device 102, abuts the top surface of the mobile device 102 and a side surface abuts a side surface of the mobile device 102. When so abutted, the first mirror 310 aligns with the camera 322 and the target generating mechanism 302 aligns with the torch.

FIGS. 4A, 4B, 4C and 4D represent an attachment 100 with a target generating structure 106 that may be repositioned and used for any embodiments described herein where the illuminating torch, or "flash," of the mobile device provides illumination for a target generating mechanism and/or an exposure illumination system and it is desirable for the illuminating torch to also be capable of operating as the flash for traditional photography utilizing the camera.

Figure 4B:
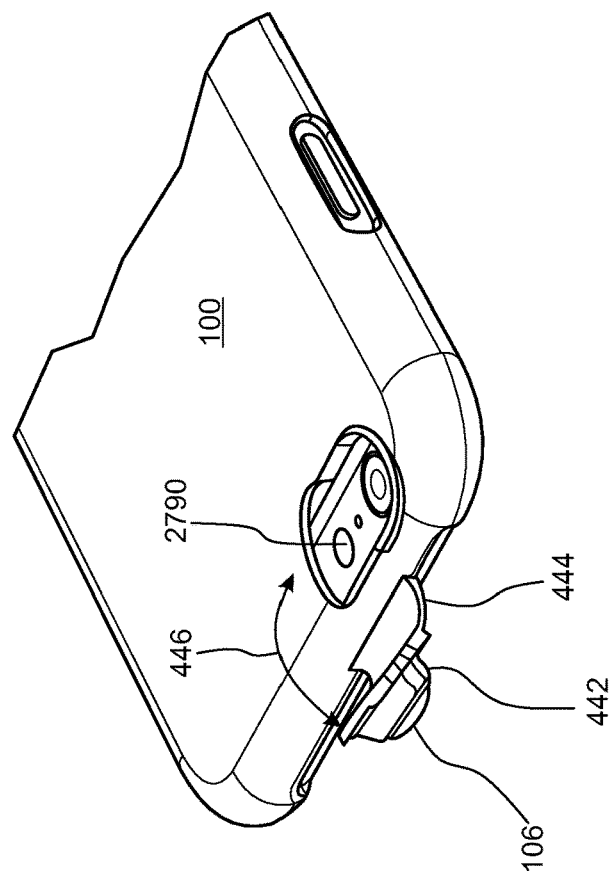
FIGS. 4A and 4B illustrate examples of a mobile device attachment with a target generating structure that can be pivotally repositioned.
Figure 4A:
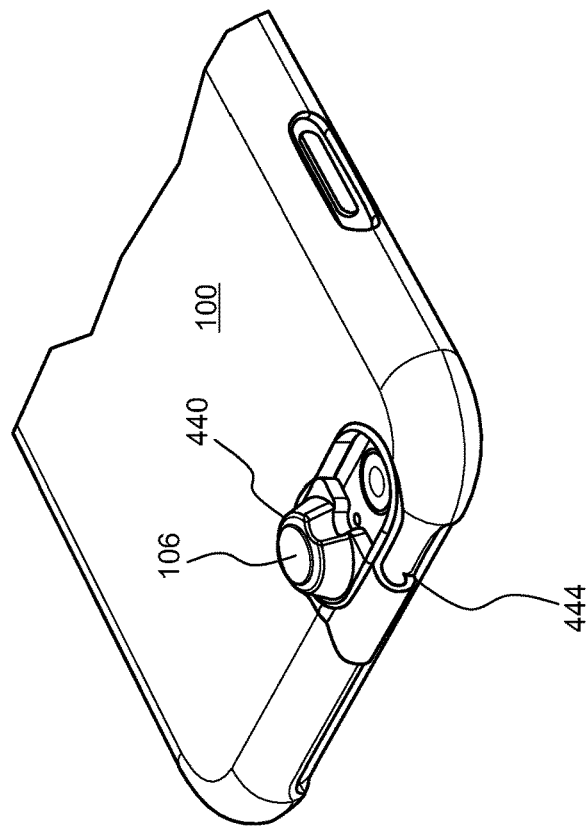

FIGS. 4A and 4B depict the target generating structure 106 being pivotally repositionable between: i) a first position 440 as depicted in FIG. 4A wherein the target generating structure 106 is positioned in front of the illuminating torch such that illumination from the illumination torch is shaped by the target generating structure 106 into a targeting pattern; and ii) a second position 442 as depicted in FIG. 4B wherein the target generating structure 106 is positioned outside of the torch illumination field of the illuminating torch 2790 such that illumination from the illuminating torch 2790 is unmodified by the target generating structure 106 and can be used for illumination when using the camera of the mobile device to take photographic pictures. As depicted in FIGS. 4A and 4B, the target generating structure 106 may be secured to the attachment 100 by a flexible band 444 such that the target generating structure 106 may be pivoted in the direction 446 between position 440 and position 442 by flexure of the flexible band. It is also envisioned that a more traditional hinge/hinge pin structure may also provide for pivoting the target generating structure 106 between position 440 and position 442 in other embodiments.

Figure 4D:
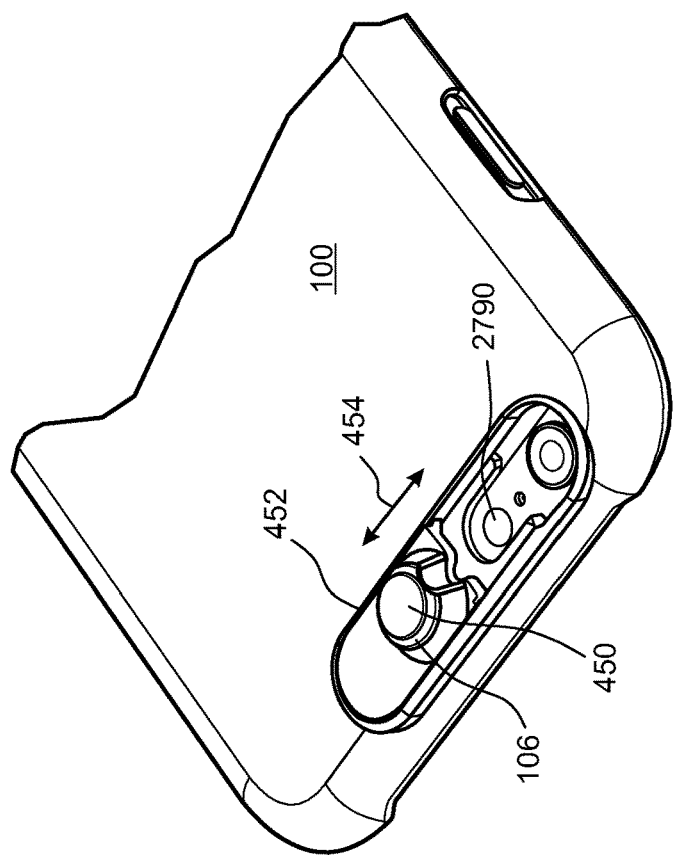
FIGS. 4C and 4D illustrate examples of a mobile device attachment with a target generating structure that can be laterally repositioned.
Figure 4C:
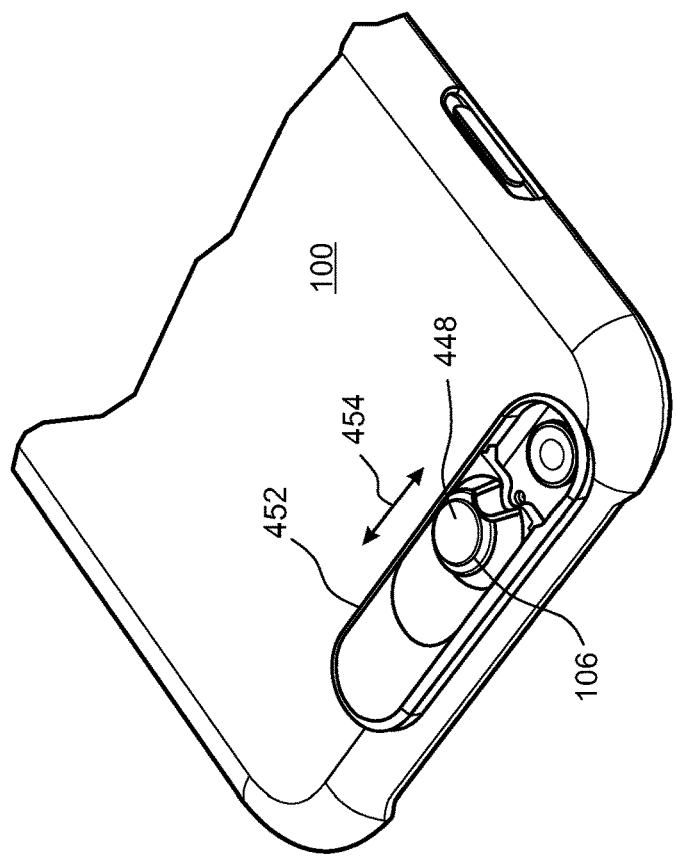

FIGS. 4C and 4D depict the target generating structure 106 being laterally repositionable between: i) a first position 448 as depicted in FIG. 4C wherein the target generating structure 106 is positioned in front of the illuminating torch 2790 such that illumination from the illumination torch 2790 is shaped by the target generating structure 106 into a targeting pattern; and ii) a second position 450 as depicted in FIG. 4D wherein the target generating structure 106 is positioned outside of the torch illumination field of the illuminating torch 2790 such that illumination from the illuminating torch 2790 is unmodified by the target generating mechanism 106 and can be used for illumination when using the camera of the mobile device to take photographic pictures. As depicted in FIGS. 4C and 4D, the target generating structure 106 may be secured to the attachment 100 within a channel 452 such that the target generating structure 106 may be laterally repositioned in the direction 454 between position 448 and position 450.

Proximity Sensor

FIGS. 5A-5B illustrate an example of a mobile device attachment 500 that includes a proximity sensor 538. The proximity sensor 538 may determine the distance 540 between the camera 512 and a barcode 504 that the mobile device 502 is attempting to read. The proximity sensor 538 may then provide distance information 542 about this distance 540 to the camera 512.

The attachment 500 may include an interface 544 between the proximity sensor 538 and the camera 512. The interface 544 may facilitate communication of the distance information 542 from the proximity sensor 538 to the camera 512 (e.g., to a control program 552 running on the camera 512). More specifically, the interface 544 may receive electrical signals 546 from the proximity sensor 538. The electrical signals 546 may indicate the distance 540 between the camera 512 and the barcode 504 that the mobile device 502 is attempting to read. The interface 544 may convert the electrical signals 546 into distance information 542 that is in a format that the camera 512 is capable of understanding. Alternatively, the electrical signals 546 from the proximity sensor 538 may be sent to the control program 552 using a connector supported by the mobile device 502 or wirelessly.

The attachment 500 may also include circuitry 548 that sends control signals 550 to the camera 512. The control signals 550 may cause the camera 512 to use the distance information 542 from the proximity sensor 538 to assist with focusing appropriately.

For example, referring to FIG. 6, the control signals 550 may cause the camera 512 to disable the camera's auto-focusing feature (step S602) and set the camera's focus value based on the distance information 542 that is provided by the proximity sensor 538 (step S604).

Alternatively, referring to FIG. 7, the control signals 550 may cause the camera 512 to temporarily disable the camera's auto-focusing feature (step S702) and set the camera's focus value based on the distance information 542 that is provided by the proximity sensor 538 (step S704). Then, the camera 512 may subsequently re-enable the camera's auto-focusing feature after the camera's focus value has been set based on the distance information 542 (step S706).

Illumination Optimized for Barcode Reading

FIGS. 8A-8B illustrate an example of a mobile device attachment 800 that includes illumination that is optimized for barcode reading. The attachment 800 may be used in connection with a mobile device 802 that includes a light source 852 that provides white illumination. This light source 852 may be referred to herein as a white light source 852 (also commonly referred to as a torch and interchangeably referred to as a torch in this application) and could include any light source for projecting illumination into a target area for illuminating an object for image capture. The mobile device 802 may also include a lens 854.

The attachment 800 may include one or more single-color light sources 856. The single-color light sources 856 may be light-emitting diodes (LEDs). The single-color light sources 856 may provide red illumination (i.e., illumination having a wavelength of about 650 nm).

The attachment 800 may include circuitry 858 that activates and deactivates the single-color light sources 856. This circuitry 858 may be referred to herein as activation/deactivation circuitry 858. In addition, the attachment 800 may include circuitry 860 that detects when the white light source 852 of the mobile device 802 is activated and when the white light source 852 of the mobile device 802 is deactivated. This circuitry 860 may be referred to herein as illumination detection circuitry 860.

The activation/deactivation circuitry 858 may activate the single-color light sources 856 in response to the white light source 852 of the mobile device 802 being activated. Similarly, the activation/deactivation circuitry 858 may deactivate the single-color light sources 856 in response to the white light source 852 of the mobile device 802 being deactivated.

For example, when the illumination detection circuitry 860 detects that the white light source 852 of the mobile device 802 has been activated, the illumination detection circuitry 860 may send control signals 862 to the activation/deactivation circuitry 858 that cause the activation/deactivation circuitry 858 to activate the single-color light sources 856. Conversely, when the illumination detection circuitry 860 detects that the white light source 852 of the mobile device 802 has been deactivated, the illumination detection circuitry 860 may send control signals 862 to the activation/deactivation circuitry 858 that cause the activation/deactivation circuitry 858 to deactivate the single-color light sources 856.

FIG. 9 illustrates another example of a mobile device attachment 900 that includes illumination that is optimized for barcode reading. The mobile device 902 includes a white light source 952. The attachment 900 includes a light pipe 964 that redirects white illumination 966 provided by the white light source 952 of the mobile device 902. Single-color filters 968a, 968b (e.g., red filters) within the light pipe 964 filter the redirected white illumination 966, so that single-color illumination 970a, 970b (e.g., red illumination) is directed toward the target area 910. A barcode 904 that is to be read through the use of the mobile device 902 and the attachment 900 may be present at the target area 910.

The light pipe 964 may be configured so that the single-color illumination 970a, 970b is offset from the camera's image sensor 972 in order to prevent glare. In other words, the single-color illumination 970a, 970b may be directed toward the target area 910 from locations that are not directly in front of the camera's image sensor 972.

Optics that Change the Optical Path to the Mobile Device

With many mobile devices, the focusing lens for the image sensor is located on the back side of the mobile device. Therefore, in order to attempt to read a barcode, the mobile device must be positioned so that the back side of the mobile device is aimed at the barcode.

FIG. 10 illustrates an example of a mobile device attachment 1000 that includes a mirror 1074 that changes the optical path to the mobile device 1002. The attachment 1000 permits a user of the mobile device 1002 to attempt to read a barcode 1004 by aiming the top side 1076 of the mobile device 1002 at the barcode 1004. Light 1078 is reflected from the barcode 1004 and redirected by the mirror 1074 toward the mobile device's focusing lens 1054, which focuses the reflected light 1078 onto the mobile device's image sensor 1072.

In the depicted example, the mirror 1074 is positioned so that the reflected light 1078 is redirected by 90°. Alternatively, however, the mirror 1074 may be positioned so that the reflected light 1078 is redirected by a different angle.

Supplementary Lens System Optimized for Barcode Reading

FIG. 11 illustrates an example of a mobile device attachment 1100 that includes a supplementary lens system that is optimized for barcode reading. The mobile device attachment 1100 may be attached to a mobile device 1102.

The supplementary lens system may include an aperture 1180. The aperture 1180 limits the amount of light that reaches the camera's image sensor 1172 through the camera's lens 1154. This may improve the depth of field of the camera 1112. With enhanced depth of field, the need for auto-focusing is reduced and decode response is improved.

The supplementary lens system may include a lens 1182 that is optimized for barcode reading. For example, the lens 1182 may minimize distortion. The lens 1182 can produce images having a relatively small field of view and a relatively large barcode element size, thus making it easier to read barcodes with small printing size (e.g., between 3 millimeters and 6 millimeters).

The supplementary lens system may include a single-color filter 1184 (e.g., a red filter). The single-color filter 1184 may be positioned in front of the lens 1182 that is optimized for barcode reading.

Activation of Components that Improve Barcode Reading Capabilities

As indicated above, this patent specification describes an attachment for a mobile device, wherein the attachment includes one or more components that improve the barcode reading capabilities of the mobile device. An attachment as described herein may be configured to automatically activate the components that improve the barcode reading capabilities of the mobile device in response to a detectable signal provided by the mobile device. This signal may include, for example, a recognizable illumination pattern of the mobile device.

Figure 12:
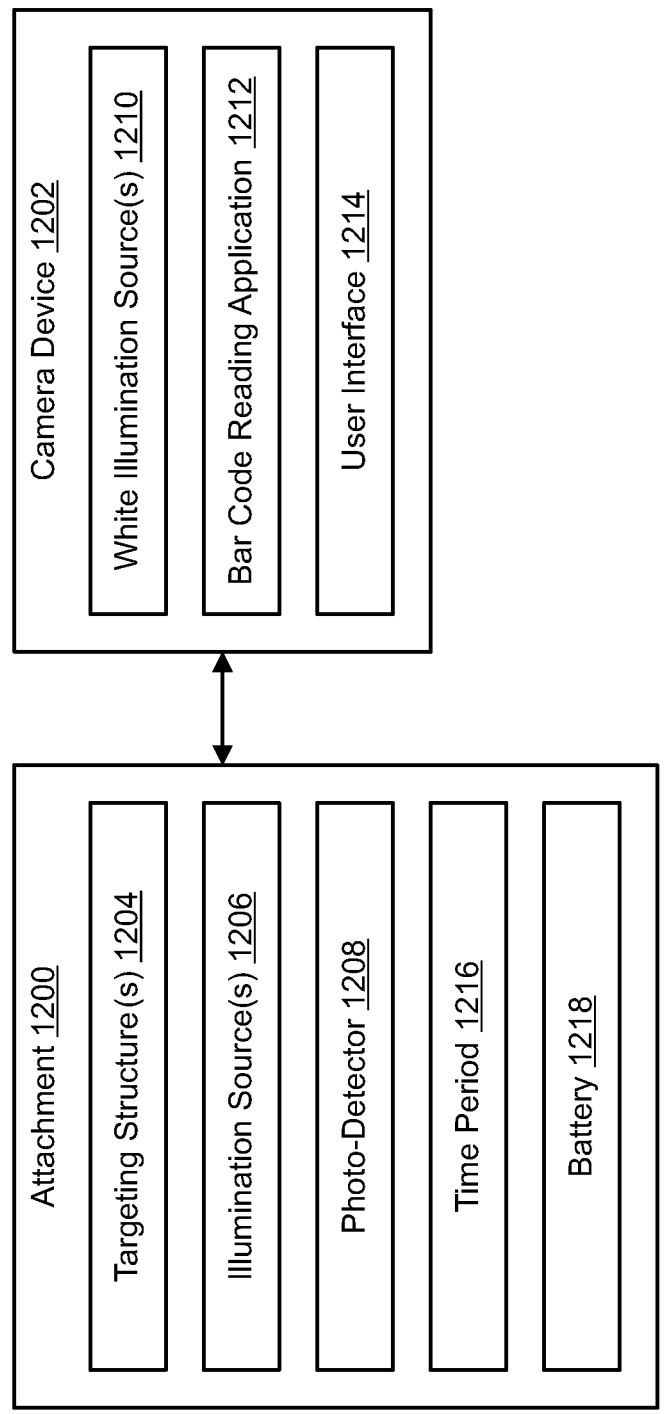
FIG. 12 illustrates an example of a mobile device attachment that automatically activates the components that improve the barcode reading capabilities of the mobile device in response to a detectable signal provided by the mobile device.

An example will be described in relation to FIG. 12, which illustrates an attachment 1200 for a mobile device 1202. The attachment 1200 may include one or more targeting structures 1204. The targeting structure(s) 1204 may be similar to the targeting structures 106a, 106b shown in FIG. 1B. The targeting structure(s) 1204 may produce targeting beams, which may be similar to the targeting beams 108a, 108b shown in FIG. 1B.

The attachment 1200 may also include one or more illumination sources 1206. The illumination source(s) 1206 may be similar to the single-color light sources 856 shown in FIG. 8A.

The attachment 1200 may also include a photo-detector 1208. The photo-detector 1208 may be an image sensor.

The mobile device 1202 may include one or more white illumination sources 1210. In addition, the mobile device 1202 may include a barcode reading application 1212.

The mobile device 1202 may be used to attempt to read a barcode (such as the barcode 104 shown in FIG. 1A). The barcode reading application 1212 may receive user input to begin attempting to read the barcode. For example, the user may press a "scan" button that is displayed via a user interface 1214 of the mobile device 1202. In response, the white illumination source(s) 1210 of the mobile device 1202 may be activated and deactivated in accordance with a pattern that is recognizable to the photo-detector 1208 in the attachment 1200. For example, the white illumination source(s) 1210 of the mobile device 1202 may be briefly turned on and then turned off again.

The photo-detector 1208 in the attachment 1200 may detect this pattern. In response, the targeting structure(s) 1204 and the illumination source(s) 1206 of the attachment 1200 may be activated for a defined time period 1216. This time period 1216 may be configurable. During this time period 1216, the user can aim the targeting beams at the barcode and use the mobile device 1202 to attempt to read the barcode.

The attachment 1200 may include its own battery 1218 to power the photo-detector 1208, the targeting structure(s) 1204 and the illumination source(s) 1206.

Attachments with Protective Cases, Batteries, and/or Magnetic Stripe Readers

Figure 13C:
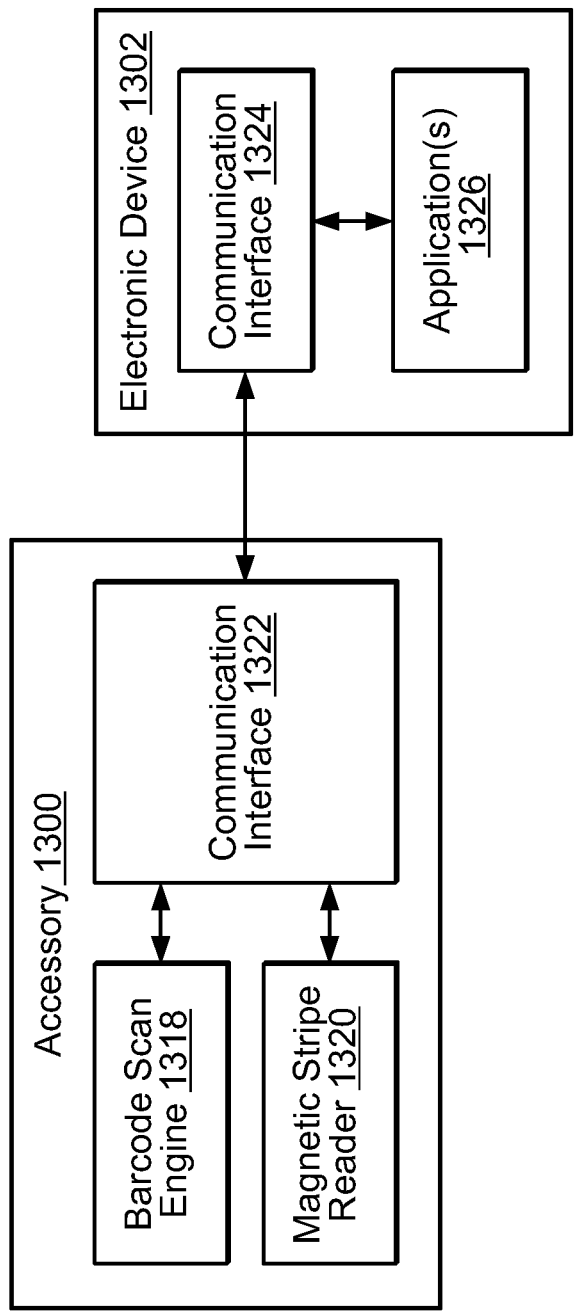

FIGS. 13A through 13C illustrate one configuration of an attachment 1300 for a mobile device 1302. The attachment 1300 includes a protective case 1304. The electronic device 1302 is insertable into the protective case 1304. When the electronic device 1302 has been inserted into the protective case 1304, the protective case 1304 provides a relatively hard outer shell that encompasses the side portions and the back portion of the electronic device 1302. The display screen 1306 of the electronic device 1302 remains visible, but may be protected by a clear cover, after the electronic device 1302 has been inserted into the protective case 1304.

In the depicted configuration, it is assumed that the electronic device 1302 is a smartphone or a portable media player. Consequently, the attachment 1300 is shaped so that a smartphone or a portable media player may be inserted into the attachment 1300. However, alternative configurations of an attachment in accordance with the present disclosure may be designed and shaped for use in connection with other types of electronic devices, including any of those mentioned previously.

The attachment 1300 includes a battery 1308 that provides auxiliary power to the electronic device 1302. The attachment 1300 may be configured so that when the electronic device 1302 is not connected to a DC power source and the internal battery of the electronic device 1302 becomes depleted, the electronic device 1302 receives power from the battery 1308 of the attachment 1300. Thus, the attachment 1300 may perform the function of extending the life of the electronic device's 1302 internal battery. The battery 1308 also provides power to the attachment 1300.

The battery 1308 is replaceable without having to remove the electronic device 1302 from the protective case 1304. The protective case 1304 includes a back side 1314 (shown in FIG. 13B). An exterior surface of the back side 1314 of the protective case 1304 includes a battery cover 1316. Replacing the battery 1308 comprises opening the battery cover 1316, removing the battery 1308 from the attachment 1300, inserting a new battery into the attachment 1300, and closing the battery cover 1316.

In the depicted configuration, opening the battery cover 1316 comprises sliding the battery cover 1316 in one direction, and closing the battery cover 1316 comprises sliding the battery cover 1316 in the opposite direction. The battery cover 1316 does not become detached from the protective case 1304 when the battery cover 1316 is opened or closed. However, other types of configurations may be utilized instead. For example, in one alternative configuration, the battery cover may be opened by completely detaching the battery cover from the protective case, and the battery cover may be closed by reattaching the battery cover to the protective case. In another alternative configuration, the battery cover may be attached to the protective case via a hinge. In such a configuration, the battery cover may be opened by lifting up on one side of the cover, and the battery cover may be closed by pushing down on the same side of the battery cover.

The battery 1308 may be rechargeable. There are many different types of rechargeable batteries 1308 that may be used (e.g., lithium-ion, lithium-ion polymer, nickel-cadmium, nickel-metal hydride, etc.). The attachment 1300 comprises a power interface 1310 that enables the attachment 1300 to be connected to a power source (e.g., an electrical outlet, a personal computer, a docking station, etc.) in order to charge the battery 1308. The power interface 1310 may comprise a type of USB interface (e.g., micro, mini, or standard).

The attachment 1300 also comprises a barcode scan engine 1318, which scans and decodes barcodes. The barcode scan engine 1318 may be configured to scan and decode one-dimensional and/or two-dimensional barcodes. The barcode scan engine 1318 may be, for example, the Code Reader™ 8000 Scan Engine, which is sold commercially by The Code Corporation (the assignee of the present application). However, another barcode scan engine 1318 may be utilized instead.

The attachment 1300 may also include a magnetic stripe reader 1320, which reads magnetic stripe cards. A magnetic stripe card is a type of card that includes a band of magnetic material (referred to as a magnetic stripe), and that stores data by modifying the magnetism of iron-based magnetic particles on the magnetic stripe. Examples of magnetic stripe cards include credit cards, driver's licenses, access badges, etc.

The attachment 1300 also includes a communication interface 1322 (shown in FIG. 13C). The electronic device 1302 may include a similar communication interface 1324. The communication interfaces 1322, 1324 may be, for example, RS232 interfaces. Data that is generated by the barcode scan engine 1318 and data that is generated by the magnetic stripe reader 1320 may be provided to the electronic device 1302 via the communication interfaces 1322, 1324. The electronic device 1302 may include one or more applications 1326 that read the communication interface 1324 in order to obtain the data from the barcode scan engine 1318 and/or the magnetic stripe reader 1320.

Attachments with Two-Part Cases

Figure 14C:
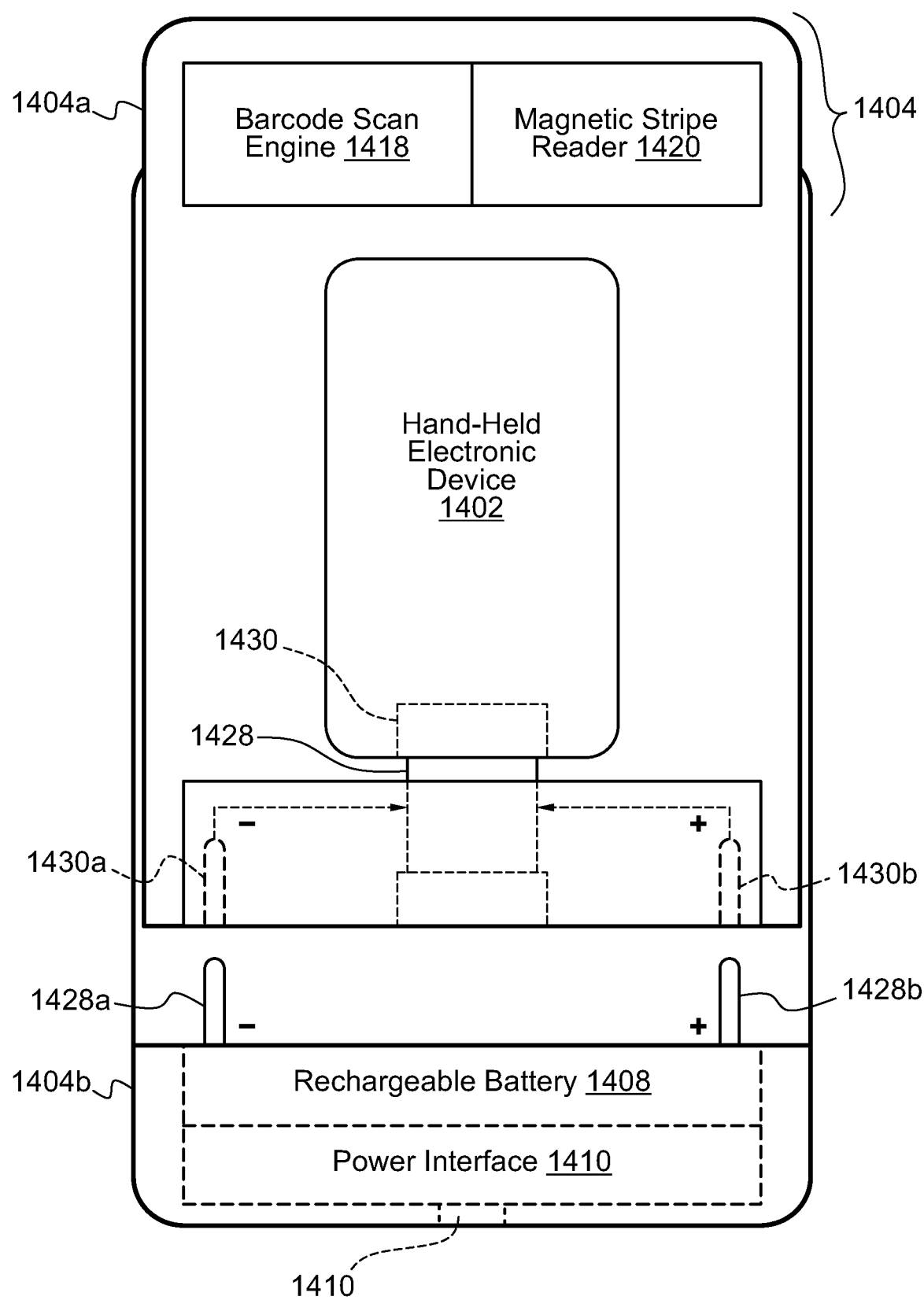

FIGS. 14A through 14C illustrate another configuration of an attachment 1400 for a mobile device 1402. This attachment 1400 is similar to the attachment 1300 described previously, except as indicated below.

In this attachment 1400, the protective case 1404 comprises a first part 1404*a* and a second part 1404*b*. The electronic device 1402 is insertable into the first part 1404*a* of the protective case 1404. The first and second parts 1404*a*, 1404*b* of the protective case 1404 are detachable from one another, as shown in FIG. 14A. The first and second parts 1404*a*, 1404*b* are also attachable to one another, as shown in FIG. 14B.

Attaching the first and second parts 1404*a*, 1404*b* comprises positioning the first and second parts 1404*a*, 1404*b* in the manner shown in FIG. 14A, and then sliding the second part 1404*b* into the first part 1404*a* such that connectors 1428*a*, 1428*b* in the second part 1404*b* engage receptacles 1430*a*, 1430*b* in the first part 1404*a*. Friction or a mechanical latch between the connectors 1428*a*, 1428*b* and the receptacles 1430*a*, 1430*b* keep the first and second parts 1404*a*, 1404*b* attached to one another.

FIG. 14B shows the protective case 1404 with the first and second parts 1404*a*, 1404*b* attached together. As shown in FIG. 14C, when the first and second parts 1404*a*, 1404*b* are attached, there is an electrical connection between the rechargeable battery 1408 and the electronic device 1402, so that the rechargeable battery 1408 can provide power to the electronic device 1402 when needed.

FIG. 14C also shows that the first part 1404*a* of the protective case 1404 comprises a barcode scan engine 1418 and a magnetic stripe reader 1420. The second part 1404b of the protective case 1404 comprises the rechargeable battery 1408 and a power interface 1410 that allows the attachment 1400 to be connected to a power source in order to charge the battery 1408. In an alternative configuration, the power interface 1410 may be included in the first part 1404a of the protective case 1404.

The battery 1408 is replaceable without having to remove the electronic device 1402 from the protective case 1404. Replacing the battery 1408 comprises detaching the second part 1404b of the protective case 1404 from the first part 1404a of the protective case 1404, and attaching a replacement second part (which includes a new battery) to the first part 1404a.

Figure 15C:
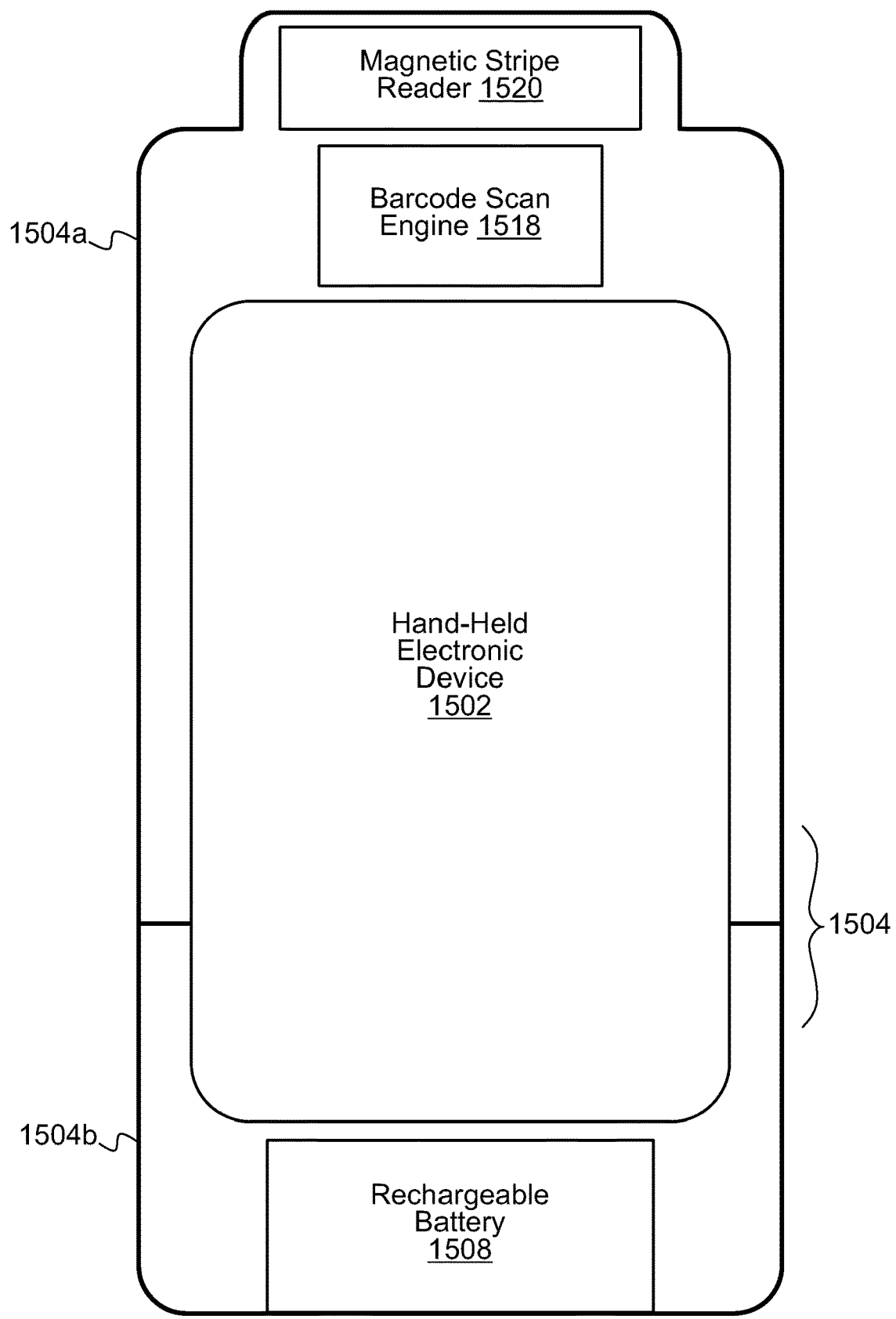

FIGS. 15A through 15C illustrate another configuration of an attachment 1500 for a mobile device 1502. This attachment 1500 is similar to the attachment 1400 described previously, except as indicated below.

In this attachment 1500, inserting the electronic device 1502 into the protective case 1504 comprises pushing the top part of the electronic device 1502 into the first part 1504a of the protective case 1504, and sliding the second part 1504b of the protective case 1504 onto the bottom part of the electronic device 1502. After the electronic device 1502 has been inserted into the protective case 1504, the protective case 1504 remains in place for at least two reasons. First, the dimensions of the first and second parts 1504a, 1504b are such that the electronic device 1502 fits tightly within them. Second, the interior portions of the first and second parts 1504a, 1504b comprise felt pads 1532. Friction between the felt pads 1532 and the electronic device 1502 also helps to keep the protective case 1504 in place.

The battery 1508 is replaceable without having to remove the electronic device 1502 from the protective case 1504. Replacing the battery 1508 comprises removing the second part 1504b of the protective case 1504 from the bottom part of the electronic device 1502, and sliding a replacement second part (which includes a new battery) onto the bottom part of the electronic device 1502. The attachment 1500, and more specifically, the first part 1504a of the protective case 1504, may have a power interface 1510 that allows the attachment 1500 to be connected to a power source in order to charge the battery 1508, a barcode scan engine 1518, and a magnetic stripe reader 1520.

Charging the Electronic Device Battery with the Attachment Battery

Figure 16A:
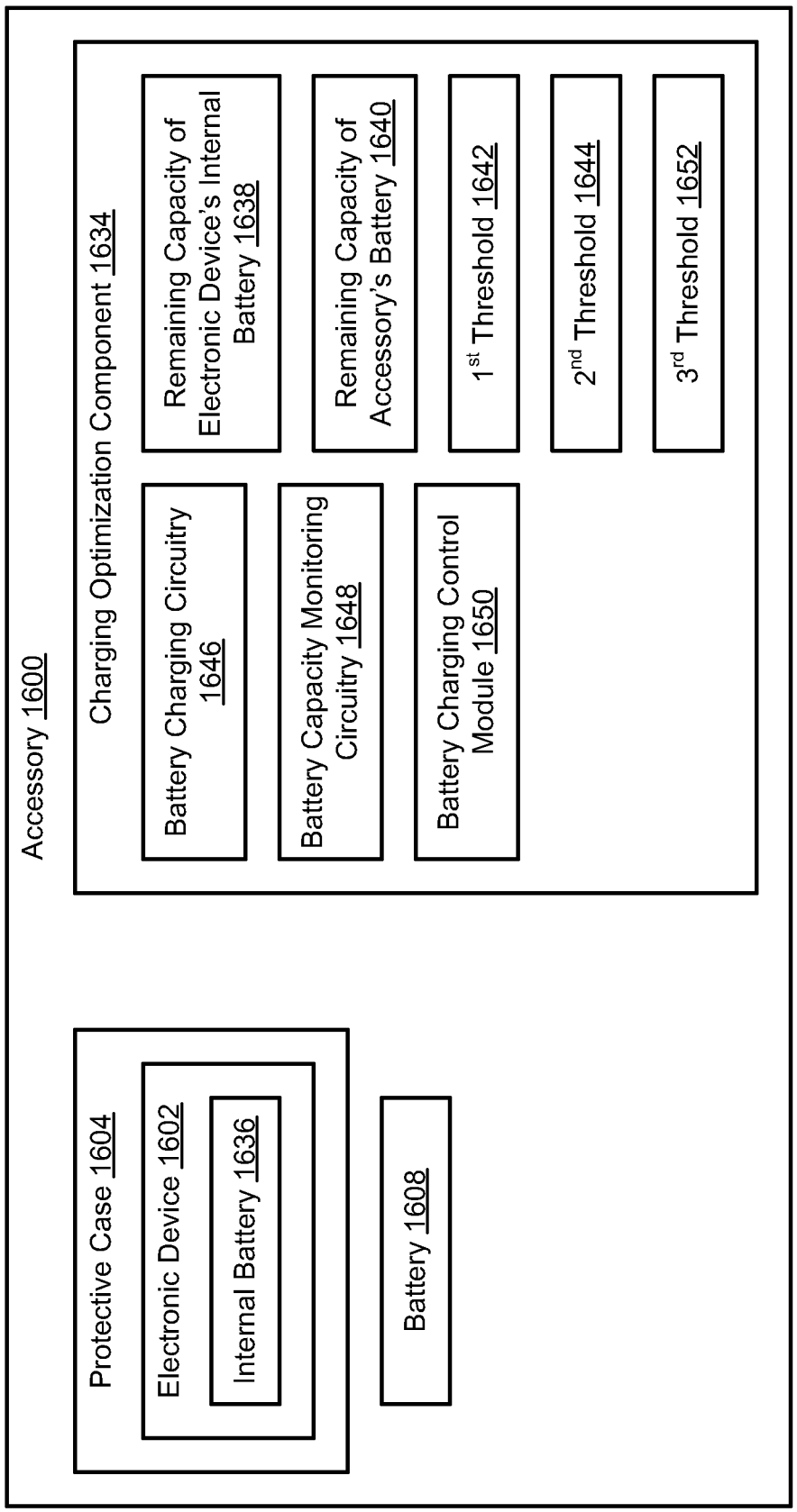
FIGS. 16A through 16B illustrate another configuration of an attachment for a mobile device.

Another attachment 1600 for a mobile device 1602 will be described in connection with FIGS. 16A and 16B. The attachment 1600 includes a battery 1608 that provides auxiliary power to the electronic device 1602. The attachment 1600 also includes a component 1634 that is configured to charge an internal battery 1636 of the electronic device 1602 from the attachment's battery 1608 based on the remaining capacity 1638 of the electronic device's internal battery 1636 and the remaining capacity 1640 of the attachment's battery 1608. This component 1634 may be referred to as a charging optimization component 1634.

Figure 16B:
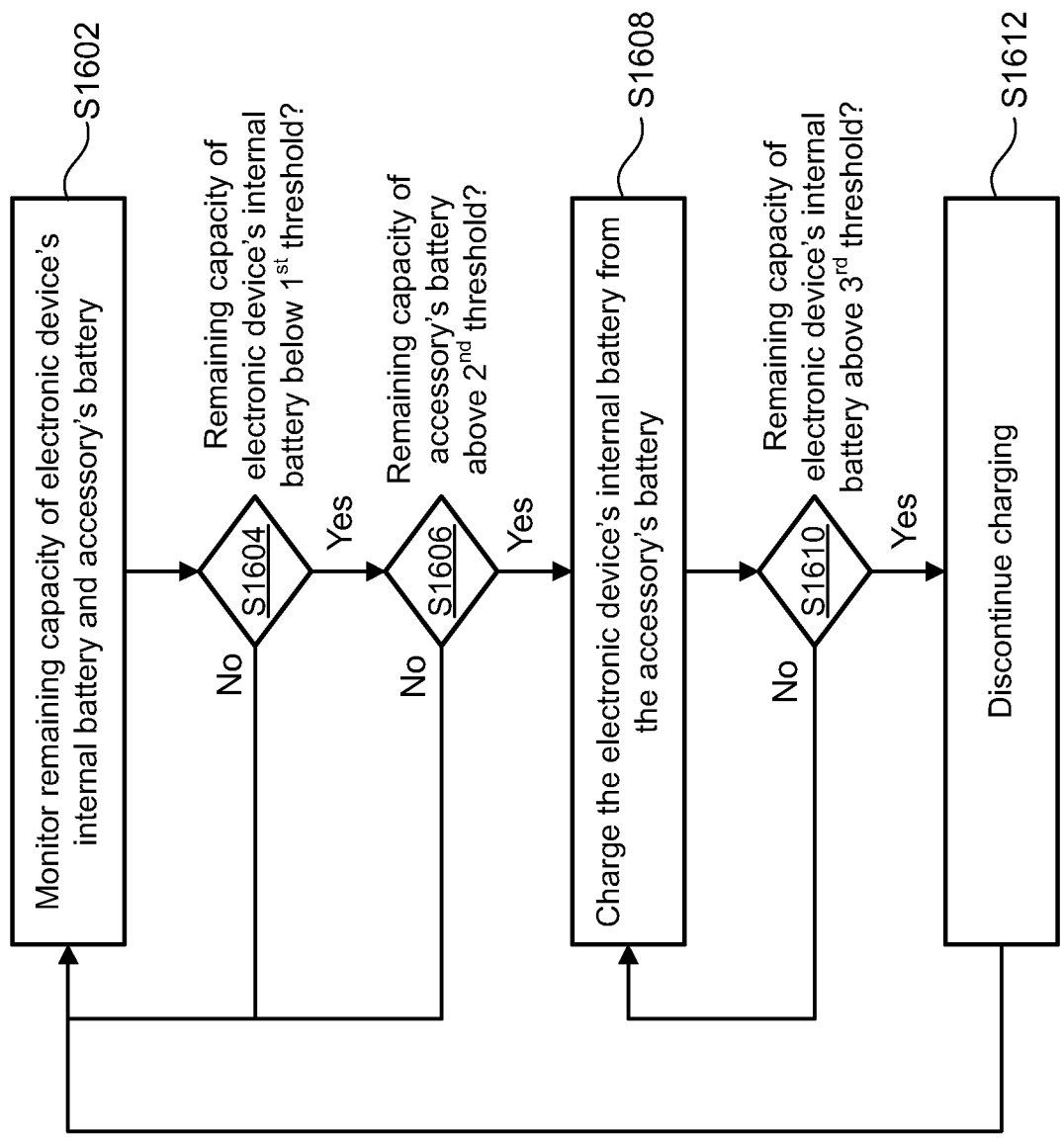

The charging optimization component 1634 may be configured to operate as shown in FIG. 16B. In step S1602, the charging optimization component 1634 may monitor the remaining capacity 1638 of the electronic device's internal battery 1636 and the remaining capacity 1640 of the attachment's battery 1608. In step S1604, the charging optimization component 1634 may determine whether the remaining capacity 1638 of the electronic device's internal battery 1636 is below the first threshold 1642. If so, then in step S1606 the charging optimization component 1634 may determine whether the remaining capacity 1640 of the attachment's battery 1608 is above the second threshold 1644. If so, then in step S1608 the charging optimization component 1634 may charge the electronic device's internal battery 1636 from the attachment's battery 1608.

Charging may continue until the remaining capacity 1638 of the electronic device's internal battery 1636 is above a third threshold 1652. More specifically, in step S1610, it may be determined whether the remaining capacity 1638 of the electronic device's internal battery 1636 is above the third threshold 1652. If not, then the charging performed in step S1608 may continue. However, once it is determined that the remaining capacity 1638 of the electronic device's internal battery 1636 is above the third threshold 1652, then in step S1612 charging may be discontinued. The third threshold 1652 is higher than the first threshold 1642, and may also be higher than the second threshold 1644.

The charging optimization component 1634 may include battery charging circuitry 1646 that charges the electronic device's internal battery 1636 from the attachment's battery 1608. Charging the electronic device's internal battery 1636 from the attachment's battery 1608 involves putting additional energy into the electronic device's internal battery 1636, where such additional energy is supplied by the attachment's battery 1608.

The charging optimization component 1634 may also include battery capacity monitoring circuitry 1648 that monitors the remaining capacity 1638 of the electronic device's internal battery 1636 and that also monitors the remaining capacity 1640 of the attachment's battery 1608. The charging optimization component 1634 may also include a battery charging control module 1650 that controls the operation of the battery charging circuitry 1646 based on input from the battery capacity monitoring circuitry 1648.

For example, the battery capacity monitoring circuitry 1648 may notify the battery charging control module 1650 about the remaining capacity 1638 of the electronic device's internal battery 1636 and the remaining capacity 1640 of the attachment's battery 1608. If the remaining capacity 1638 of the electronic device's internal battery 1636 is below the first threshold 1642 and the remaining capacity 1640 of the attachment's battery 1608 is above the second threshold 1644, then the battery charging control module 1650 may cause the battery charging circuitry 1646 to charge the electronic device's internal battery 1636 from the attachment's battery 1608. For example, the battery charging control module 1650 may send control signals to the battery charging circuitry 1646, and these control signals may cause the battery charging circuitry 1646 to charge the electronic device's internal battery 1636 from the attachment's battery 1608. As indicated above, this charging may continue until the remaining capacity 1638 of the electronic device's internal battery 1636 is above the third threshold 1652.

However, if the remaining capacity 1638 of the electronic device's internal battery 1636 is not below the first threshold 1642 and/or the remaining capacity 1640 of the attachment's battery 1608 is not above the second threshold 1644, then the battery charging control module 1650 may cause the battery charging circuitry 1646 to refrain from charging the electronic device's internal battery 1636 from the attachment's battery 1608. For example, the battery charging control module 1650 may take no action at all, and such inaction may cause the battery charging circuitry 1646 to refrain from charging the electronic device's internal battery 1636 from the attachment's battery 1608.

The battery charging circuitry 1646 and the battery capacity monitoring circuitry 1648 may be implemented via hardware. The battery charging control module 1650 may be implemented via software.

The attachment 1600 may include a protective case 1604, which may be similar to any of the protective cases 1304, 1404, 1504 described previously. The electronic device 1602 may be insertable into the protective case 1604.

Attachments with Additional Optics

Figure 17A:
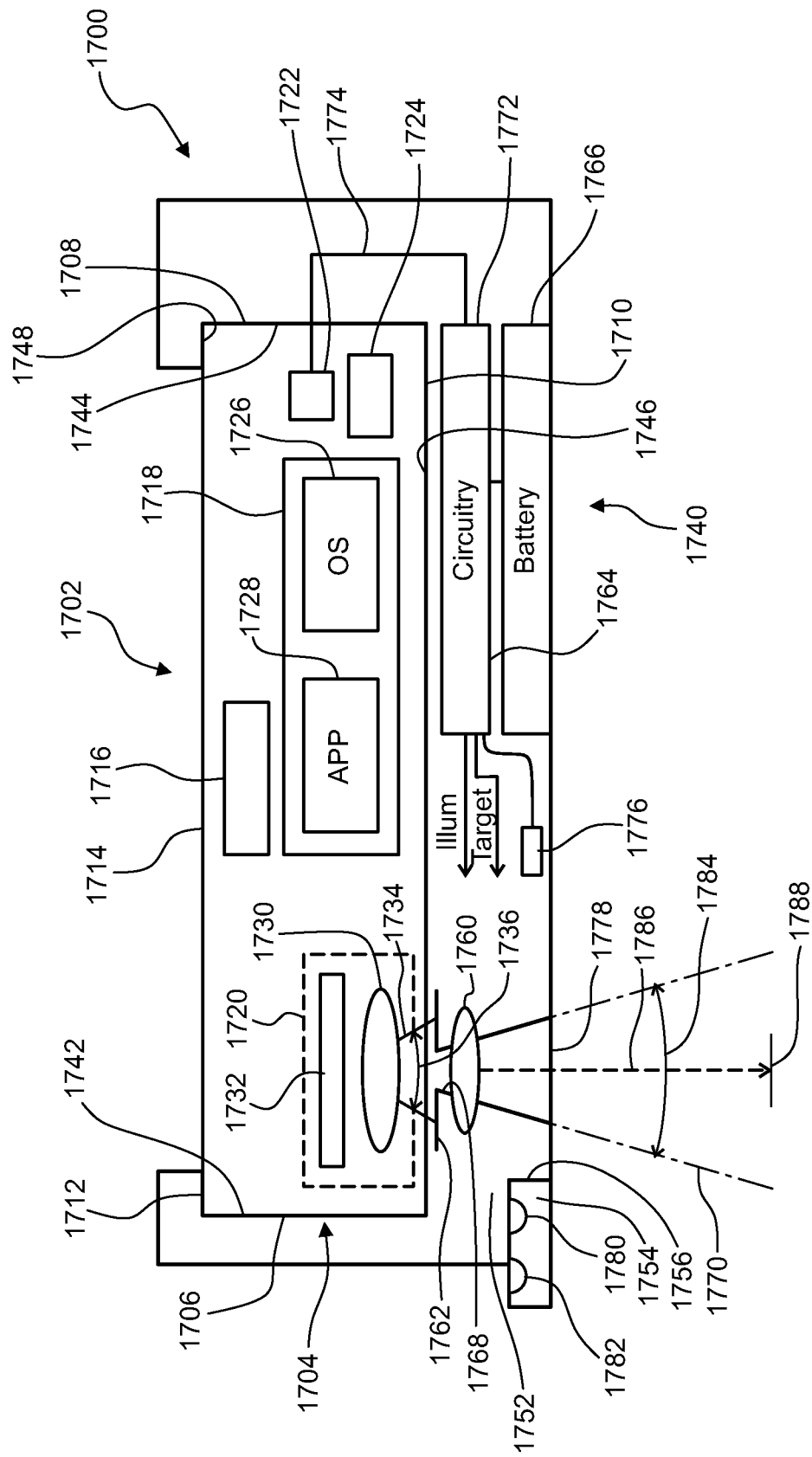
FIGS. 17A through 17B illustrate two additional configurations of attachments for mobile devices.

FIG. 17A illustrates an attachment 1700 for a mobile device 1702 according to another embodiment. As shown, the attachment 1700 may be of the encapsulating type referenced previously, and may thus be designed to substantially contain the mobile device 1702. The attachment 1700 may optionally act as a protective case for the mobile device 1702 in addition to providing enhanced barcode reading capability.

The mobile device 1702 may be of any known type, including but not limited to smartphones, tablets, and smartphone/tablets ("phablets). The mobile device 1702 may have a variety of components, some of which are illustrated in FIG. 17A. For example, the mobile device 1702 may have a housing 1704 that contains and/or retains the remaining components of the mobile device 1702. The housing 1740 may a plurality of external surfaces, such as a top surface 1706, a bottom surface 1708, a back surface 1710, and a bezel 1712. Any of these surfaces may abut an attachment according to the present disclosure.

In the embodiment of FIG. 17A, the attachment 1700 may be designed to serve as a protective case for the mobile device 1702, and may thus abut all of the external surfaces of the mobile device 1702 listed above (the top surface 1706, the bottom surface 1708, the back surface 1710, and the bezel 1712). The bezel 1712 may frame a display screen 1714 on a face surface of the mobile device 1702, which may be left exposed by the attachment 1700 so that a user can use the display screen 1714 in a substantially unimpeded manner. Optionally, the attachment 1700 may have a clear cover or coating (not shown) that covers the display screen 1714.

The housing 1704 may also contain a processor 1716, memory 1718, a camera 1720, a mobile device communications interface 1722, and a mobile device battery 1724. Each of these may have various configurations, as known in the art. The mobile device communications interface 1722 may optionally include a universal serial bus (USB) port or other connector commonly used in mobile devices. The memory 1718 may contain various executable pieces of executable code, including but not limited to an operating system 1726 and one or more applications, or "apps." The apps may include many different programs, one of which may be an app 1728 that can be used to capture and/or decode barcodes with the aid of the attachment 1700.

The camera 1720 may include a camera lens 1730 and an image sensor array, which may include one or more sensors such as CCD (charge-coupled display) sensors, CMOS (complementary metal-oxide-semiconductor) sensors, or the like. The image sensor array may include an image sensor 1732, as shown. The camera lens 1730 may receive light from within a camera field of view 1734, which may, if left unmodified by the attachment 1700, have a camera angular size 1736 as shown. The camera angular size 1736 may generally be the angle at which the camera field of view 1734 spreads. The camera 1720 may also have other parameters such as a range of focus depths, a depth of field, and the like. These parameters, along with the camera angular size 1736 of the camera field of view 1734, may be designed primarily for general purpose photography, and may therefore not be ideal for barcode capture and/or decoding. The attachment 1700 may modify one or more of these parameters in a manner that facilitates barcode capture and/or decoding, as will be described subsequently.

The attachment 1700 may also have a housing 1740. The housing 1740 may contain and/or retain various components, and may also have various interior surfaces that facilitate retention of the mobile device 1702 relative to the attachment 1700. For example, the attachment 1700 may have a top surface 1742 that abuts the top surface 1706 of the mobile device 1702, a bottom surface 1744 that abuts the bottom surface 1708 of mobile device 1702, a back surface 1746 that abuts the back surface 1710 of the mobile device 1702, and/or a bezel surface 1748 that abuts the bezel 1712 of the mobile device 1702.

These surfaces may be termed "interior surfaces" because they face inward to define a cavity (not shown, as it is occupied by the mobile device 1702). These surfaces may be spaced apart in such a manner that the mobile device 1702 is snugly retained within the cavity, and is thus held in place relative to the attachment 1700 via frictional engagement. More specifically, the top surface 1742 and the bottom surface 1744 may face toward each other, and may be spaced apart so as to exert pressure against the top surface 1706 and the bottom surface 1708 of the mobile device 1702, respectively, so as to retain the mobile device 1702 within the cavity. Additionally or alternatively, the back surface 1746 and the bezel surface 1748 may face toward each other, and may be spaced apart so as to exert pressure against the back surface 1710 and the bezel 1712, respectively, so as to retain the mobile device 1702 within the cavity. Additionally or alternatively, the housing 1740 may have lateral surfaces (not shown) that face each other to retain lateral surfaces (i.e., left and right surfaces—not shown) of the mobile device 1702. The mobile device 1702 may thus be retained relative to the attachment 1700 via frictional engagement. However, other attachment modes may be used in the alternative to or in addition to frictional engagement.

The housing 1740 may be divided into one or more chambers in order to restrict light passage from one component to another. For example, the housing 1740 may have a first chamber 1752 and a second chamber 1754. A barrier 1756 may separate the first chamber 1752 from the second chamber 1754 in a manner that prevents light from either of the first chamber 1752 and the second chamber 1754 from passing directly into the other chamber.

The first chamber 1752 may be larger than the second chamber 1754, and may contain components such as an attachment lens 1760, a barrier 1762, circuitry 1764, and an attachment battery 1766. The barrier 1762 may be shaped to define an aperture 1768, which may control the system field of view 1770 within which light may be captured by the camera 1720 with the attachment 1700 in place. The system field of view 1770 may be different from the camera field of view 1734, as will be described subsequently.

The circuitry 1764 may include or be electrically connected to an attachment communications interface 1772, which may be coupled to the mobile device communications interface 1722 of the mobile device 1702 via a link 1774. The link 1774 may be designed to convey data and/or electrical power. The first chamber 1752 may further contain a user control 1776, which may be actuated by the user to perform various functions, such as initiating the capture of a barcode. The user control 1776 may include any form of user inputs known in the art, including but not limited to switches, levers, knobs, touch screens, microphones coupled to voice-operation software, and the like. The user control 1776 may advantageously take the form of a trigger that can be actuated, for example, with the index finger of the user. In alternative embodiments, the housing 1740 may be modified to have a pistol grip or other grip that enhances the ergonomics of the housing 1740 and/or facilitates actuation of the user control 1776.

The housing 1740 may also retain a window 1778 in alignment with the attachment lens 1760 so that light is able to enter the first chamber 1752 via the window 1778 to reach the attachment lens 1760, and after passing through the attachment lens 1760, be received and captured by the camera 1720. In some embodiments, the window 1778 may act as not only an exterior window that helps enclose the first chamber 1752, but also a filter for light entering the first chamber 1752. For example, it may be desirable to capture predominantly light of a relatively narrow segment of the visible portion of the electromagnetic spectrum, such as red light with a wavelength of approximately 660 nm. The window 1778 may thus have a colored tint and/or polarization that helps restrict light entry into the first chamber 1752 to only a narrow wavelength band desired for image capture for effective barcode decoding. In other embodiments, the window 1778 need not act as a filter, but may instead permit visible light of any wavelength to enter the first chamber 1752. In such an event, a separate filter (not shown) may optionally be positioned within the first chamber 1752, along the system optical pathway 1786.

The attachment lens 1760, the barrier 1762, and the window 1778 may all be parts of an optic system of the attachment 1700. An "optic system" may be any set of one or more components positioned in the field of view of a camera to modify one or more parameters regarding light received by the camera, such as the quantity of light received, the optical pathway along which light is received, the angular size of the field of view, the depth of field, the focus distance, and/or the wavelength(s) of light received. Thus, an optic system, in various components, may include any of various components such as lenses, filters, mirrors, apertures, and the like.

The second chamber 1754 may have one or more illumination systems. More specifically, the second chamber 1754 may have a targeting illumination system 1780 and an exposure illumination system 1782. The targeting illumination system 1780 may provide a distinct illumination pattern that projects into the attachment field of view 1770. The illumination pattern may indicate to the user whether the barcode is properly positioned for capture and/or decoding. Such an illumination pattern may include various projected features such as crosshairs, circles, boxes, and the like. The targeting illumination system 1780 may include various components that project such features, including but not limited to lasers, light-emitting diodes (LED's), incandescent lights, fluorescent lights, and the like. Light sources such as lasers may advantageously project a narrow beam of light. Where the targeting illumination system 1780 includes a light source with a wider broadcast area, it may be desirable to use a mask with relatively narrow lines, small points, or other apertures that provide the desired distinction in the projected light.

The targeting illumination system 1780 may be designed to project light only prior to and/or after image capture so as to avoid interfering with decodability of the barcode image. Conversely, the exposure illumination system 1782 may illuminate objects (such as barcodes) within the system field of view 1770 during image capture. The exposure illumination system 1782 may thus act like the flash present on many cameras, and may provide a diffuse illumination pattern to enhance decodability of the barcode image by ensuring that has been sufficiently illuminated to provide the contrast in pixel luminance values necessary for reliable decoding. The exposure illuminating system 1782 may include various light sources, including but not limited to lasers, LED's, incandescent lights, fluorescent lights, and the like. The exposure illuminating system 1782 may advantageously have one or more light sources with a wide broadcast area, such as LED lights. If desired, the broadcast area of the exposure illumination system 1782 may be tuned to generally match the system field of view 1770.

In this application, a "distinct illumination pattern" is an illumination pattern produced by light that is focused to provide relatively crisp lines or other shapes. Thus, the illumination produced by a laser is an example of light that would typically produce a distinct illumination pattern. By contrast, a "diffuse illumination pattern" is an illumination pattern produced by light that is not focused at any particular location, but rather emanating into a broad area. Thus, the illumination produced by a typical light bulb is an example of light that would typically produce a diffuse illumination pattern.

In some embodiments, the light for such an exposure illumination system may not be generated by the attachment 1700, but may instead be generated by the mobile device 1702. For example, the mobile device 1702 may have an illuminating torch incorporated into the camera 1720; the illumination from such an illuminating torch may be redirected and/or focused into the system field of view 1770 by an exposure illumination system.

Returning to the embodiment of FIG. 17A, the targeting illumination system 1780 and the exposure illumination system 1782 may be electrically connected to the circuitry 1764 as shown. The targeting illumination system 1780 and the exposure illumination system 1782 may also be connected to the attachment battery 1766, either independently of the electrical connection to the circuitry 1764, or via the electrical connection to the circuitry 1764. Thus, the targeting illumination system 1780 and the exposure illumination system 1782 may be controlled by the circuitry 1764 and powered by the attachment battery 1766.

As mentioned previously, the barrier 1756 may serve to keep light from passing directly between the first chamber 1752 and the second chamber 1754. Thus, light from the targeting illumination system 1780 and/or the exposure illumination system 1782 may be unable to spillover from the second chamber 1754 into the first chamber 1752 during image capture. Such spillover could otherwise cause interference with image capture by permitting light that did not come from within the system field of view 1770 to pass into and be captured by the image sensor 1732 of the camera 1720.

As mentioned previously, the parameters of the camera 1720, such as the camera angular size 1736 of the camera field of view 1734, the range of focus depths, and the depth of field, of the camera 1720 may not be ideal for barcode capture and/or decoding. Thus, any or all of these parameters may be modified by the attachment 1700. Thus, the system field of view 1770 may have a system angular size 1784 that is significantly smaller than the camera angular size 1736 of the camera field of view 1734. This may be because conventional photography often uses a wider lens angle than is needed for capturing barcode images.

The system field of view 1770 may provide a system ratio of focal length to entrance pupil diameter that is greater than a camera ratio of focal length to entrance pupil diameter of the camera 1720 without the attachment 1700. Thus, the attachment 1700 may act to increase the f-stop of the camera 1720.

The system field of view 1770 may be centered on a system optical pathway 1786, which may be the same as the optical pathway for the camera 1720 without the attachment 1700. More specifically, the camera 1720 may be designed to capture images centered on an optical pathway perpendicular to the back surface 1710 of the mobile device 1702. This optical pathway may not be modified by the attachment 1700 in this embodiment; thus, the system optical pathway 1786 may be the same as the optical pathway for the camera 1720, unaided. However, in other embodiments, it may be desirable for an attachment to provide a different optical pathway for barcode scanning, as will be shown and described subsequently.

The mobile device 1702 and the attachment 1700, combined, may also have a system focus depth 1788, which may advantageously be adjustable. The range of focus depths to which the mobile device 1702 and the attachment 1700 are adjustable may be different from those applicable to the camera 1720, alone. Barcodes may be scanned from relatively close (typically a distance ranging from a few inches to a few feet), which may be significantly shorter than the average focus depth for a non-barcode image captured with a mobile device. Thus, it may be beneficial for the attachment lens 1760 to facilitate image capture at shorter focus depths.

Further, the mobile device 1702 and the attachment 1700, combined, may have a depth of field (not shown), consisting of the depth along the system optical pathway 1786 through which an object may remain in focus (to a degree acceptable for barcode capture and/or decoding) on either side of the system focus depth 1788. A relatively large depth of field may advantageously permit barcode capture and/or decoding at a wider ranges of distances between the mobile device 1702 and the barcode to be captured. Thus, the attachment lens 1760 may advantageously provide a relatively larger depth of field, particularly at shorter focus depths, than the camera 1720, unaided.

The process of capturing a barcode image containing a barcode, with the attachment 1700 and the mobile device 1702, may be relatively straightforward. In some embodiments, the user may perform all operations via the app 1728. The app 1728 may have a user interface (not shown) with one or more graphical elements displayed on the display screen 1714. The user may use such graphical elements to initiate the barcode scanning process (for example, by tapping a "scan" soft button on the display screen 1714). In response, the mobile device 1702 may transmit a scan initiation signal to the attachment 1700 over the link 1774. The initiation signal may activate the targeting illumination system 1780, which may project targeting illumination that helps the user to properly position the barcode within the system field of view 1770.

After a predetermined period of time, or upon determining that the barcode is properly positioned, the mobile device 1702 may transmit a capture initiation signal to the attachment over the link 1774. The initiation signal may deactivate the targeting illumination system 1780 and/or activate the exposure illumination system 1782. The mobile device may then capture the image containing the barcode with the image sensor 1732, while the exposure illumination system 1782 is active. The mobile device 1702 may then send a completion signal to the attachment 1700 via the link 1774. In response, the attachment 1700 may deactivate the exposure illumination system 1782. Additionally or alternatively, the mobile device 1702 may transmit, for example, with the capture signal, a duration of the exposure. The attachment 1700 may then deactivate the exposure illumination system 1782 automatically when the specified exposure duration has elapsed. Once the image containing the barcode has been captured, it may be automatically be decoded, for example, by the app 1728. In the alternative, the image containing the barcode may be transmitted to a remote decoder, such as a server, for decoding.

It should be noted that his process enables altering between the targeting illumination system 1780 being active (while the exposure illumination system 1782 is de-active) and the exposure illumination system 1782 being active (while the targeting illumination system 1780 is de-active) such that the user may utilizing targeting illumination to continually aim, or adjust aim, of the field of view in reliance on the targeting illumination while the image sensor may capture images of the barcode in reliance on the exposure illumination.

It is also envisioned that the system could determine that the barcode is properly positioned by providing a control, such as graphical element to initiate capture of an image containing the barcode. This may be done, for example, by the user tapping a "capture" soft button on the display screen 1714 when the properly positioned.

In addition to or in the alternative to the use of the app 1728, the scanning, capture, and/or decoding steps may be carried out through the use of the user control 1776. For example, the user control 1776 may be actuated by the user to launch the app 1728, which may either run in the foreground or the background. Actuation of the user control 1776 may cause the attachment communications interface 1772 to transmit an initiation signal to the mobile device 1702 to launch the app 1728.

The features and functionality set forth in the descriptions of previous embodiments may also be applied to the attachment 1700. Thus, for example, the attachment battery 1766 may optionally be used to power the mobile device 1702 and/or recharge the mobile device battery 1724.

Attachments with Nonparallel Optical Pathway

As mentioned previously, the system optical pathway 1786 of the mobile device 1702 and the attachment 1700 may be perpendicular to the back surface 1710 of the attachment 1700. In some embodiments, it may be desirable to have the optical pathway extend along a different direction from that of the camera of the mobile device. One such example will be shown and described in connection with FIG. 17B.

Figure 17B:
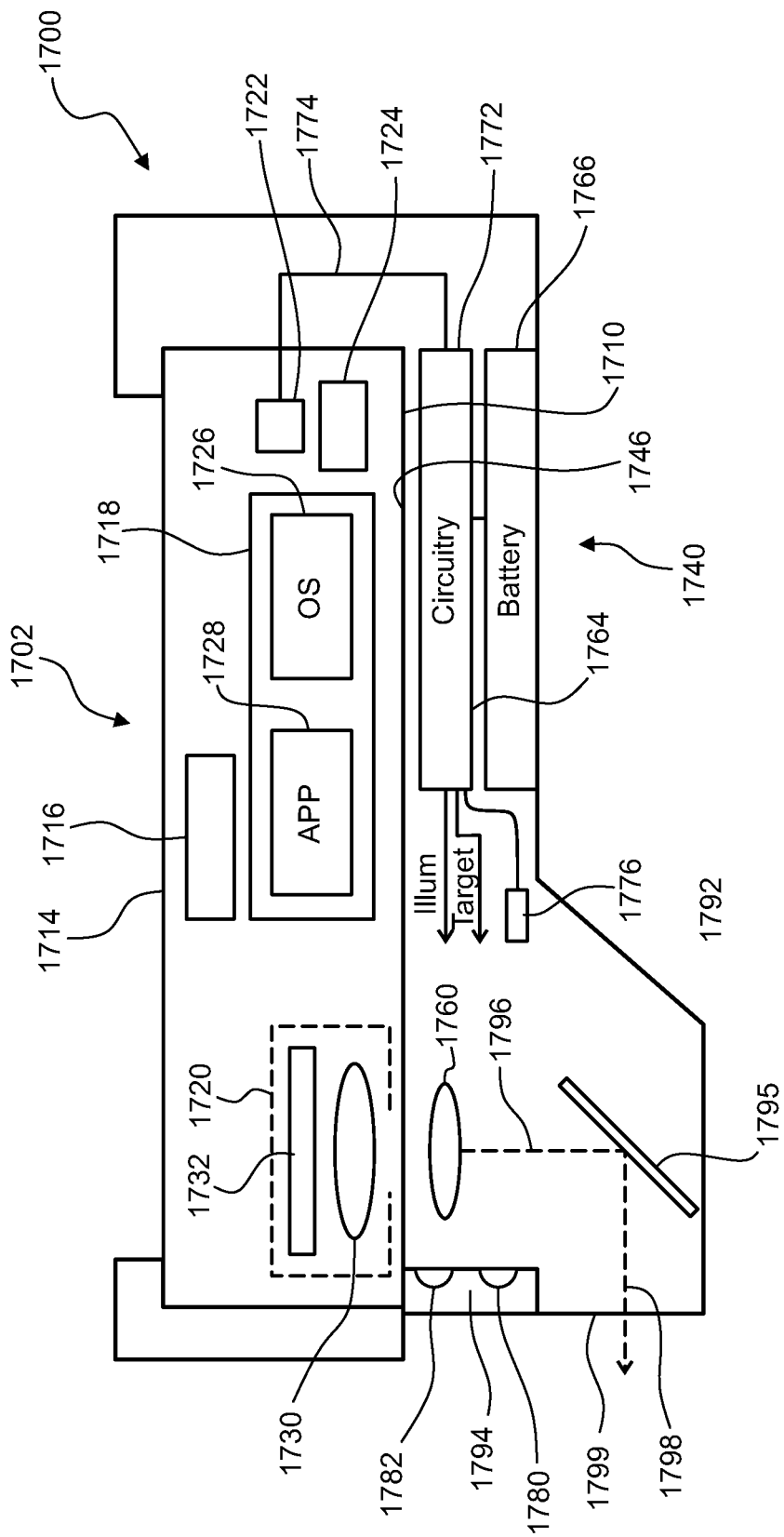

FIG. 17B illustrates an attachment 1750 for a mobile device 1702 according to another embodiment. Like the attachment 1700, the attachment 1750 may also be of the encapsulating type referenced previously, and may thus be designed to substantially contain the mobile device 1702. The attachment 1750 may optionally act as a protective case for the mobile device 1702 in addition to providing enhanced barcode reading capability.

The attachment 1750 may have a configuration generally similar to that of the attachment 1700 of FIG. 17A. Various parts of the attachment 1750 that are similar to or identical to their counterparts of the attachment 1700 will not be described.

As shown, the attachment 1750 may have a housing 1790 that contains components similar to those of the housing 1740 of the attachment 1700. The housing 1790 may have a first chamber 1792 and a second chamber 1794. The first chamber 1792 may have an enlarged top portion (i.e., the portion of the first chamber 1792 positioned on the left in FIG. 17B) that accommodates a reflective surface in the form of a mirror 1795. If desired, the bottom portion of the first chamber 1792 may be relatively compact, like that of the first chamber 1752 of the previous embodiment. This shape may make it easier for a user to grip the bottom portion of the housing 1790 with one or two hands and point the top portion of the housing 1790 toward the barcode to be scanned.

The mirror 1795 may redirect the optical pathway of the camera and attachment lens from a first direction 1796 perpendicular to the back surface 1710 of the mobile device 1702 to a second direction 1798 parallel to the back surface 1710 of the mobile device 1702. The second direction 1798 may extend into an area above the top surface 1706 (i.e., the top side) of the mobile device 1702. Thus, a user holding the mobile device 1702 horizontally, as oriented in FIG. 17B, may easily point the mobile device 1702 and the attachment 1750 such that the optical pathway extends laterally, toward objects located forward of or lateral to the user.

The mirror 1795 is only one of multiple reflective surfaces that may be used according to the invention. In alternative embodiments, redirection may be accomplished through the use of one or more prisms, fiber optic wiring, and/or any other light redirection hardware known in the art.

The housing 1790 may retain a window 1799 that extends perpendicular to the second direction 1798. Like the window 1778 of the previous embodiment, the window 1799 may optionally be tinted to permit only light of a selected wavelength range to enter the first chamber 1792.

The second chamber 1794 may have a shape similar to that of the second chamber 1754 of the previous embodiment. The second chamber 1794 may contain a targeting illumination system 1780 and an exposure illumination system 1782, both of which may be substantially as described in FIG. 17A. The second chamber 1794 may be isolated from the first chamber 1792 so that illumination from the second chamber 1794 is unable to pass directly into the first chamber 1792 to interfere with barcode imaging.

As shown, the second chamber 1794 may be oriented to project the targeting illumination and exposure illumination into the area over the top of the mobile device 1702 (to the left in the view of FIG. 17B). Thus, the targeting illumination system 1780 and the exposure illumination system 1782 may both project illumination into the field of view of the system made up of the mobile device 1702 and the attachment 1750. This field of view (not shown) may be centered on the second direction 1798 shown in FIG. 17B.

FIGS. 18A and 18B illustrate another configuration of an attachment 1800 for a mobile device 1802. FIGS. 18A and 18B are a side elevation view and a top elevation view, respectively, of the attachment 1800 and the mobile device 1802. Like the attachment 1750 of FIG. 17B, the attachment 1800 may also be of the encapsulating type referenced previously, and may thus be designed to substantially contain the mobile device 1802. The attachment 1800 may optionally act as a protective case for the mobile device 1802 in addition to providing enhanced barcode reading capability.

The attachment 1800 may generally be similar to the attachment 1750 of FIG. 17B. Various parts of the attachment 1800 that are similar to or identical to their counterparts of the attachment 1750 will not be described. The mobile device 1802 may be similar in configuration to the mobile device 1702 of FIGS. 17A and 17B; some features of the mobile device 1802 have not been shown for clarity.

As shown, the attachment 1800 may have a housing 1840 with a first chamber 1852 and a second chamber 1854. The housing 1840 may have an enlarged top portion and a relatively compact bottom portion, which may be sized to be readily gripped in the hand of a user. The first chamber 1852 may contain various components, which may include, but need not be limited to, circuitry 1864, an attachment battery 1866, an attachment communications interface 1872 connected to the mobile device communications interface 1722 by a link 1874, a user control 1876, a system lens 1860, and a mirror 1845.

As in the previous embodiment, the attachment 1800 may utilize the mirror 1845 to redirect an optical pathway of the camera 1720 from a first direction 1896 perpendicular to a back surface 1710 of the mobile device 1802 to a second direction 1898 generally parallel to the back surface 1710. The second direction 1898 may thus be substantially orthogonal to the first direction 1896.

The second chamber 1854 may house a targeting illumination system 1880 and an exposure illumination system 1882, which may be similar in function to their counterparts of the previous embodiment. The second chamber 1854 may effectively isolate the targeting illumination system 1880 and the exposure illumination system 1882 from the components within the first chamber 1852 to prevent light from entering the first chamber 1852 directly from the targeting illumination system 1880 and/or the exposure illumination system 1882.

A window 1899 may be retained by the housing 1840 and may define a wall of the housing that covers the first chamber 1852 and the second chamber 1854. The window 1899 may optionally be tinted, polarized, or otherwise configured to define a filter that permits passage of light of only certain wavelengths to enter and/or leave the first chamber 1852 and/or the second chamber 1854. Advantageously, when positioned to cover the second chamber 1854, the window 1899 may serve to control the wavelength of light that can be emitted from the housing 1840 by the targeting illumination system 1880 and the exposure illumination system 1882. Thus, barcodes to be imaged with the mobile device 1802 may be illuminated only with light of the frequencies that are best suited to illuminate the barcode for capture and decoding. Such an arrangement may also help make the mobile device 1802 and the attachment 1800 less obtrusive by reducing the emission of visible light of the brighter, more noticeable frequencies.

In addition to or in the alternative to filtering, the window 1899 may act as a supplemental lens, and may thus further modify the optical properties (besides wavelength) of the light entering the first chamber 1852 and/or the light leaving the second chamber 1854. For example, the window 1899 may be shaped to act in concert with the system lens 1860 to help control a depth of field, a focus distance, an angular size, and/or other qualities of the resulting system field of view of the mobile device 1802 combined with the attachment 1800.

FIG. 18B illustrates a section view of the mobile device 1802 and the attachment 1800 from the top, providing a view into the first chamber 1852. FIG. 18B illustrates the mirror 1845, which may be positioned alongside a barcode scanning engine 1850. The barcode scanning engine 1850 may function in tandem with the mirror 1845 and the camera 1720 of the mobile device 1802, or may function separately therefrom. The barcode scanning engine 1850 may contain various components for scanning barcodes, such as a specialized camera, targeting illumination system, exposure illumination system, decoding hardware, and/or controller. In some embodiments, the barcode scanning engine 1850 may be used to image and decode some barcodes, while other types are imaged by the camera 1720 and decoded by the mobile device 1802.

The presence, in the attachment 1800, of both the barcode scanning engine 1850 and the remaining components that facilitate barcode scanning with the mobile device 1802 is optional. In alternative embodiments, an attachment may have only a barcode scanning engine 1850 that functions substantially independently of the hardware of the mobile device 1802, or only components that facilitate barcode image capture and/or decoding with the hardware of the mobile device 1802.

Corner-Positioned Attachments

As mentioned previously, some attachments that facilitate barcode image capture and/or decoding may cover only some (but not all) corners of a mobile device. Such attachments may advantageously be relatively compact and unobtrusive.

FIGS. 19A through 19B illustrate two more additional configurations of attachments for mobile devices, which utilize corner-positioned attachment. More specifically, FIG. 19A illustrates an attachment 1900 secured to a mobile device 1902, and FIG. 19B illustrates an attachment 1950 secured to a mobile device 1902 like that of FIG. 19A.

The mobile device 1902 of FIGS. 19A and 19B may be a smartphone with a top surface 1906 (not visible in FIG. 19B), a back surface 1910, a bezel 1912, a right side 1916, and a left side 1918. The mobile device 1902 may have a camera with a lens that receives light through an aperture on the back surface 1910. The aperture may be covered by the attachment 1900 or the attachment 1950.

The attachment 1900 may provide an optic system, which may modify one or more parameters of the light received by the camera of the mobile device 1902. As set forth previously, these parameters may include, but need not be limited to, the quantity of light received, the optical pathway along which light is received, the angular size of the field of view, the depth of field, the focus distance, and/or the wavelength (s) of light received. The optic system of the attachment 1900 may include one or more components that provide such modification. Such components may include, but need not be limited to, lenses, filters, mirrors, apertures, and the like.

If desired, the attachment 1900 may have all of the elements of attachment 1800 described in FIGS. 18A and 18B or it may have a simplified design compared to the attachment 1800. For example, the attachment 1900 may not have circuitry, a battery, or an illumination system. Rather, the attachment 1900 may have only the optic system. Hence, the attachment 1900 may not need electrical power or an electrical connection to the mobile device 1902. The attachment 1900 may simply have an aperture 1920 through which light enters the attachment 1900 to pass through the optic system and enter the camera of the mobile device 1902.

Mechanically, the attachment 1900 may be secured to the mobile device 1902 via frictional engagement. More specifically, the attachment 1900 may have a plurality of interior surfaces that cooperate to define a cavity sized to retain the corner of the mobile device 1902 with some moderate interference.

For example, the attachment 1900 may have a back surface 1930 that faces the back surface 1910 of the mobile device 1902, and a front surface 1932 that faces the bezel 1912. When the attachment 1900 is installed on the mobile device 1902, the back surface 1930 may abut the back surface 1910, and the front surface 1932 may abut the bezel 1912. The distance between the back surface 1930 and the front surface 1932 may be sufficiently large to permit the attachment 1900 to be inserted onto the corner of the mobile device 1902 without excessive difficulty, but also small enough that, once installed, the attachment 1900 will not slide free of the mobile device 1902. Since the attachment 1900 only covers a single corner of the mobile device 1902, the attachment 1900 may be installed on the mobile device 1902 by sliding the attachment 1900 along the top surface 1906 and/or parallel to the right side 1916.

The attachment 1950 may have a configuration similar to that of the attachment 1900, except that the attachment 1950 may cover not one, but two corners of the mobile device 1902. Thus, the attachment 1950 may cover the entirety of the top surface 1906. The attachment 1950 may slide into engagement with the mobile device by sliding the attachment 1950 along the back surface 1910, the bezel 1912, the right side 1916, and the left side 1918.

The attachment 1950 may have a back surface 1980 that faces the back surface 1910 of the mobile device 1902, a front surface 1982 that faces the bezel 1912, a left surface 1986 that faces the right side 1916, and a right surface 1988 that faces the right surface 1988. The back surface 1980 and the front surface 1982 may be spaced apart to provide the moderate interference fit described above in connection with the attachment 1900 of FIG. 19A. Additionally or alternatively, the left surface 1986 and the right surface 1988 may be spaced apart to provide the moderate interference fit described above. In either case, the attachment 1950 may grip the top portion of the mobile device 1902 to remain securely in place until the user desires to remove it.

In the alternative to frictional engagement, the attachment 1900 and the attachment 1950 may be secured to the mobile device 1902 through the use of various other attachment methods. Such attachment methods include, but need not be limited to, mechanical fasteners, adhesives, and the like.

Mounted Attachments

As mentioned previously, another attachment mode for attachments that facilitate barcode image capture and/or decoding is a mounted attachment. Such attachments need not cover any corners of the mobile device in order to remain in place, and may also be relatively compact and unobtrusive.

FIGS. 20A through 20B illustrate two more additional configurations of attachments for mobile devices, which utilize mounted attachment. More specifically, FIG. 20A illustrates an attachment 2000 secured to a mobile device 2002, and FIG. 20B illustrates an attachment 2050 secured to a mobile device 2052.

The mobile device 2002 of FIG. 20A may be a smartphone with a top surface 2006, a back surface 2010, a bezel 2012, a right side 2016, and a left side 2018. The mobile device 2002 may have a camera with a lens that receives light through an aperture 2020 on the back surface 2010. The aperture 2020 may be covered by the attachment 2000 when the attachment 2000 is mounted on the mobile device 2002.

Like the attachment 1900 and the attachment 1950 of FIGS. 19A and 19B, respectively, the attachment 2000 may provide an optic system, which may modify one or more parameters of the light received by the camera of the mobile device 1902. The attachment 2000 may thus include any of the components mentioned previously to accomplish such modification. The attachment 2000 may also have a simplified design with only the optic system, and may have an aperture 2030 through which light enters the attachment 2000 to pass through the optic system and enter the camera of the mobile device 1902.

Mechanically, the attachment 2000 may be secured to the mobile device 2002 via a fastening interface, which may include a mobile device element 2022 on the mobile device 2002, proximate the aperture 2020, and an attachment element 2034 on the attachment 2000. The mobile device element 2022 and the attachment element 2034 may each have generally circular (or cylindrical) configuration.

In some embodiments, the mobile device element 2022 may take the form of a threaded receptacle, and the attachment element 2034 may take the form of a threaded extension. The attachment 2000 may be secured to the mobile device 2002 by simply screwing the attachment element 2034 into the mobile device element 2022. In alternative embodiments, different fastening systems may be used. Such fastening systems may include bayonet fasteners, frictional engagements, snap-in fastening systems, and the like.

The mobile device 2052 may be similar to the mobile device 2002. However, in place of the aperture 2020 and the mobile device element 2022, the mobile device 2052 may have an aperture 2070 and a mobile device element 2072 of a different shape. More precisely, the mobile device element 2072 may be rectangular in shape rather than round. The mobile device element 2072 may take the form of a recess surrounding the aperture 2070 with the rectangular shape.

Similarly, the attachment 2050 may be rectangular in shape, and may be sized to fit into the mobile device element 2072. The attachment 2050 may have an aperture 2080 and an attachment element 2084 in the form of a plurality of bumps around the periphery of the rectangular shape of the attachment 2050. If desired, the mobile device element 2072 may include corresponding detents that receive the bumps so that the attachment 2050 snaps into place when pressed into the mobile device element 2072.

The attachment 2000 and the attachment 2050 represent only two of many examples of mounted attachments that may be mounted to mobile devices to facilitate barcode capture and/or decoding. In other embodiments, different attachment shapes and/or mounting methods may be used. In some embodiments, attachments may be adhesive bonded, fastened, otherwise mounted to, or even integrally formed with the back cover of a mobile device. Such a back cover may be a panel that is attachable to the remainder of the mobile device to define, for example, the back surface 2010 of the mobile device 2002.

Attachment Control of Barcode Capture

Figure 21:
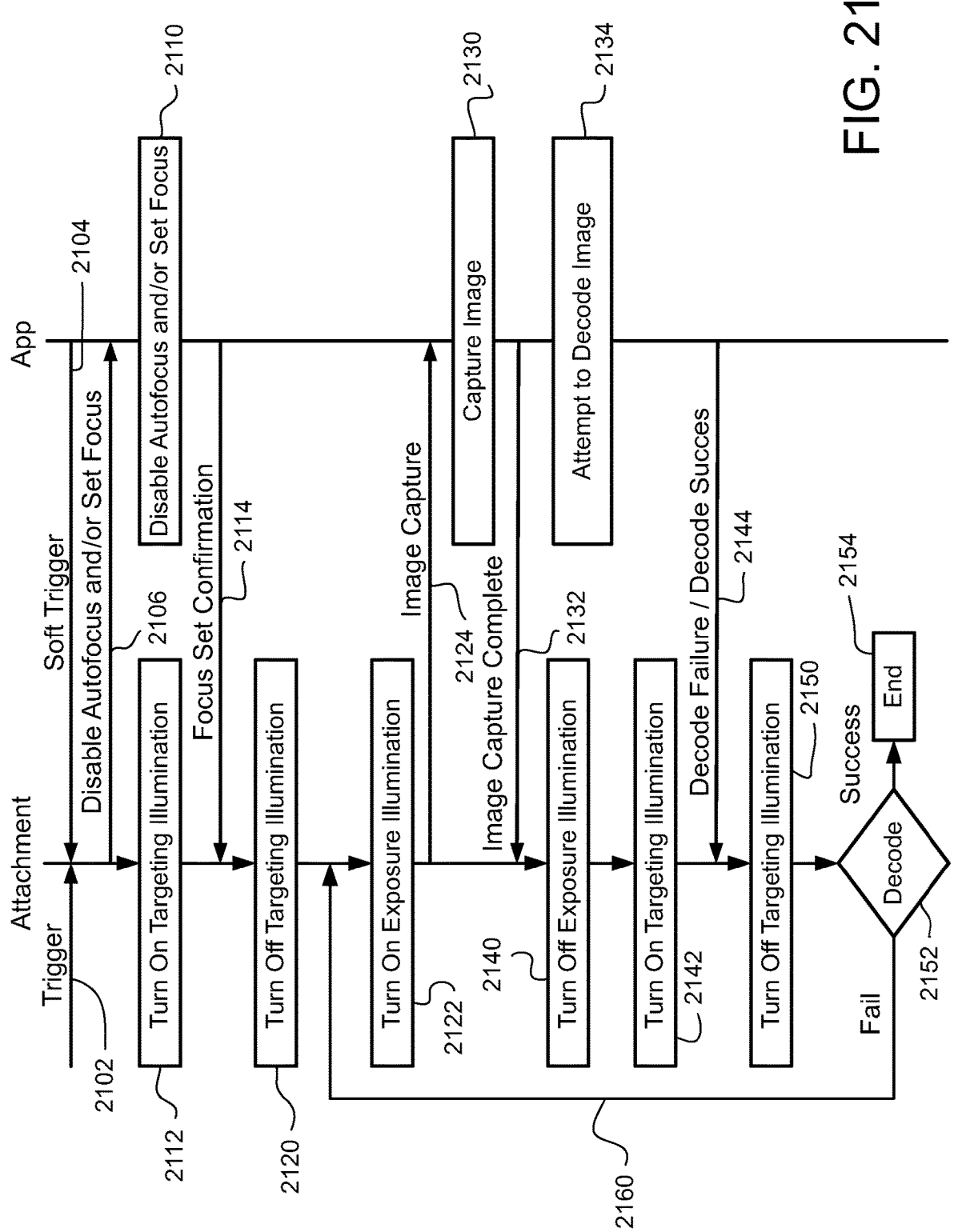
FIG. 21 illustrates exemplary data flow for a barcode capture and decoding sequence driven by the attachment.
Figure 22:
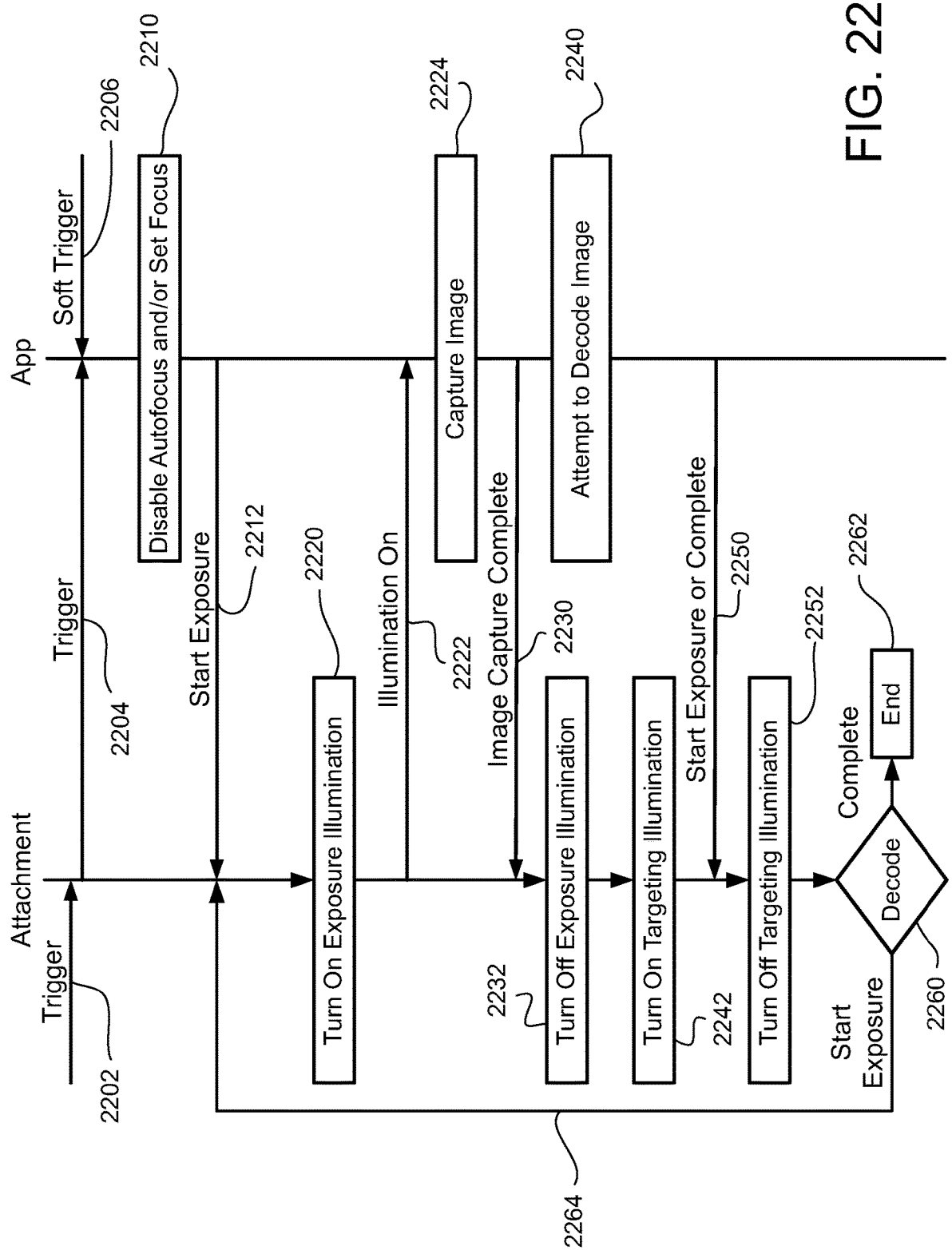
FIG. 22 illustrates exemplary data flow for a barcode capture and decoding sequence driven by an app running on the mobile device.

As mentioned in the description of FIG. 17A, the process of capturing and/or decoding a barcode may be managed from a mobile device and/or from an attachment. FIGS. 21 and 22 illustrate how this may be accomplished with respect to any of the mobile devices and/or attachments disclosed in this specification.

FIG. 21 illustrates exemplary data flow for a barcode capture and decoding sequence driven by the attachment. Thus, as carried out in FIG. 21, barcode capture may be accomplished through the use of a user control such as the user control 1776 of FIG. 17A.

As shown, barcode image capture and decoding may be initiated from the attachment via a trigger 2102, such as user actuation of a user control on the attachment. Additionally or alternatively, the user may initiate barcode capture via a soft trigger 2104, which may be a soft button of an app, such as the app 1728 of FIG. 17A. The app 1728 may be software that is specific to a certain attachment, or may be a hardware-independent barcode scanning app.

In response to receipt of the trigger 2102 or the soft trigger 2104, the attachment may transmit a disable autofocus instruction 2106 to the mobile device to cause the operating system or other camera control software to perform a step 2110 in which the autofocus feature of the camera is disabled, the camera is set to focus at a given focus distance, the autofocus feature of the camera is set to operate within a limited range of focus depths, and/or other steps are taken to establish the focus settings of the camera. The attachment may also perform a step 2112 in which the attachment activates the targeting illumination system, such as the targeting illumination system 1780 of FIG. 17A.

The attachment may receive a focus set confirmation 2114 from the mobile device. The focus set confirmation 2114 may confirm that the subject matter to be imaged is in proper focus. In the event that the autofocus feature of the camera is used in some capacity, the focus set confirmation 2114 may be sent in response to convergence of the focusing operations on a consistent focus setting.

The attachment may then, in a step 2120, turn off the targeting illumination system, and then in a step 2122, turn on the exposure illumination system. Once the exposure illumination system has been activated, the attachment may transmit an image capture signal 2124 to the mobile device. In response, the mobile device may perform a step 2130 in which it captures one or more images with the camera, each of which may be with a different exposure duration and/or gain setting with respect to the other images.

After image capture is complete, the mobile device may transmit an image capture complete signal 2132 to the attachment. The attachment may perform a step 2140 in which the exposure illumination system is deactivated. The attachment may perform a step 2142 in which it reactivates the targeting illumination system in preparation for recapture of the barcode, if needed.

Meanwhile, the mobile device may perform a step 2134 in which it attempts to decode the barcode using the captured image(s) containing the barcode. As mentioned previously, this may be done locally (i.e., within the mobile device) or by a different computing device remote from the mobile device. The mobile device may transmit a decode failure/decode success signal 2144 to the attachment.

The attachment may receive the decode failure/decode success signal 2144 and turn off the targeting illumination system in a step 2150. This may be done regardless of whether decoding was successful because in either case, the targeting illumination system will be deactivated (because the barcode was successfully decoded or because a new image of the barcode needs to be captured).

Pursuant to a query 2152, if the decoding was successful, the capture/decoding process may end 2154. If the decoding failed 2160, the apparatus may return to the step 2122 and turn on the image exposure illumination once again to re-capture the image and attempt to re-decode the barcode. The process may repeat until the barcode has been successfully decoded.

FIG. 22 illustrates exemplary data flow for a barcode capture and decoding sequence driven by the mobile device. Barcode image capture and decoding may be accomplished through the use of an app such as the app 1728 of FIG. 17A. A user control such as the user control 1776 of FIG. 17A may also optionally be used.

As shown, barcode capture may be initiated from the attachment via a trigger 2202, such as user actuation of a user control on the attachment. A trigger signal 2204 may be transmitted to the mobile device in response to receipt of the trigger 2202 by the attachment. Additionally or alternatively, the user may initiate barcode capture via a soft trigger 2206, which may be a soft button of an app as described previously.

In response to receipt of the trigger signal 2204 or the soft trigger 2206, the app may transmit an instruction to the operating system or other camera control software to perform a step 2210 in which the autofocus feature of the camera is disabled, the camera is set to focus at a given focus distance, the autofocus feature of the camera is set to operate within a limited range of focus depths, and/or other steps are taken to establish the focus settings of the camera.

The app may also transmit a start exposure signal 2212 to the attachment. In response, the attachment may perform a step 2220 in which the exposure illumination system is turned on. The attachment may transmit an illumination on signal 2222 back to the mobile device to confirm that the exposure illumination system has been activated. The app may then initiate capture of one or more images, each with a different exposure period and/or gain setting, with the camera in a step 2224.

Once the barcode image has been captured by the camera, the mobile device may transmit an image capture complete signal 2230 to the attachment. In response to receipt of the image capture complete signal 2230, the attachment may perform a step 2232 in which the exposure illumination is deactivated. The attachment may also perform a step 2242 in which the targeting illumination is activated in case there is a need to capture a new barcode image.

Meanwhile, the mobile device may, in a step 2240, attempt to decode the barcode image(s). The mobile device may transmit a start exposure or complete signal 2250 to the attachment to indicate whether the process is complete (indicating successful decode) or there is a need to capture a new barcode image. In response to receipt of the start exposure or complete signal 2250, the attachment may perform a step 2252 in which the targeting illumination system is deactivated.

Pursuant to a query 2260, if the start exposure or complete signal 2250 indicated that the process is complete, the process may end 2262. If, instead, the start exposure or complete signal indicated that a new barcode image is to be captured, the attachment may commence the process to start an exposure 2264 by returning to the step 2220, in which the exposure illumination system is activated.

It should be appreciated that each of the signals sent between the mobile device and the attachment as described may be through the hardwired communication interface (1722, 1774, 1772 FIG. 1A) or through a wireless link such as Bluetooth®.

System with Multiple Sets of Optics

It may be desirable for a single device to be capable of capturing barcode images and non-barcode images with a minimum of reconfiguration. Such a system may be used, for example, to take ordinary photographs and barcode images interchangeably. One way in which this may be accomplished is through the use of multiple sets of optics, which may coexist within a mobile device (FIG. 23A) or an attachment for a mobile device (FIG. 23B).

FIG. 23A illustrates a mobile device 2302 that has two sets of optics for capturing different types of images. The mobile device 2302 may have a configuration that is otherwise similar to other mobile devices described previously in this disclosure.

Thus, the mobile device 2302 may have a housing 2304 that contains and/or retains a variety of components. The housing 2304 may have various exterior surfaces as well, including a top surface 2306 and a back surface 2310. The housing 2304 may retain a display screen 2314 on its face side. Within the housing 2304, the mobile device 2302 may have a processor 2316, memory 2318, a mobile device battery 2324, a controller 2342, a zoom module 2344, and an autofocus module 2346, an image sensor array with an image sensor 2332. The processor 2316, memory 2318, and mobile device battery 2324 may be as described in connection with previous embodiments. The memory 2318 may contain an operating system 2326 and a plurality of apps, including an app 2328 that controls the operation of a camera (not shown for clarity) of which the image sensor 2332 is a part.

The zoom module 2344 and the autofocus module 2346 may serve to control the optical zoom setting and/or autofocus setting of the camera. They may be controlled by the controller 2342. As shown, the camera may include two separate optic systems: a first optic system and a second optic system. The first optic system may be designed to facilitate the capture and/or decoding of barcode images, and may include a first lens 2380, a first window 2382, and a reflective surface in the form of a mirror 2348. The second optic system may be designed to facilitate the capture of non-barcode images, and may include a second lens 2390 and a second window 2392.

As shown, the first optic system may have a first optical pathway 2384 extending parallel to the back surface 2310, perpendicular to the top surface 2306. As in the embodiment of FIG. 17B, this arrangement may facilitate the capture of images for barcodes positioned generally in-plane with the mobile device 2302. If desired, a targeting illumination system and/or an exposure illumination system (not shown) may be included, and may be oriented to project light into a first field of view 2386 of the first optic system. The first field of view 2386 may be centered on the first optical pathway 2384.

As shown, the second optic system may have a second optical pathway 2394 extending parallel to the top surface 2306, perpendicular to the back surface 2310. This arrangement may facilitate the capture of non-barcode images because people are generally accustomed to digital photography in which the optical pathway is generally along their line of sight (i.e., parallel to the direction in which they look to view the display screen 2314). If desired, an exposure illumination system and/or illuminating torch (not shown) may be used to illuminate non-barcode objects to be imaged; the illumination from such systems may be projected into a second field of view 2396 of the second optic system. The second field of view 2396 may be centered on the second optical pathway 2394.

If desired, the first field of view 2386 and the second field of view 2396 need not be the same size. For example, if barcodes are to be imaged at very close range, the first field of view 2386 may have an angular size that is larger than that of the second field of view 2396. Conversely, if barcodes are to be imaged from a greater distance, or wide-angle non-barcode photography is desired, the angular size of the second field of view 2396 may be larger than that of the first field of view 2396.

Additionally or alternatively, other parameters of the first and second optic systems may be different. For example, the first and second optic systems may have different focus depths, depths of field, f-stop values, or the like. Typically the first optic system for reading barcode may have a higher f-stop value and therefore a greater depth of field. The second optic system may have a smaller f-stop value (i.e. larger aperture) with a small depth of field and wherein an auto focus system provides for a greater range of focus depths for photography.

As another example, the first optic system may have a filter that limits passage of light through the first optic system to certain wavelengths, while the second optic system may have no such filter.

The image sensor 2332 may have a first portion 2334 and a second portion 2336. The first portion 2334 may be positioned to receive light from the first field of view 2386, which light may be redirected toward the first portion 2334 by the mirror 2348. The second portion 2336 may be positioned to receive light from the second field of view 2396, which may pass directly into the second portion 2336 without the need for redirection.

Thus, the image sensor 2332 may receive light from the first field of view 2386 for barcode images, and from the second field of view 2396 for non-barcode images. Barcode image data captured by the first portion 2334 of the image sensor 2332 may be transmitted to the memory 2318 or to a separate decoding module or a separate device, and may be decoded to obtain barcode data. The barcode image data may then be deleted. Conversely, non-barcode image data captured by the second portion 2336 of the image sensor 2332 may be transmitted to the memory 2318 and stored until the user wishes to move or delete it.

In some embodiments, the images captured by image sensor 2332 are used only for reading barcodes and decoded data may be displayed on display 2314 and the image itself is not displayed on display screen 2314. Images captured by image sensor 2332, which may be photographs, are displayed on display screen 2314 with the appropriate app.

In operation, the user may, if desired, use the app 2328 to select the type of image to be captured (i.e., a barcode image or non-barcode image). The applicable portion (i.e., the first portion 2334 or the second portion 2336) of the image sensor 2332 may then be activated to capture the desired image. If desired, the app 2328 may also enable the user to select applicable image storage and/or decoding settings that will be applied to barcode images and/or non-barcode images captured by the image sensor 2332.

Additionally or alternatively, the first portion 2334 and the second portion 2336 may be utilized to capture barcode and non-barcode image data, respectively, without the user needing to select which type of image to capture. Both may be captured with each exposure, and the user may, after completion of the exposure, have the option to save or delete either the barcode image or the non-barcode image, or to decode the barcode image, for example, via menus or other selection prompts within the app 2328. Alternatively, barcode images and/or non-barcode images may be automatically stored and/or decoded by the app 2328 after image capture without requiring user input. Further, the app 2328 may be designed to automatically delete barcode images after they are successfully decoded or overwritten by subsequent barcode image capture actions.

If desired, the image sensor 2332 may capture a single composite image based on the light from the first field of view 2386 and the light from the second field of view 2396. The user may then optionally have the option to divide the composite image into barcode and non-barcode portions.

FIG. 23B illustrates an attachment 2350 for a mobile device 2352. The attachment 2350 may have two sets of optics for capturing different types of images. The mobile device 2352 may have a housing 2354 with a configuration similar to that of other mobile devices described previously in this disclosure. In addition to the components shown in FIG. 23A, the mobile device 2352 may have a mobile device communications interface 2322 connected to the attachment 2350 via a link 2374. FIG. 23B also illustrates the mobile device 2352 with a camera 2320 that includes the image sensor 2332 and a camera lens 2330.

The attachment 2350 may have a housing 2340 that houses various components, such as circuitry 2364, an attachment battery 2366, a user control 2376, and an attachment communications interface 2372 connected to the link 2374. Further, the housing 2340 may house a first optic system and a second optic system.

The first and second optic systems of the attachment 2350 may be similar in configuration to those of the mobile device 2302 of FIG. 23A. The first optic system may be designed to capture barcode image data, while the second optic system may be designed for general purpose photography. The first optic system may also include the mirror 2348 such that the optical path 2384 of the first optic system is oriented generally transverse to the optical path 2394 of the second optic system, as in FIG. 23A.

Rather than conveying light from the first field of view 2386 and the second field of view 2396 directly to the image sensor 2332, the first and second optic systems may instead convey the light to the image sensor 2332 via the camera lens 2330. This may enable the attachment 2350 to be attached to the mobile device 2352 without the need to modify the camera 2320, for example, to remove the camera lens 2330. In some embodiments, the camera lens 2330, the first lens 2380, and/or the second lens 2390 may be specially designed to help correct for any distortion, image reversal, or other effects that may occur as a result of passage of the light through the camera lens 2330 in addition to the first lens 2380 or the second lens 2390. Additionally or alternatively, one or more additional lenses may be added to the attachment 2350 and/or the mobile device 2352 to correct for any such effects. Further additionally or alternatively, such effects may be corrected through post-processing of the barcode and non-barcode images.

Although the first portion 2334 and the second portion 2336 appear the same size as each other in FIGS. 23A and 23B, they need not have the same size or aspect ratio. Low resolution images may be sufficient for barcode reading, particularly if they have a high aspect ratio. One-dimensional barcodes may be decoded from images of very low width. Thus, according to one example, the first portion 2334 may be much thinner than the second portion 2336. The first portion 2334 may equate to a narrow (i.e., high aspect ratio) strip along the top, bottom, or side of a larger image captured by the second portion 2336.

Further, the first portion 2334 and the second portion 2336 need not store images in the same format. A high color depth may be advantageous for non-barcode images, but barcodes may, in many cases, be properly decoded from barcode images having a low color depth, or even an image with only pixel intensity values, and no color information, as will be discussed subsequently. Thus, for example, the first portion 2334 may capture and/or output image data in YUV format, while the second portion 2336 may capture and/or output image data in RGB, CYM, or other formats.

The differences between the first portion 2334 and the second portion 2336 may also extend to the structure of the first portion 2334 and the structure of the second portion 2336. For example, the second portion 2336 may utilize a Bayer pattern or other mosaic pattern designed to record color values, and the first portion 2334 may have a structure designed to record only pixel intensities. Thus, the first portion 2334 may, in effect, capture only monochrome luminance data.

In alternative embodiments, a mobile device and/or an attachment may have an image sensor array that includes multiple image sensors. The light from the second optic system may then be directed to a different image sensor from that which receives the light from the first optic system. Each of the various image sensors may then have a size, chromatic storage capability, and/or other parameters that are more suited to the type of image it is to capture.

In other alternative embodiments, one or more of the optic systems may have adjustable parameters. For example, the second optic system, which is configured for non-barcode photography, may have a lens with an adjustable position and/or a deformable, adjustable shape to allow for changes in focus depth, zoom level, etc.

In still other alternative embodiments, the optic systems may not all be aligned with the image sensor or image sensor array at the same time. For example, a mobile device or an attachment may have multiple modular elements that can be coupled to it in alignment with the image sensor; each modular element may have a different optic system. Thus, in order to capture a barcode image, the user may first attach the appropriate modular element to the mobile device or attachment to align the optic system suitable for barcode image capture with the image sensor. In some embodiments, such modular elements may be movably coupled to the mobile device or attachment so that each can slide, rotate, or other wise move into and out of alignment with the image sensor. This may be accomplished through the use of a carousel, slider, or other movable feature on which the modular elements are mounted such that the movable feature can be shifted to align the desired modular element with the image sensor.

In other alternative embodiments, more than two optic systems may be provided. For example, a first optic system may be used for capturing barcode images, while a second optic system is used for low-light photography, and a third optic system is used for bright conditions. Optic systems according to the invention may be differentiated according to a wide variety of conditions, including but not limited to desired focus depth, desired depth of field, desired chrominance, desired f-stop, and the like.

Color Space Architecture

As mentioned previously, the color space requirements for barcode images may be different from those of non-barcode images. Expedited processing, reduced data storage requirements, and enhanced decodability are some of the benefits that may be obtained through proper utilization of color space according to the present disclosure.

Figure 24A:
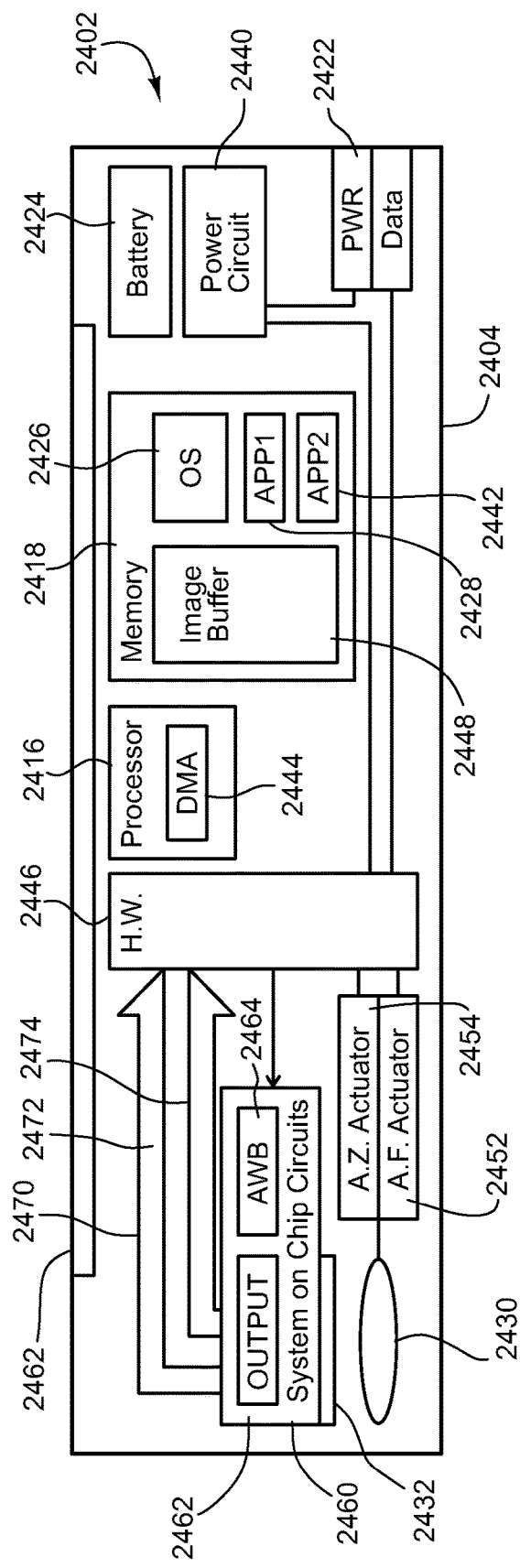
FIGS. 24A through 24B illustrate a schematic block diagram of a mobile device including camera output in Y.U.V. and R.G.B. formats.
Figure 24B:
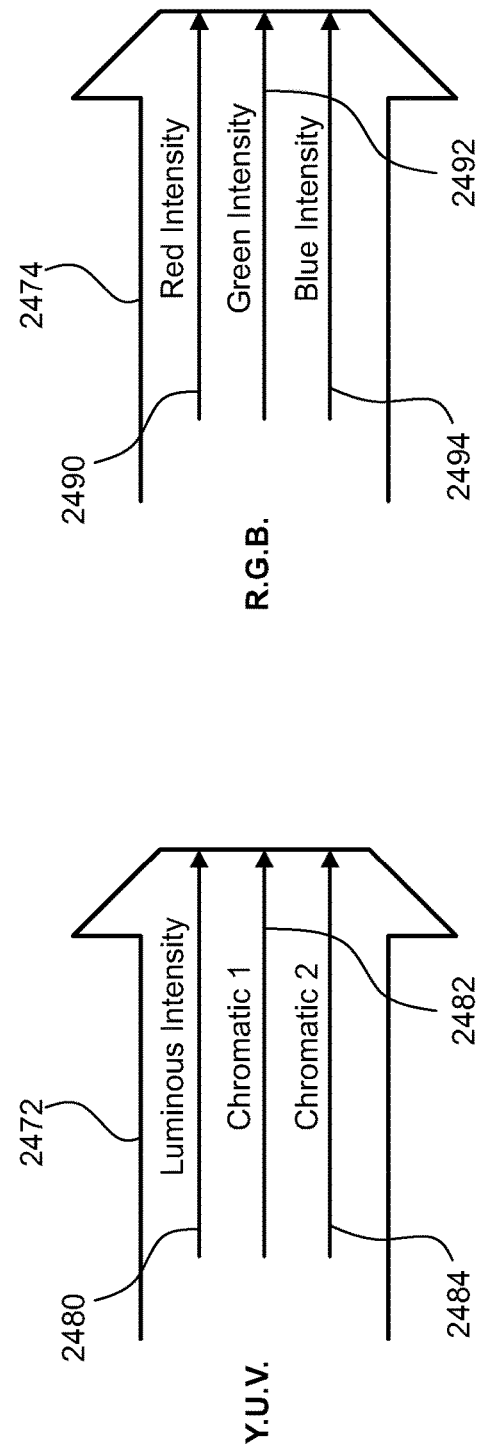

FIGS. 24A through 24B illustrate a schematic block diagram of a mobile device 2402 including camera which utilizes an image sensor that is capable of colored image output in both Y.U.V. and R.G.B. formats. The mobile device 2402 may have a configuration similar to those of other mobile devices disclosed previously; however, additional components are shown in FIG. 24A.

More specifically, the mobile device 2402 may have a housing 2404 that houses and/or retains a variety of components, which may include a display screen 2412, a mobile device communications interface 2422, a mobile device battery 2424, memory 2418, a processor 2416, an image sensor 2432, and a lens 2430; these components may be substantially as disclosed in previous embodiments. Additionally, the housing 2404 may house power circuits 2440, a control circuitry 2446, an autofocus actuator 2452, a zoom actuator 2454, and system on chip circuits 2460.

The power circuits 2440 may facilitate power management and/or consumption of the mobile device 2402. The autofocus actuator 2452 and the zoom actuator 2454 may move or re-shape the lens 2430 in a manner that provides the desired focus depth and/or zoom level. The control circuitry 2446 may transfer image data, system commands, and other data among the various other components of the mobile device 2402.

The memory 2418 may contain the operating system 2426 and multiple apps. The apps may include the first app 2428, which may be a barcode scanning app, as described previously and which may further control the camera as described herein. The app 2428 may issue commands to the image sensor 2432, the zoom actuator 2454, and/or the autofocus actuator 2452, either directly through hardware control circuitry 2446, through the operating system 2426, or through other control circuitry.

The memory 2418 may also have an image buffer 2448 that stores images captured by the image sensor 2432 on a temporary basis. If desired, the memory 2418 may also have more permanent storage for barcode images and/or non-barcode images.

The system may include a direct memory access (DMA) system 2444 which may be part of the processor system 2416. DMA 2444 provides for direct writing of a captured image to buffer memory 2448 without requiring use of the processor.

The image sensor 2432 may be secured to the system on chip circuits 2460. The system on chip circuits 2460 may further have an output module 2462 and an auto-white balance module 2464. The auto-white balance module 2464 may perform auto-white balance algorithms to enhance the quality of color photographs captured by the color image sensor 2432 under different illumination conditions. In certain circumstances, such as when the illumination focused onto the image sensor 2432 is passed through a narrow band filter (as described with respect to previous figures) the application of auto-white balance algorithms may significantly degrade image contrast. As such, the first app 2428 may disable auto-white balance module 2464 when utilizing the image sensor 2432 for barcode reading.

The output module 2462 generates the image output 4270 in R.G.B format 4274 and/or Y.U.V format 2472 from the signal values from the analog to digital converts of the image read out circuitry and makes the image output available for writing DMA 2444 for writing to memory 2418.

As further illustrated in FIG. 24B, the Y.U.V. data 2472 may include, for each pixel, a luminous intensity 2480 indicative of the overall intensity of light received by the pixel, a first chromatic 2482 representative of a first dimension of color of light of the pixel, and a second chromatic 2484 representative of a second dimension of color of light of the pixel. The R.G.B. data 2474 may include, for each pixel, a red intensity 2490 indicating the intensity of red light received by the pixel, a green intensity 2492 indicating the intensity of green light received by the pixel, and a blue intensity 2494 indicating the intensity of blue light received by the pixel.

The R.G.B. data 2474 may commonly be used for general-purpose photography. However, for barcode reading and/or decoding, it may be advantageous to use the Y.U.V. data 2472 instead. This is because decoding a barcode image may be mostly reliant upon the pattern defined by the luminous intensity 2480 of each pixel in the barcode image. Optionally, the first chromatic 2482 and the second chromatic 2484 may even be ignored by the application that decodes the barcode image.

Thus, the output module 2462 of the system on chip circuits 4260 may advantageously be set to provide output 2470 in the form of the Y.U.V. data 2472. Accordingly, the first app 2428 may instruct the output module 2462, directly, through the operating system 2426, or through other control circuitry 2446 to cause the output module 2462 to provide the output 2470 in the form of the Y.U.V. data when the image sensor 2432 is to be used for capturing a barcode image and return to R.G.B format for general photography when barcode capturing operations are complete.

If desired, for barcode images, the output module 2462 may be set to provide the output 2470 only in the form of the luminous intensity 2480 for each pixel, without the first chromatic 2482 and the second chromatic 2484 may not even be provided. This may reduce the traffic on the data bus, reduce the processing load of the processor 2416, and/or save space in the image buffer 2448 of the memory 2418.

Autofocus Limitations

The autofocus settings applied to the camera of a mobile device (such as the camera 1720 of the mobile device 1702 of FIG. 17A) may also advantageously be customized for barcode image capture. More specifically, the range between the mobile device 1702 and the barcode to be scanned may be relatively predictable. Thus, using customized autofocus settings for barcode image capture may facilitate obtaining proper focus and/or expedite the image capture process.

Figure 25B:
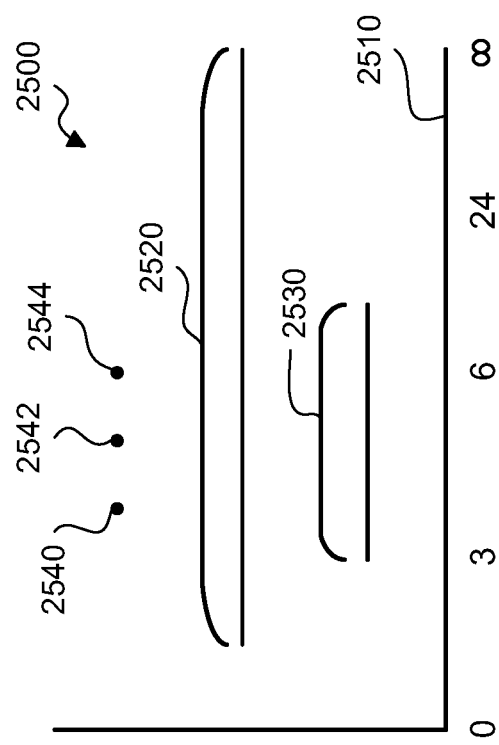
FIGS. 25A through 25B illustrate exemplary autofocus and resolution binning options.
Figure 25A:
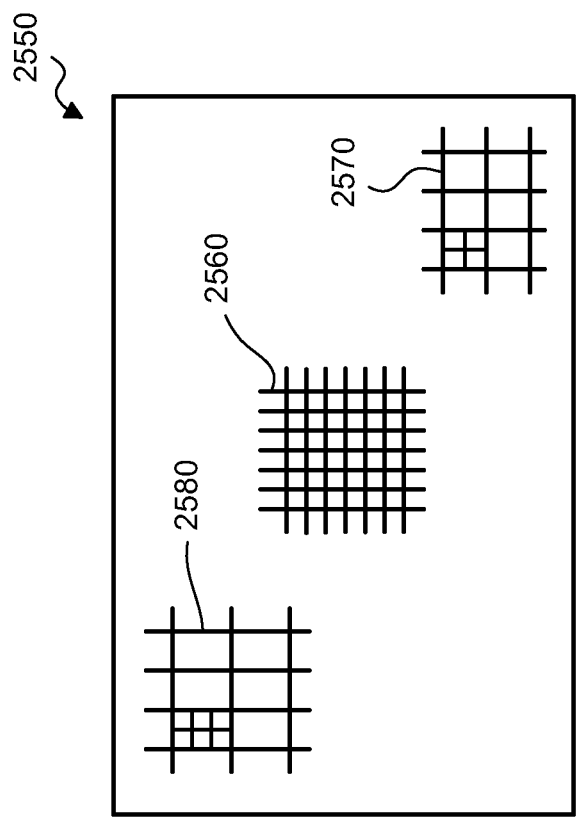

FIG. 25A illustrates exemplary autofocus options in the form of a graph 2500. As shown, a horizontal axis 2510 represents a nonlinear continuum of focus depths. The camera of a mobile device (such as the camera 1720 of the mobile device 1702 of FIG. 17A) may have a full range 2520 of focus depths. However, those on the upper and lower ends of the full range 2520 may not be useful for barcode image capture. Accordingly, the autofocus settings of the camera 1720 may advantageously be configured for barcode image capture, for example, via commands to an autofocus module such as the autofocus module 2346 of the mobile device 2302 of FIG. 23 and/or commands to a controller such as the controller 2342 of the mobile device 2302.

By way of example, the autofocus module may receive instruction to only allow the camera to focus as depths within a limited range 2530 of focus depths. The limited range 2530 may represent the useful range of focus depths for barcode image capture. Alternatively, the autofocus module may receive instruction to only allow the camera to focus at certain discrete depths, such as a first depth 2540, a second depth 2542, and a third depth 2544. The first depth 2540, the second depth 2542, and the third depth 2544 may represent useful depth levels for barcode image capture.

Further, setting auto focus to discreet focus settings may be faster than implementing the feedback-loop algorithms for auto focus when performing photography wherein the image is analyzed for sharpness and focus adjusted based on the analysis.

Binning

Further speed enhancements and/or storage space savings may be obtained by altering the resolution of the image data when using the image data for decoding barcodes (e.g., the output 2470 of FIG. 24A). While high resolution images (8 megapixel or more) may be desirable for conventional photography, they may not be needed for barcode imaging and decoding. As long as the resolution is sufficient for successful decoding, there is typically no need for a large image.

FIG. 25B illustrates exemplary binning options that can be used to reduce the resolution of a barcode image. An exemplary barcode image 2550 may be handled, by way of example, in three different ways. In a first schema 2560, no binning may be applied, and the output 2470 may have one pixel for each pixel captured by the image sensor 2432. The resulting image data may thus be full resolution. In a second schema 2570, moderate binning may be applied so that the output 2470 has one pixel for every four pixels captured by the image sensor 2432. The resulting output image data may thus be one-quarter of the resolution of the captured image data. In a third schema 2580, more aggressive binning may be applied so that the output 2470 has one pixel for every six pixels captured by the image sensor 2432. The resulting output image data may thus be vertical binning (non-square) and one-sixth of the resolution of the captured image data.

When binning is applied, various mathematical algorithms may be used to obtain the value of an output pixel, based on its constituent pixels of the captured image. According to some examples, the intensity values of the constituent pixels may be averaged to provide the value of the resulting output pixel.

Image Capture and Decoding

A variety of methods may be applied to capture and/or decode a barcode through the use of the mobile devices and/or attachments disclosed herein. Two of these will be shown and described in connection with FIGS. 26A and 26B. Some of the steps mentioned previously for optimizing image capture for barcode images are included in these methods; other optimization steps may be included in addition to or in place of any of these steps within the scope of the present disclosure. Additionally, the methods of FIGS. 26A and 26B may be used with any of the mobile devices and/or attachments described previously and may be implemented in an app operating on the mobile device, within the operating system of the mobile device, or within certain components of the accessory.

Figures 26A, 26B:
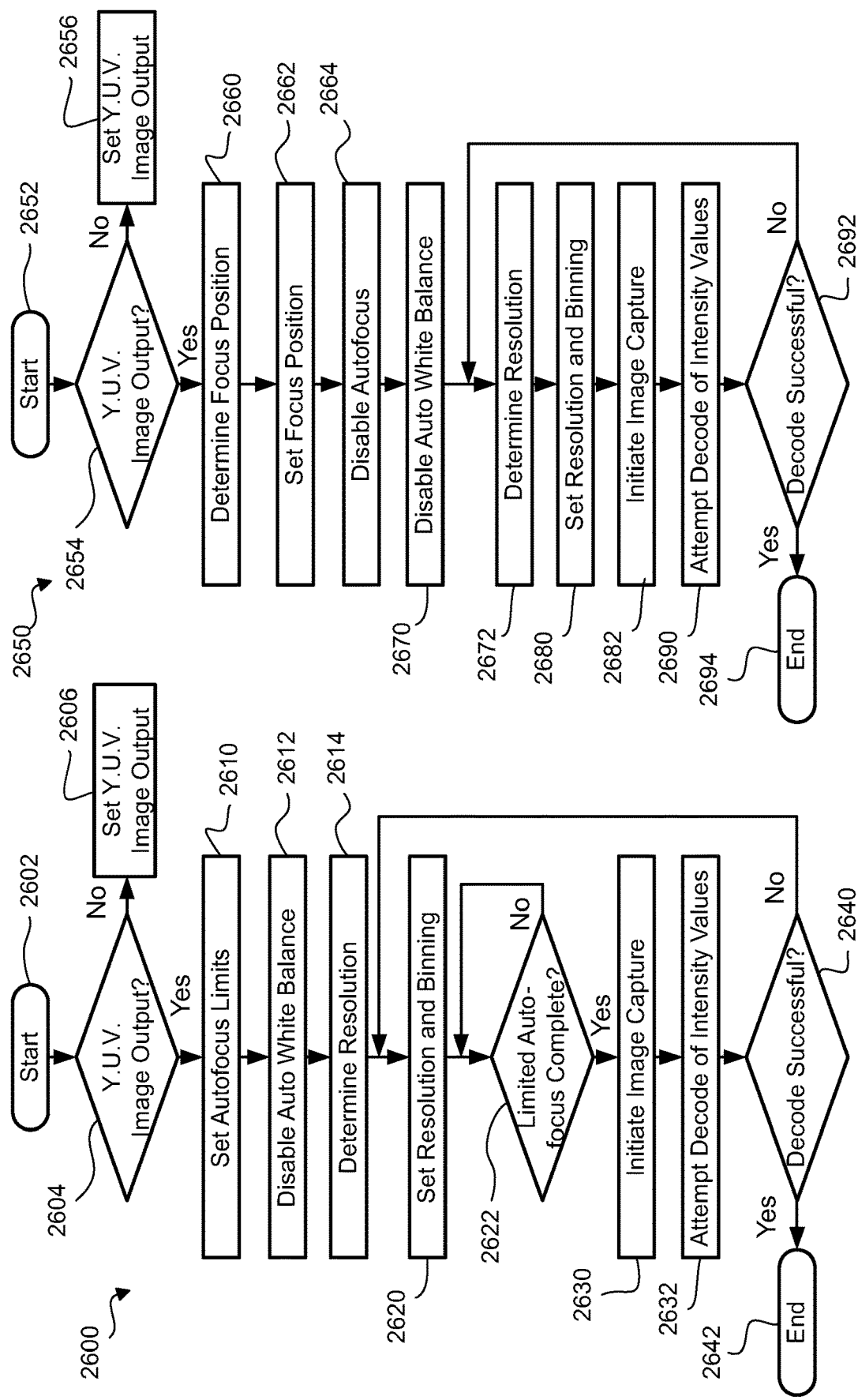
FIGS. 26A through 26B illustrate methods of capturing and decoding barcodes with limited autofocus and with focus at a predetermined position, respectively.

FIG. 26A illustrates a method 2600 of capturing and decoding barcodes with limited autofocus. The method 2600 may start 2602 with a query 2604 in which the mobile device and/or attachment determine whether the image sensor and/or associated circuitry has been set to provide output in the Y.U.V. color space. If not, the method 2600 proceeds to a step 2606 in which the app issuing commands to the operating system, the controller, or the image sensor and/or associated circuitry are set to provide the output in the Y.U.V. color space.

Once the step 2606 has been carried out, or if, pursuant to the query 2604, a determination is made that the image sensor and/or associated circuitry have already been set to provide output in the Y.U.V. color space, the method 2600 may proceed to a step 2610 in which the autofocus limits are set. This may entail the app issuing a command to the operating system, the autofocus module or controller to establish lower and/or upper bounds for focus depth, as illustrated in FIG. 25A.

The method 2600 may proceed to a step 2612 in which the app may issue a command to the operating system, the controller, or the auto-white balance module to disable the auto-white balance function of the image sensor and/or associated circuitry. This may be done, as indicated previously, to avoid degrading contrast when only a narrow band of illumination frequency is focused onto the image sensor for barcode reading.

The method 2600 may proceed to a step 2614 in which the resolution for the output image is determined by the app. This may be done, for example, based on the type of barcode to be scanned, the size of the barcode within the output image, and other factors, which may be determined from previous images captured of the barcode. The resolution selected may be full resolution (i.e., one output pixel for each pixel captured by the image sensor) or binned (i.e., one output pixel for each group of x pixels captured by the image sensor).

The method 2600 may proceed to a step 2620 in which the resolution and binning are set. This may entail the app issuing a command to operating system, control circuitry, or the image sensor and/or associated circuitry to provide output in a certain image size, and/or to bin the captured barcode image according to a certain pattern.

The app may then issue a command to the operating system, control circuitry, or camera so that it may be focused at a focus depth within the limited range provided to the autofocus module or controller. The method 2600 may execute a query 2622 to wait until this has been accomplished prior to proceeding.

Once limited autofocus is complete, the method 2600 may proceed to a step 2630 in which capture of the barcode image is initiated by the image sensor. Once the barcode image has been captured, the mobile device and/or attachment may attempt to decode it based on the intensity values in the Y.U.V. color space in a step 2632. Pursuant to a query 2640, if decoding was successful, the method 2600 may end 2642. If decoding was unsuccessful, then a new barcode image may need to be captured. This may be done by returning to the step 2620 to re-set resolution, binning, exposure, gain and/or auto focus setting. The remaining steps may flow as set forth above until the barcode image has been successfully decoded, or until the user cancels further image capture and/or decoding attempts.

FIG. 26B illustrates a method 2650 of capturing and decoding barcodes with the camera focus at a predetermined position. The method 2650 may start 2652 with a query 2654 in which the mobile device and/or attachment determine whether the image sensor and/or associated circuitry has been set to provide output in the Y.U.V. color space. If not, the method 2650 proceeds to a step 2656 in which the app may issue a command to the operating system, control circuitry or image sensor and/or associated circuitry to provide the output in the Y.U.V. color space.

Once the step 2656 has been carried out, or if, pursuant to the query 2604, a determination is made that the image sensor and/or associated circuitry have already been set to provide output in the Y.U.V. color space, the method 2600 may proceed to a step 2660 in which the focus position (i.e., focus depth) is determined by the app. This may be done, for example, based on the type of barcode to be decoded, the distance between the mobile device and/or attachment and the barcode, and/or other factors. Performance of the step 2660 may entail selection of the most suitable one of a plurality of predetermined focus depths, such as the first depth 2540, the second depth 2542, and the third depth 2544 of FIG. 25A.

Once the focus position has been determined, the method 2650 may proceed to a step 2662 in which focus position of the camera is set to the determined position. Then, in a step 2664, the autofocus function of the camera may be disabled. Performance of steps may entail issuing one or more commands by the app to the operating system, control circuitry or to the autofocus module or controller to establish the focus depth, for example, as one of the discrete values illustrated in FIG. 25A.

The method 2650 may proceed to a step 2670 in which the app may issue a command to the operating system, the controller, or the auto-white balance module to disable the auto-white balance function of the image sensor and/or associated circuitry. This may be done, as indicated previously, to avoid degrading contrast when only a narrow band of illumination frequency is focused onto the image sensor for barcode reading.

The method 2650 may proceed to a step 2672 in which the resolution for the output image is determined. This may be done, for example, based on the type of barcode to be scanned, the size of the barcode within the output image, and other factors. The resolution selected may be full resolution (i.e., one output pixel for each pixel captured by the image sensor) or binned (i.e., one output pixel for each group of x pixels captured by the image sensor).

The method 2650 may proceed to a step 2680 in which the resolution and binning are set. This may entail the app issuing a command to the operating system, control circuitry, or image sensor and/or associated circuitry to provide output in a certain image size, and/or to bin the captured barcode image according to a certain pattern.

The method 2600 may proceed to a step 2682 in which capture of the barcode image is initiated by the image sensor. Once the barcode image has been captured, the mobile device and/or attachment may attempt to decode it based on the intensity values in the Y.U.V. color space in a step 2690. Pursuant to a query 2692, if decoding was successful, the method 2650 may end 2694. If decoding was unsuccessful, then a new barcode image may need to be captured. This may be done by returning to the step 2672 to re-set resolution and binning. The remaining steps may flow as set forth above until the barcode image has been successfully decoded, or until the user cancels further image capture and/or decoding attempts.

Additional Optic Systems for Camera and/or the Illuminating Torch

In some embodiments as previously described, a mobile device may have a light source such as white light source 852, an illuminating torch, or "flash," in addition to the remaining camera components, which may provide illumination for a target generating mechanism and/or an exposure illumination system.

Figure 27C:
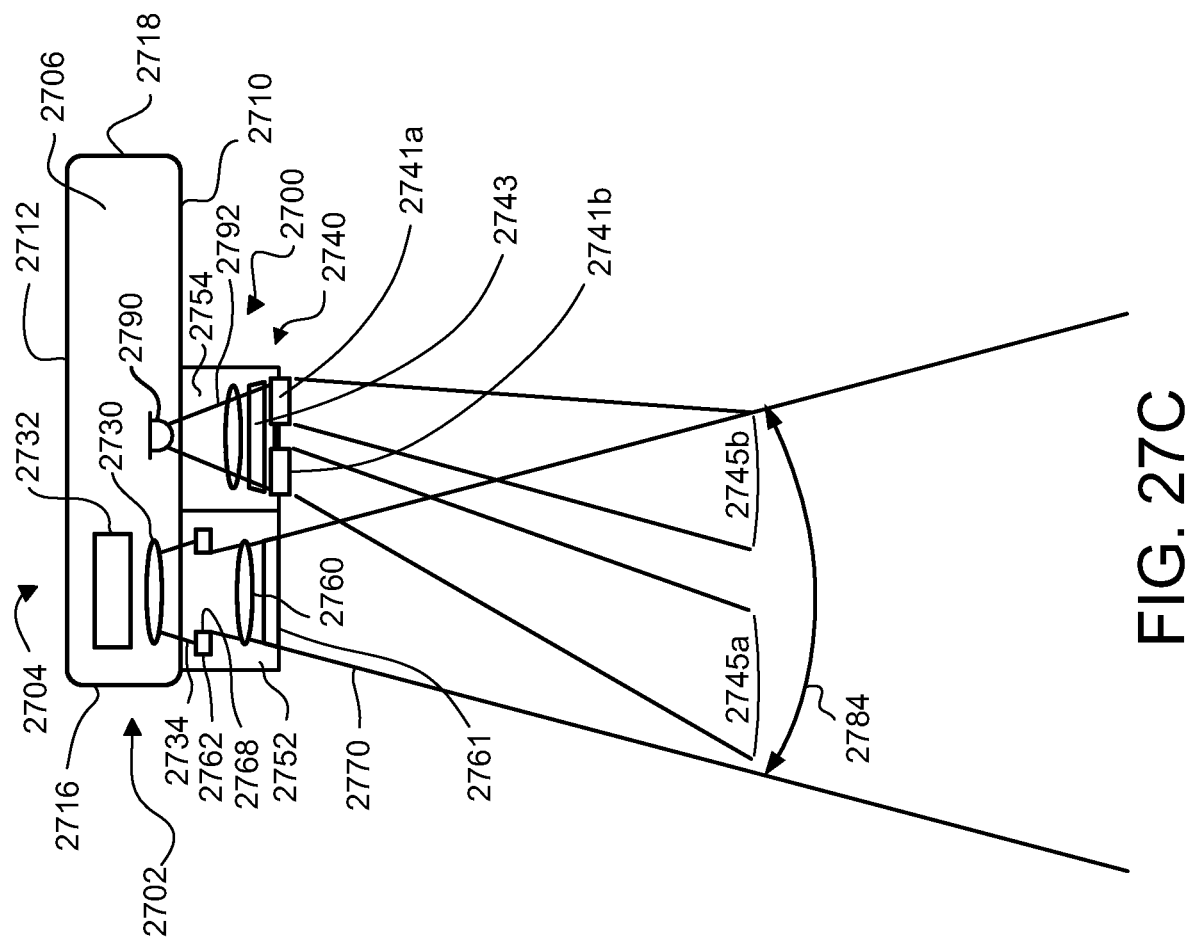

FIGS. 27A, 27B, and 27C illustrate a mobile device 2702 with an attachment 2700a, 2700c, each of which may include optics for image capture, and either: i) optics for image illumination that utilize the illumination system 2790 of the mobile device; or ii) a target generating mechanism which utilizes the illumination system 2790 of the mobile device, similar to that depicted in, and described with respect to, FIGS. 1A, 1B, 1C, 3A and 3B.

More particularly, the mobile device 2702 (which is also useful with the attachments depicted in, and described with respect to, FIGS. 1A, 1B, 1C, 3A and 3B) may have a housing 2704 having a plurality of exterior surfaces, including a top surface 2706, a bottom surface 2708, a generally planar back surface 2710, a right side 2716, and a left side 2718. The housing 2704 may retain a display screen 2712, which may be on a generally planar face surface (not shown) which is parallel to the planar back surface 2710.

The housing 2704 may contain and/or retain components including a camera lens 2730, an image sensor 2732, and an illuminating torch 2790. The illuminating torch 2790 may act as a "flash" for conventional photographs taken by the mobile device 2702. The illuminating torch 2790 may emit illumination through a torch illumination field 2792.

The attachment 2700a may have a housing 2740 with a first chamber 2752 and a second chamber 2754. The first chamber 2752 may house a first optic system that cooperates with the camera lens 2730 and the image sensor 2732, and a second optic system that cooperates with the illuminating torch 2790.

More specifically, the first optic system may be designed to modify properties of the light passing through the camera lens 2730 to reach the image sensor 2732. The first optic system may include an attachment lens 2760 positioned substantially within a camera field of view 2734 of the camera lens 2730, and a barrier 2762 that defines an aperture 2768. The camera field of view 2734 may be modified by the attachment lens 2760 and the aperture 2768 to provide a system field of view 2770. The system field of view 2770 may be more suitable for capturing barcode images than the camera field of view 2734. The system field of view 2770 may have a system angular size 2784 different from a camera angular size (not shown) of the camera field of view.

Referring to FIGS. 27B and 27C, the second optic system may be: i) an illumination optic system designed to modify the properties of light emitted by the illuminating torch 2790 to generate exposure illumination; or ii) a target generating structure (as described with respect to FIGS. 1A, 1B, 1C, 3A, and 3B) to project a targeting pattern 2745a, 2745b on the target area.

As shown in FIG. 27B, the second optic system may include an illumination lens 2794 that is positioned within a torch illumination field 2792 of the illuminating torch 2790. The torch illumination field 2792 may be modified by the illumination lens 2794 to provide a system illumination field 2796. The system illumination field 2796 may be more suitable for illuminating barcodes for decoding than the torch illumination field 2792. The system illumination field 2796 may have a system angular size 2798 different from a torch angular size (not shown) of the torch illumination field 2792. The first chamber 2752 may be isolated from the second chamber 2754 to keep illumination from the illuminating torch 2790 form passing directly from the second chamber 2754 into the first chamber 2752.

As shown, the system illumination field 2796 may substantially overlap with the system field of view 2770. Thus, with the aid of the illumination optic (i.e., the second optic), the system field of view 2770 may be effectively illuminated. This enhanced illumination may facilitate the effective capture and decoding of barcode images with the mobile device 2702 and the attachment 2700.

As shown in FIG. 27C, the second optic system, which may include a target generating structure 2741 that is positioned within the torch illumination field 2792 of the illuminating torch 2790. The torch illumination field 2792 may be modified by the target generating structure 2741 to project a targeting pattern 2745a, 2745b into the target area 2784.

The target generating structure 2741 may include two collimating lenses 2741a, 2741b, each being a target generating structure as depicted in, and described with respect to, FIGS. 1A, 1B, 1C, 3A and 3B.

The collimating lenses 2741a, 2741b of the target generating structure 2741 produce a targeting pattern such as distinct illumination bars 2745a, 2745b into the field of view 2784 of the camera 2732, similar to the targeting pattern described with respect to FIG. 2D. In more detail, the angular size of the two distinct illumination bars 2745a, 2745b depicted in FIG. 27C may be within the field of view of the camera 2732, such as within the center, or may extend to the approximate width of the field of view 2784 of the camera 2732 at a distance from the camera 2732 at which a barcode is best focused on the image sensor array of the camera 2732.

Still further, the attachment 2700c may include a first filter 2743 within the torch illumination field 2792 and a second filter 2761 within the field of view of the camera 2732. The first filter 2743 may be part of the target generating structure. The first filter 2743 may pass a first band of illumination which may be visible illumination with a wavelength below a first wavelength threshold. The first wavelength threshold may be just above the wavelength of blue light or may be approximately 550 nanometers such that the targeting illumination bars 2745a, 2745b within the field of view 2784 comprise only illumination below the first wavelength threshold and may appear blue. The second filter 2761 may pass a second band of illumination which may be visible illumination with a wavelength above a second wavelength threshold. The second wavelength threshold may be the same as the first wavelength threshold or above the first wavelength threshold, above the wavelength of blue light, or above 550 nanometers such that illumination from the torch, as filtered by the first filter 2743, is not passed by the second filter 2761. The second filter 2761 may pass illumination of a wavelength greater than 660 nanometers. Stated another way, the blue targeting pattern 2745a, 2745b within the field of view, to the extent it is reflected towards the camera 2732, is blocked by the second filter 2761 such that the targeting pattern 2745a, 2745b does not affect image capture of a barcode within the field of view 2784.

It should be appreciated that the first filter 2743 within torch illumination field and the second filter 2761 within the field of view of the camera 2732 may further be implemented in the attachments 100c, 300 and 302 depicted in, and described with respect to, FIGS. 1C, 3A and 3B.

Figure 28:
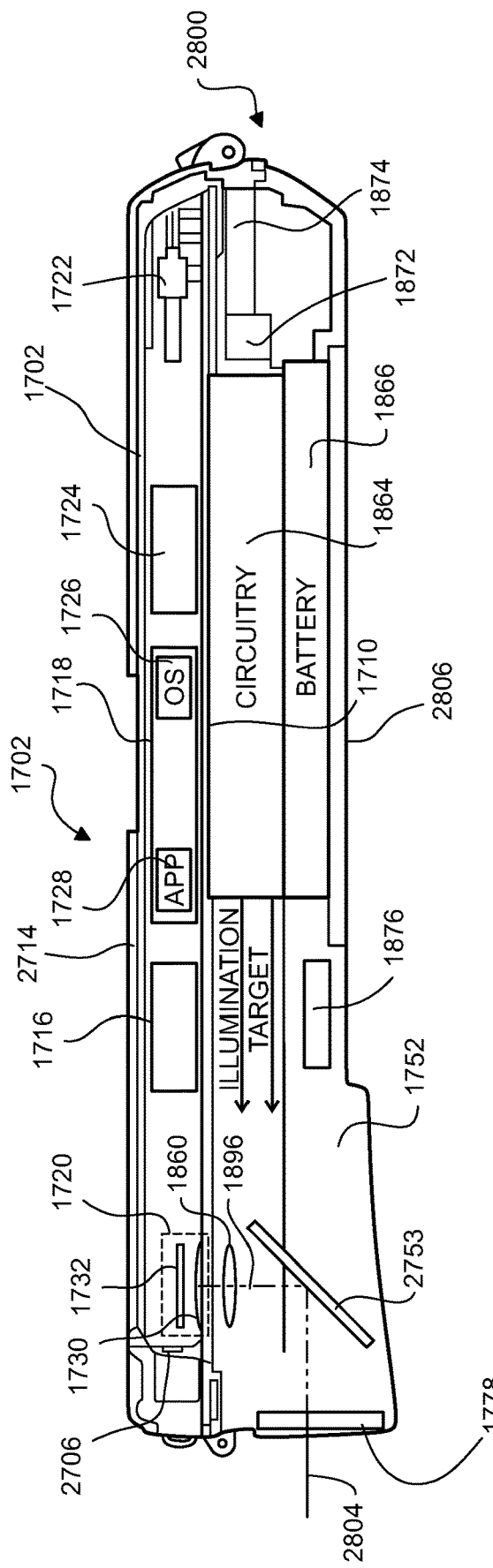
FIG. 28 illustrates an attachment in more detail in accordance with another embodiment.

FIG. 28 illustrates in yet more detail another embodiment of an attachment which includes: i) an optic structure for modifying and folding the field of view of the camera as depicted in, and described with respect to, FIGS. 3A, 3B, 10, 17B, 18A, and 18B; and ii) a target generating mechanism which may include a structure as depicted in, and described with respect to, any of FIGS. 3A, 3B, 27A and 27C. FIG. 28 shows a cut-away view through the optic structure for modifying and folding the field of view of the camera and therefore leaves the target generating mechanism not shown in FIG. 28 because it would be above or below the plane of the paper on which FIG. 28 is depicted.

As shown, the attachment 2800 may be of the encapsulating type referenced previously, and may thus be designed to substantially contain the mobile device 1702. As discussed, the mobile device 1702 may be of any known type, including but not limited to smartphones, tablets, and smartphone/tablets ("phablets") as described in more detail with respect to FIG. 17A. In the embodiment of FIG. 28 the attachment 2800 may be designed to serve as a protective case for the mobile device 1702, and may thus abut all of the external surfaces of the mobile device 1702 listed with respect to FIG. 27A including the top surface 2706, the bottom surface 2708, the back surface 2710, and the bezel 2712 which frames a display screen on a face surface of the mobile device 1702, which may be left exposed by the attachment 2800 so that a user can use the display screen 1714 in a substantially unimpeded manner. Optionally, the attachment 2800 may have a clear cover or coating (not shown) that covers the display screen 1714.

The mobile device 1702 may also contain a processor 1716, memory 1718, a camera 1720, a mobile device power/data interface 1722, and a mobile device battery 1724. Each of these may have various configurations, as known in the art. The mobile device power/data interface 1722 may optionally include a universal serial bus (USB) port or other connector commonly used in mobile devices. The memory 1718 may contain various executable pieces of executable code, including but not limited to an operating system 1726 and one or more applications, or "apps." The apps may include many different programs, one of which may be an app 1728 that can be used to capture and/or decode barcodes with the aid of the attachment 2800.

The camera 1720 may include a camera lens 1730 and an image sensor array, which may include one or more sensors such as CCD (charge-coupled display) sensors, CMOS (complementary metal-oxide-semiconductor) sensors, or the like. The image sensor array may include an image sensor 1732, as shown. The camera lens 1730 may receive light from within a camera field of view 2804 which extends towards the top of the mobile device 1702 after being folded by a mirror 2753.

The attachment may further include a lens structure 1860 which may modify one or more of the angular size of the field of view 2804 and the depth of field of the camera or range of focus in a manner that facilitates barcode capture and/or decoding, as will be described subsequently.

The attachment 2800 may also have a housing 2806. The housing 2806 may contain and/or retain various components, and may also have various interior surfaces as described with respect to FIGS. 17A and 27A that facilitate retention of the mobile device 1702 relative to the attachment 2800.

The housing 2806 may be divided into one or more chambers in order to restrict light passage from one component to another. For example, the housing 2806 may have a first chamber 1752 through which the field of view 2804 of the camera 1720 enters and exits the housing 2806, and a second chamber. The second chamber is not shown in FIG. 28 but may be of the structure of chamber 304 of FIG. 3A. A barrier may separate the first chamber 1752 from the second chamber in a manner that prevents light from either of the first chamber 1752 or the second chamber from passing directly into the other chamber.

The first chamber 1752 may be larger than the second chamber, and may contain components such as an attachment lens 1860, circuitry 1864, and an attachment battery 1866. The system field of view may be different from the camera field of view as described with respect to FIG. 17A.

The circuitry 1864 may include or be electrically connected to an attachment communications interface 1872, which may be coupled to the mobile device communications interface 1722 of the mobile device 1702 via a link 1874. The link 1874 may be designed to convey data and/or electrical power. The first chamber 1752 may further contain a user control 1876, which may be actuated by the user to perform various functions, such as initiating the capture of a barcode. The user control 1876 may include any form of user inputs known in the art, including but not limited to switches, levers, knobs, touch screens, microphones coupled to voice-operation software, and the like. The user control 1876 may advantageously take the form of a trigger that can be actuated, for example, with the index finger of the user. In alternative embodiments, the housing 2806 may be modified to have a pistol grip or other grip that enhances the ergonomics of the housing 2806 and/or facilitates actuation of the user control 1876.

The housing 2806 may also retain a window 1778 in alignment with the attachment lens 1860 so that light is able to enter the first chamber 1752 via the window 1778 to reach the attachment lens 1860, and after passing through the attachment lens 1860, be received and captured by the camera 1720. In some embodiments, the window 1778 may act as not only an exterior window that helps enclose the first chamber 1752, but also as a filter for light entering the first chamber 1752 (i.e. the second filter 2761 with properties as described with respect to FIG. 27C). The window 1778 may thus have a colored tint and/or polarization that helps restrict light entry into the first chamber 1752 to only a wavelength band desired for image capture for effective barcode decoding. In other embodiments, the window 1778 need not act as a filter, but may instead permit visible light of any wavelength to enter the first chamber 1752. In such an event, a separate filter (not shown) may optionally be positioned within the first chamber 1752, along the system optical pathway 1896.

The second chamber (not shown in FIG. 28 but depicted as chamber 304 in FIG. 3A) may have a target generating system as depicted in, and described with respect to, FIGS. 1A, 1B, 1C, 3A, 3C, and 27C. The targeting generating system may provide a distinct targeting pattern that projects into the attachment field of view. The targeting pattern may indicate to the user whether the barcode is properly positioned for capture and/or decoding.

In all of the embodiments that include a target generating structure, the target generating structure may be designed to project light only prior to and/or after image capture so as to avoid interfering with decodability of the barcode image. Conversely, the exposure illumination system may illuminate objects (such as barcodes) within the system field of view during image capture. The exposure illumination system may provide a diffuse illumination pattern to enhance decodability of the barcode image by ensuring that it has been sufficiently illuminated to provide the contrast in pixel luminance values necessary for reliable decoding while the target generating structure provides a distinct targeting pattern. In any of the embodiments that include use of the torch of the mobile device to provide illumination for the target generating structure, the exposure illuminating system of the attachment may include various light sources, including but not limited to lasers, LEDs, incandescent lights, fluorescent lights, and the like to provide diffuse exposure illumination. The exposure illuminating system 1782 may advantageously have one or more light sources with a wide broadcast area, such as LED lights. If desired, the broadcast area of the exposure illumination system 1782 may be tuned to generally match the system field of view 1770.

In this application, a "distinct illumination pattern" is an illumination pattern produced by light that is focused to provide relatively crisp lines or other shapes with a distinct or abrupt change in intensity of the illumination forming the crisp lines or shapes. Thus, the illumination produced by a laser is an example of light that would typically produce a distinct illumination pattern. By contrast, a "diffuse illumination pattern" is an illumination pattern produced by light that is not focused at any particular location, but rather emanates into a broad area. Thus, the illumination produced by a typical light bulb is an example of light that would typically produce a diffuse illumination pattern.

Figure 29:
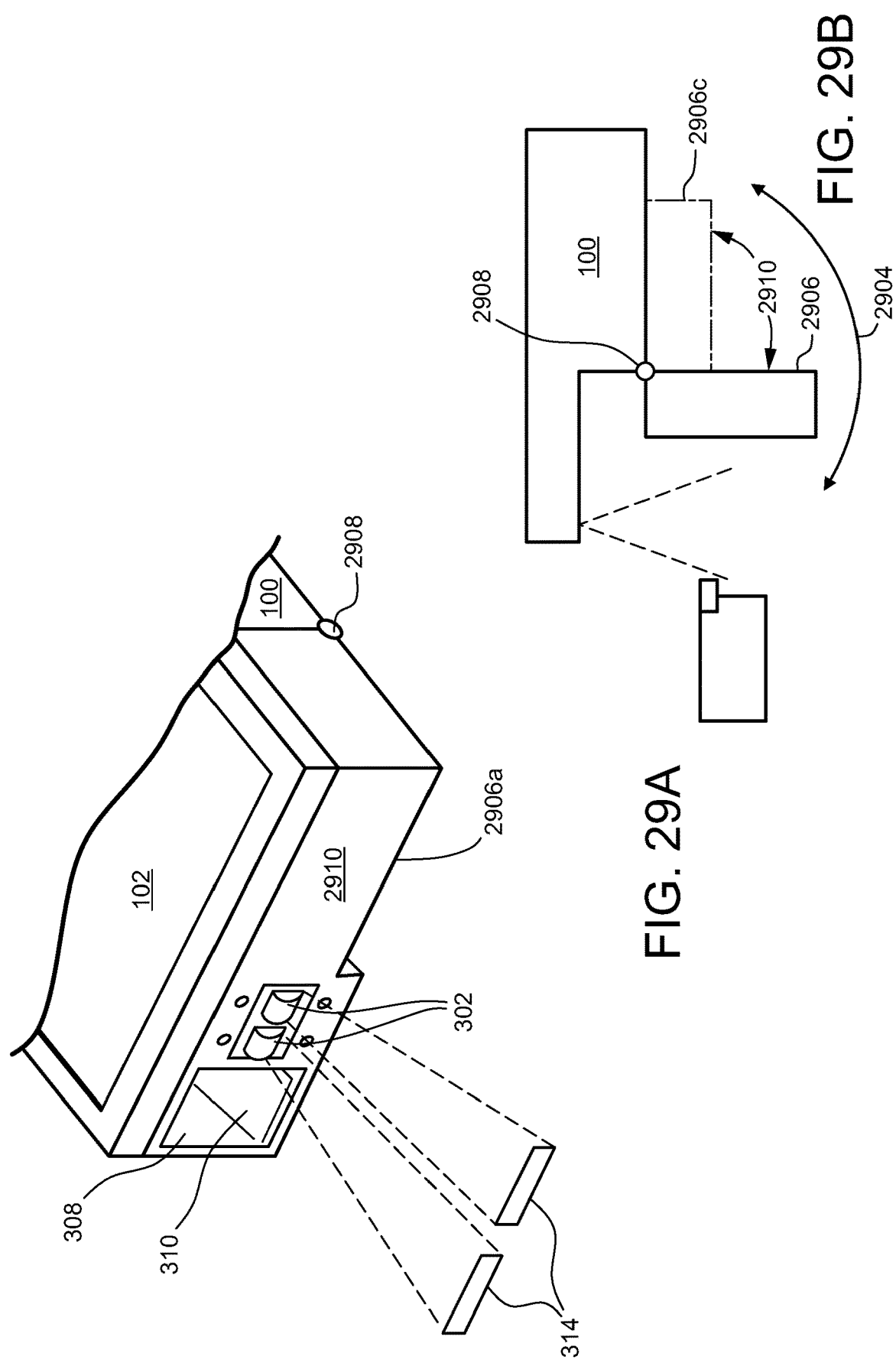
FIGS. 29A and 29B illustrate examples of a mobile device attachment where both a target generating structure and optics for barcode image capture can be repositioned.

FIGS. 29A and 29B show not only the target generating structure but the entire combination of structure 2910 generating a targeting pattern and modifying the field of view of the camera (as described with respect to FIGS. 3A and 3B) being pivotally repositionable between: i) a first position 2906a as depicted in FIG. 29A wherein the structure 2910 is positioned within the field of view of the camera and in front of the illuminating torch such that illumination from the illumination torch is shaped by the target generating structure 302 into a targeting pattern; and ii) a second position 2906b and/or a third position 2906c, both as depicted in FIG. 29B wherein the structure 2910 is positioned outside of the field of view of the camera and outside of the torch illumination field of the illuminating torch such that illumination from the illuminating torch is unmodified by the target generating structure 302 and can be used for illumination when using the camera of the mobile device to take photographic pictures and the field of view of the camera is unmodified by the structure 2910 and can be used for photography. As depicted in FIGS. 29A and 29B, the structure 2910 is secured to the attachment 100 by a hinge pivot pin 2908 such that the structure 2910 may be pivoted in the direction 2904 between position 2906a and either position 2906b or 2906c by pivoting about the hinge pivot pin 2908.

It is also envisioned that the structure 2910 could be secured to the attachment 100 by a flexible band which permits pivoting between position 2906a and either position 2906b or 2906c by flexure of the flexible band as described with respect to FIGS. 4A and 4B. Further still it is envisioned that the structure 2910 could be secured within a channel and be laterally repositioned between: i) a first position wherein the structure 2910 is positioned within the field of view of the camera and in front of the illuminating torch such that illumination from the illumination torch is shaped by the target generating structure 302 into a targeting pattern; and ii) a second position wherein the structure 2910 is positioned outside of the field of view of the camera and outside of the torch illumination field of the illuminating torch such that illumination from the illuminating torch is unmodified by the target generating structure 302 and can be used for illumination when using the camera of the mobile device to take photographic pictures as described with respect to FIGS. 4C and 4D.

In some embodiments, a mobile device may have multiple cameras and multiple illumination sources such as: i) multiple white light sources 852, (illuminating torches or flashes for image capture of ordinary photographic images) and/or ii) white light sources (torch or flashes for ordinary photographic images) in combination with other illumination sources which may include infra-red illumination sources (IR LEDs), one or more colored illumination sources such as red and/or blue LEDs or red and/or blue filters over LEDs, ultra violet illumination sources (UV LED), etc.

Figure 30:
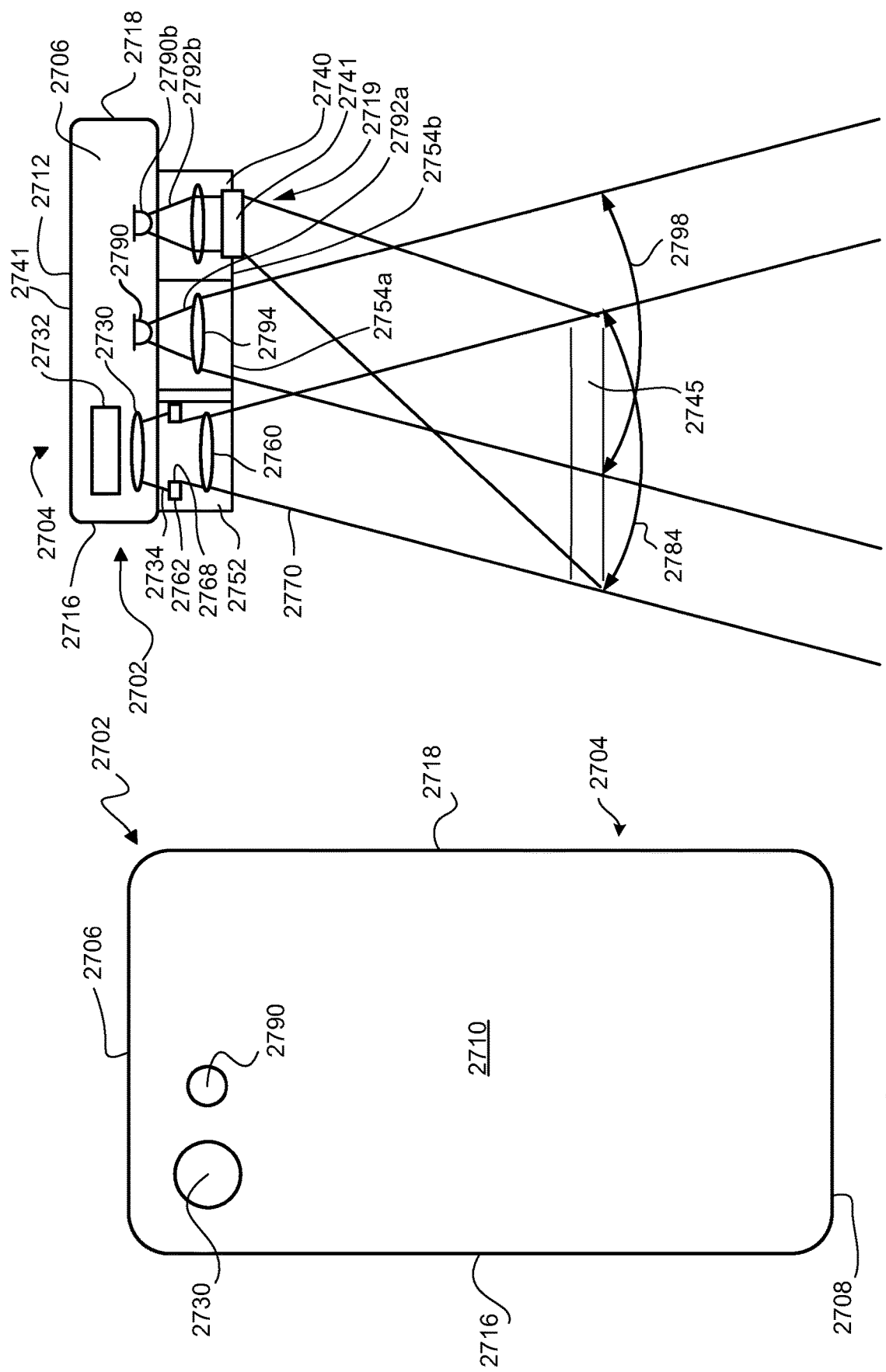
FIGS. 30A and 30B illustrate examples of a mobile device attachment for a mobile device with multiple illumination sources.

FIGS. 30A and 30B represent an exemplary attachment 2719, similar to the attachment depicted in FIGS. 27A and 27B, for use with such a mobile device. The mobile device depicted in FIGS. 30A and 30B may include two illumination sources 2790a and 2790b. Illumination source 2790a may be, for example, a torch or flash (i.e. white light source 852 as previously described) designed to illuminate an object for general purpose photography in dimly lit conditions. Illumination source 2790b may be, for example, a red or blue LED.

The attachment 2719 may include optics for image capture, and both: i) optics for image illumination that utilize the illumination system 2790a of the mobile device; and ii) a target generating mechanism which utilizes the illumination system 2790b of the mobile device similar to that depicted in, and described with respect to, FIGS. 1A, 1B, 1C, 3A and 3B.

More particularly, the mobile device 2702 may have a housing 2704 having a plurality of exterior surfaces, including a top surface 2706, a bottom surface 2708, a generally planar back surface 2710, a right side 2716, and a left side 2718. The housing 2704 may retain a display screen 2712, which may be on a generally planar face surface (not shown) which is parallel to the planar back surface 2710.

The housing 2704 may contain and/or retain components including a camera lens 2730, an image sensor 2732, the first illumination source 2790a and the second illumination source 2790b.

The first illumination source 2790a may emit illumination through a first illumination field 2792a. The second illumination source 2790b may emit illumination through a second illumination field 2792b.

The attachment 2700a may have a housing 2740 with a first chamber 2752, a second chamber 2754a, and a third chamber 2754b. The first chamber 2752 may house a first optic system that cooperates with the camera lens 2730 and the image sensor 2732. The second chamber 2754a may include a second optic system that cooperates with the first illumination source 2790a. The third chamber 2754b may include a third optic system that cooperates with the second illumination source 2790b.

More specifically, the first optic system may be designed to modify properties of the light passing through the camera lens 2730 to reach the image sensor 2732. The first optic system may include an attachment lens 2760 positioned substantially within a camera field of view 2734 of the camera lens 2730, and a barrier 2762 that defines an aperture 2768. The camera field of view 2734 may be modified by the attachment lens 2760 and the aperture 2768 to provide a system field of view 2770. The system field of view 2770 may be more suitable for capturing barcode images than the camera field of view 2734. The system field of view 2770 may have a system angular size 2784 different from a camera angular size (not shown) of the camera field of view.

The second optic system may be: i) an illumination optic system designed to modify the properties of light emitted by the first illumination source 2790a to generate exposure illumination. More specifically, the second optic system may include an illumination lens 2794 that is positioned within the first illumination field 2792a of the first illumination source 2790a. The first illumination field 2792a may be modified by the illumination lens 2794 to provide a system illumination field 2796. The system illumination field 2796 may be more suitable for illuminating barcodes for decoding than the first illumination field 2792a. The system illumination field 2796 may have a system angular size 2798 different from a first illumination field 2792a.

As shown, the system illumination field 2796 may substantially overlap with the system field of view 2770. Thus, with the aid of the illumination optic (i.e., the second optic), the system field of view 2770 may be effectively illuminated. This enhanced illumination may facilitate the effective capture and decoding of barcode images with the mobile device 2702 and the attachment 2700.

The third optic system may include a target generating structure (as described with respect to FIGS. 1A, 1B, 1C, 3A, and 3B) to project a targeting pattern 2745 on the target area. More specifically, the second optic system, which may include a target generating structure 2741 that is positioned within the second illumination field 2792b of the second illumination source 2790b. The second illumination field 2792b may be modified by the target generating structure 2741 to project a targeting pattern 2745 into the target area 2784.

The target generating structure 2741 may include one or more collimating lenses 2741 which may be a target generating structure as depicted in, and described with respect to, FIGS. 1A, 1B, 1C, 3A and 3B.

The collimating lens 2741 may produce a targeting pattern such as distinct illumination bar within the field of view 2784 of the camera 2732, similar to the targeting pattern described with respect to FIG. 2D. In more detail, the angular size of the distinct illumination bar 2745 depicted in FIG. 30B may be within the field of view of the camera, such as within the center, or may extend to the approximate width of the field of view 2784 of the camera 2732 at a distance from the camera 2732 at which a barcode is best focused on the image sensor array of the camera 2732.

Each of the first chamber 2752, the second chamber 2754a, and the third chamber 2754b may be isolated from the other chambers to keep illumination from each chamber from entering into an adjacent chamber.

In other embodiments, the second optics 2794a and the third optics 2794b (and the target generating structure 2741) may be reversed such that: i) the second optics 2794a modifies the second illumination from illumination source 2790b (which may be a red LED) such that red illumination is evenly projects across field of illumination 2789; and the third optics 2794b modifies the first illumination from illumination source 2790a (which may be white illumination) such that the white illumination is projected to targeting pattern 2745. Still further, the attachment 2719 may include, within any chamber, the filters as described with respect to FIG. 27. It should be appreciated that in either embodiment the application operating on the mobile device may activate the first illumination source 2790a and the second illumination source 2790b independently such that when the targeting pattern is illuminated, the even illumination of the other illuminator is off. When the even illumination is on, for capturing an image of a barcode, the targeting illumination (and it's distinct contrast within the field of view) is off.

Figure 31:
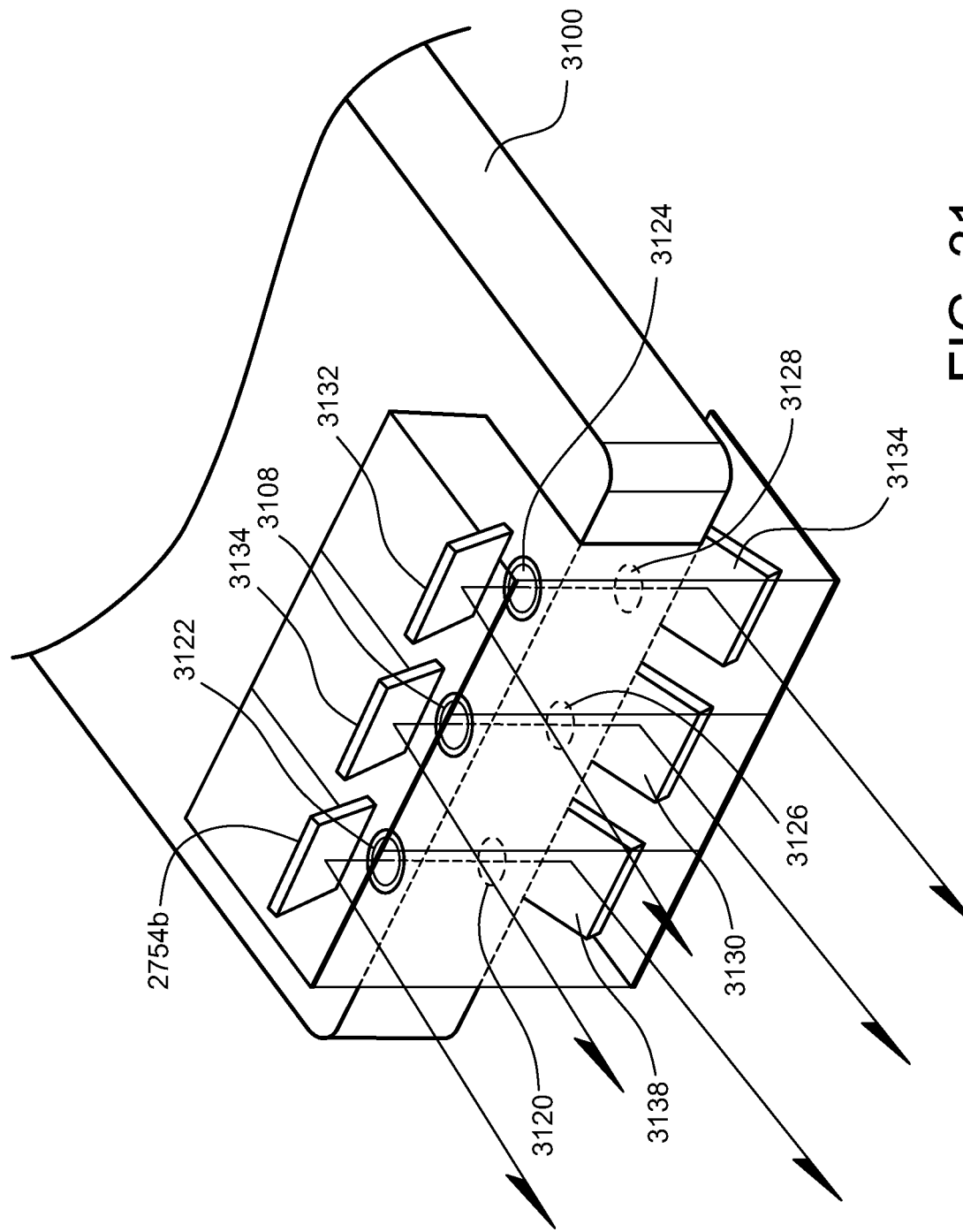
FIG. 31 illustrates an example of a mobile device attachment for a mobile device with both multiple cameras and multiple illumination sources.

FIG. 31 depicts an attachment for a mobile device which includes: i) multiple cameras, first camera 3120 on the backside of the mobile device and second camera 3108 on the face side of the mobile device; and ii) multiple illumination sources, with some of the illumination sources being on the backside of the mobile device and some of the illumination sources being on the face side of the mobile device.

Each of the multiple illumination sources may be any of: i) a white light sources 852, (illuminating torches or flashes for image capture of ordinary photographic images), ii) an infra-red illumination source (IR LED), iii) a colored illumination source such as a red and/or a blue LED or red and/or blue filters over an LED, iv) an ultra violet illumination source (UV LED), or v) other illumination sources.

The attachment 31 may include, for each camera 3120, 3108 optics within a chamber as described with respect to camera 2732 in FIG. 27 plus a mirror which folds the field of view of the camera towards the top side of the mobile device (i.e. folds field of view of camera 3120 from the backside of the mobile device to the top side of the mobile device and folds field of view of camera 3108 from the face side of the mobile device to the top side of the mobile device).

The attachment 31 may further include, for each illumination source 3122, 3124, 3126, 3128 one of: i) optics 2794 as described with respect to FIGS. 27b and 30b for generating an even field of illumination 2798 across the system field of view 2784 or ii) a target generating mechanism which utilizes the illumination system of the mobile device, similar to that depicted in, and described with respect to, FIGS. 1A, 1B, 1C, 3A and 3B. Further, each optic or targeting generating mechanism may be within a chamber separated from each other chamber and including a mirror with folds the illumination or targeting pattern to the top side of the mobile device. More specifically, the those illumination sources 3122 and 3124 on the face side of the mobile device 3100 generate illumination which is folded to the top side of the mobile device by mirrors 3130 and 3132. Those illumination source 3146 and 3128 on the back side of the mobile device 3100 generate illumination which is folded to the top side of the mobile device 3100 by mirrors 3134 and 3136.

In the embodiment depicted in FIG. 31, the accessory optics through which the first camera receives illumination reflected from a field of view and the optics through which the second camera receives illumination reflected from the field of view may be different such that the two fields of view have different angles (wide field of view vs. narrow field of view.

Potential Uses

Barcode verification is the process of measuring the print quality of a printed barcode to analyze how it will perform in different environments with different types of scanning equipment. The process of verification involves checking the visual aspects (for modulation, decodability and more) of printed barcodes against standards made by international organizations.

An attachment that improves the barcode reading capabilities of a mobile device, as described herein, may enable a mobile device to be used for barcode verification, print verification, and/or other types of verification, and/or for reading direct part marks.

For barcode print quality verification or general printing analysis, the attachment must provide fixed reading distance and ensure there is no distortion when capturing an image of the target to be verified. When the imaging distance is fixed, the mobile device can be calibrated to remove lens distortion and establish a conversion factor between the number of pixels and the actual physical size.

For reading direct part marks, ambient lighting or LED lighting from the mobile device is usually not suitable to create sufficient contrast for decoding the marks. A special lighting attachment that provides diffused on-axis illumination and/or low angle illumination is needed.

Anti-Microbial Housing

An attachment as described herein may include an anti-microbial housing, i.e., a housing that includes one or more additives (e.g., a silver iodide additive) that inhibit the growth of mold and bacteria on the surface of the housing. This type of housing may be beneficial if a mobile device is going to be used in a medical environment.

Chemical-Resistant Housing

Mobile devices are often made with a housing of amorphous plastics, such as polycarbonate/acrylonitrile butadiene-styrene (PC/ABS). Housings made of PC/ABS contain a loosely packed structure which makes it easier for chemicals to penetrate the plastic. Repeated use of chemical cleansers (e.g., cleansers that include isopropyl alcohol) may damage such housings. However, the use of chemical cleansers may be important. For example, if a mobile device is going to be used as a barcode reader in a medical environment, it is important to frequently disinfect the mobile device in order to try to prevent or limit the spread of infection.

An attachment as described herein may include a housing that is designed to resist the harmful effects of chemical cleansers. Such a housing may be referred to as a "chemical-resistant" (or a "disinfectant-ready") housing. A chemical-resistant housing may include one or more additives (e.g., silicone) that reduce the harmful effects of chemical cleansers.

It should be appreciated that components and structures described with respect to any attachment embodiment may be implemented in other attachment embodiments and similarly components and structures described with respect to any embodiment of a camera device, mobile device, or app, operating system, or circuitry therein, may be implemented any other embodiments. The claims are not limited to the specific implementations described above. Various modifications, changes and variations may be made in the arrangement, operation and details of the implementations described herein without departing from the scope of the claims.

What is claimed is:

1. An accessory for a mobile device, the mobile device comprising a processor, a display screen, memory, an illumination torch having a torch field of illumination, and a camera having a camera field of view, the camera comprising a camera lens and an image sensor, the accessory comprising:
    a target generating structure for emitting a targeting pattern of illumination into the camera field of view of the camera of the mobile device, wherein the target generating structure is secured to the accessory such that when the accessory is secured to at least one corner of the mobile device, the target generating structure can be repositioned between a first position within the torch field of illumination of the illumination torch and a second position outside the torch field of illumination of the illumination torch.

2. The accessory of claim 1, wherein the target generating structure is configured to shape illumination from the illumination torch to a targeting pattern with distinctive contrast between intense illumination of the targeting pattern and weak illumination of regions of the camera field of view around the targeting pattern.

3. The accessory of claim 2, wherein the target generating structure includes a collimating lens for focusing the illumination from the illumination torch, and the targeting pattern is a region of intense illumination within a central portion of the camera field of view of the camera.

4. The accessory of claim 3, wherein the region of intense illumination within the central portion of the camera field of view is a quadrilateral.

5. The accessory of claim 1, wherein the accessory further comprises:
    a first filter within the torch field of illumination, the first filter being configured to pass a first band of illumination comprising visible illumination with a wavelength below a first wavelength threshold; and
    a second filter within the camera field of view, the second filter being configured to pass a second band of illumination comprising visible illumination with a wavelength above a second wavelength threshold, the second wavelength threshold being greater than or equal to the first wavelength threshold.

6. The accessory of claim 5, wherein the first band of illumination comprises wavelengths of illumination appearing blue.

7. The accessory of claim 5, wherein the first filter attenuates illumination with a wavelength above the first wavelength threshold.

8. The accessory of claim 7, wherein the second filter attenuates illumination passed by the first filter.

9. The accessory of claim 1, wherein the target generating structure is secured to the accessory such that it can be laterally repositioned and illumination from the illumination torch is projected into the camera field of view without modification by the accessory if the target generating structure is laterally repositioned out of the torch field of illumination of the illumination torch.

10. The accessory of claim 1, wherein the target generating structure is pivotally attached to the accessory such that illumination from the illumination torch is projected into the camera field of view without modification by the accessory if the target generating structure is pivoted out of the torch field of illumination of the illumination torch.

11. The accessory of claim 1, wherein the accessory is secured to the mobile device by friction between a portion of the accessory in contact with a face of the mobile device and a portion of the accessory in contact with an opposing back side of the mobile device, the accessory can be removed from the mobile device by sliding the accessory in a direction parallel to a plane of the face of the mobile device, and the face includes the display screen.

12. The accessory of claim 1, wherein the accessory is secured to at least two corners of the mobile device.

13. The accessory of claim 1, wherein the accessory does not modify the torch field of illumination of the illumination torch when the target generating structure is positioned in the second position outside the torch field of illumination of the illumination torch.

14. A method for reading a barcode with a mobile device, wherein the mobile device comprises an illumination torch and a camera including a camera lens and an image sensor, and an accessory including a target generating structure that is secured to the mobile device, the method comprising:
    sending, from the accessory to the mobile device, a request to establish a focus setting of the camera;
    emitting, by the target generating structure, a targeting pattern of illumination into a field of view of the camera of the mobile device, wherein the target generating structure emits the targeting pattern of illumination after the accessory sends the request;
    illuminating the field of view of the camera;
    capturing, by the mobile device, an image of a barcode placed in the field of view of the camera; and
    decoding, by the mobile device, the barcode.

15. The method of claim 14, wherein the target generating structure shapes illumination from the illumination torch of the mobile device and emits the targeting pattern into the field of view of the camera of the mobile device.

16. The method of claim 14, wherein the request is to disable an autofocus function.

17. The method of claim 14, further comprising:
    sending an image capture signal from the accessory to the mobile device, wherein the image of the barcode is captured in response to the image capture signal.

18. An accessory for a mobile device, the mobile device comprising a processor, a display screen, memory, an illumination torch, and a camera comprising a camera lens and an image sensor, the accessory comprising:
    a target generating structure for emitting a targeting pattern of illumination into a field of view of the camera of the mobile device, wherein the target generating structure is positioned within a field of illumination of the illumination torch if the accessory is secured to at least one corner of the mobile device, wherein the target generating structure is secured to the accessory such that the target generating structure can be laterally or pivotally repositioned outside the field of illumination of the illumination torch, and wherein illumination from the illumination torch is projected into the field of view without modification by the accessory if the target generating structure is laterally or pivotally repositioned out of the field of illumination of the illumination torch.

19. The accessory of claim 18, wherein the target generating structure is configured to shape illumination from the illumination torch to a targeting pattern with distinctive contrast between intense illumination of the targeting pattern and weak illumination of regions of the field of view around the targeting pattern.

20. The accessory of claim 19, wherein the target generating structure includes a collimating lens for focusing the illumination from the illumination torch, and the targeting pattern is a region of intense illumination within a central portion of the field of view of the camera.

\* \* \* \* \*